United States Patent
Block et al.

(10) Patent No.: US 8,651,373 B1
(45) Date of Patent: *Feb. 18, 2014

(54) ATM THAT ALLOWS A USER TO SELECT A DESIRED TRANSACTION BY TOUCH DRAGGING A DISPLAYED ICON THAT REPRESENTS THE DESIRED TRANSACTION

(75) Inventors: James Block, North Lawrence, OH (US); H. Thomas Graef, Bolivar, OH (US); Paul D. Magee, Canton, OH (US); Donald S. Nelson, Jr., Akron, OH (US); James Meek, North Canton, OH (US); Daniel S. McIntyre, Uniontown, OH (US); Mark DePietro, Canton, OH (US); Natarajan Ramachandran, Uniontown, OH (US)

(73) Assignee: Diebold Self-Service Systems, division of Diebold, Incorporated, North Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/455,175

(22) Filed: Apr. 25, 2012

Related U.S. Application Data

(60) Continuation-in-part of application No. 13/065,375, filed on Mar. 21, 2011, now Pat. No. 8,220,707, which is a continuation of application No. 12/799,551, filed (Continued)

(51) Int. Cl.
*G06Q 40/00* (2012.01)
*G07D 11/00* (2006.01)
*G07F 19/00* (2006.01)

(52) U.S. Cl.
USPC .............................................. 235/379; 705/43

(58) Field of Classification Search
USPC ............ 235/379; 705/35, 39, 43, 44; 709/204
See application file for complete search history.

(56) References Cited

U.S. PATENT DOCUMENTS 3,876,864 A * 4/1975 Clark et al. .................... 235/379
3,949,364 A * 4/1976 Clark et al. .................... 235/375

(Continued)

*Primary Examiner* — Michael G Lee
*Assistant Examiner* — Suezu Ellis
(74) *Attorney, Agent, or Firm* — Black, McCuskey, Souers & Arbaugh, LPA

(57) ABSTRACT

An automated banking machine allows an authorized user to carry out transactions such as withdrawing cash, making a deposit, cashing a check, and transferring funds between accounts. The machine provides a transaction selection screen through a touch screen display. The transaction selection screen includes a plurality of visually different icons. Each icon represents a different transaction that is available to the current machine user. The user can select a particular transaction by dragging its representative icon with a contacting finger. Upon selection of the particular transaction, a display screen unique to that particular transaction is then provided through the touch screen display.

25 Claims, 20 Drawing Sheets

Related U.S. Application Data

(60) on Apr. 27, 2010, now Pat. No. 8,091,778, which is a continuation of application No. 12/291,839, filed on Nov. 13, 2008, now Pat. No. 7,712,657, application No. 13/455,175, which is a continuation-in-part of application No. 13/066,323, filed on Apr. 12, 2011, now Pat. No. 8,177,126, which is a continuation of application No. 11/360,008, filed on Feb. 21, 2006, which is a continuation-in-part of application No. 10/390,342, filed on Mar. 17, 2003, now abandoned, application No. 13/455,175, which is a continuation-in-part of application No. 12/925,114, filed on Oct. 14, 2010, now Pat. No. 8,172,133, which is a continuation of application No. 11/732,410, filed on Apr. 3, 2007, now Pat. No. 7,891,550, which is a continuation-in-part of application No. 11/360,007, filed on Feb. 21, 2006, now Pat. No. 7,845,552, said application No. 11/732,410 is a continuation-in-part of application No. 11/100,149, filed on Apr. 5, 2005, now abandoned, and a continuation-in-part of application No. 11/100,148, filed on Apr. 5, 2005, now abandoned, application No. 13/455,175, which is a continuation-in-part of application No. 12/930,724, filed on Jan. 14, 2011, now Pat. No. 8,220,706, which is a continuation of application No. 12/800,184, filed on May 10, 2010, now Pat. No. 7,883,008, which is a continuation of application No. 12/584,491, filed on Sep. 4, 2009, now Pat. No. 7,946,480, which is a continuation-in-part of application No. 12/455,602, filed on Jun. 3, 2009, now Pat. No. 7,861,924, which is a continuation of application No. 11/370,513, filed on Mar. 7, 2006, now Pat. No. 7,866,544, which is a continuation-in-part of application No. 10/832,960, filed on Apr. 27, 2004, now Pat. No. 7,118,031, which is a continuation-in-part of application No. 10/601,813, filed on Jun. 23, 2003, now Pat. No. 7,240,827, said application No. 12/584,491 is a continuation-in-part of application No. 12/315,840, filed on Dec. 5, 2008, now Pat. No. 7,686,213, which is a continuation of application No. 11/895,976, filed on Aug. 28, 2007, now Pat. No. 7,461,779, which is a division of application No. 11/714,615, filed on Mar. 6, 2007, now Pat. No. 7,392,938, which is a division of application No. 11/415,531, filed on May 2, 2006, now Pat. No. 7,201,313, which is a division of application No. 10/795,926, filed on Mar. 8, 2004, now Pat. No. 7,040,533, which is a continuation-in-part of application No. 09/826,675, filed on Apr. 5, 2001, now Pat. No. 6,702,181, which is a division of application No. 09/076,051, filed on May 11, 1998, now Pat. No. 6,315,195, said application No. 12/584,491 is a continuation-in-part of application No. 11/975,907, filed on Oct. 22, 2007, now Pat. No. 7,946,477.

(60) Provisional application No. 61/628,840, filed on Nov. 7, 2011, provisional application No. 61/002,833, filed on Nov. 13, 2007, provisional application No. 61/002,834, filed on Nov. 13, 2007, provisional application No. 61/002,841, filed on Nov. 13, 2007, provisional application No. 61/002,854, filed on Nov. 13, 2007, provisional application No. 61/002,860, filed on Nov. 13, 2007, provisional application No. 61/002,861, filed on Nov. 13, 2007, provisional application No. 61/002,863, filed on Nov. 13, 2007, provisional application No. 61/002,875, filed on Nov. 13, 2007, provisional application No. 61/002,907, filed on Nov. 13, 2007, provisional application No. 60/655,728, filed on Feb. 22, 2005, provisional application No. 60/657,104, filed on Feb. 22, 2005, provisional application No. 60/365,434, filed on Mar. 18, 2002, provisional application No. 60/790,193, filed on Apr. 6, 2006, provisional application No. 60/560,100, filed on Apr. 6, 2004, provisional application No. 60/560,054, filed on Apr. 6, 2004, provisional application No. 61/270,359, filed on Jul. 6, 2009, provisional application No. 60/660,070, filed on Mar. 9, 2005, provisional application No. 60/560,674, filed on Apr. 7, 2004, provisional application No. 60/429,478, filed on Nov. 26, 2002, provisional application No. 60/082,299, filed on Apr. 17, 1998, provisional application No. 60/918,453, filed on Mar. 16, 2007, provisional application No. 60/918,455, filed on Mar. 16, 2007, provisional application No. 60/918,458, filed on Mar. 16, 2007.

(56) References Cited

U.S. PATENT DOCUMENTS

| | | | | |
|---|---|---|---|---|
| 4,617,457 | A * | 10/1986 | Granzow et al. | 235/379 |
| 5,386,104 | A * | 1/1995 | Sime | 235/379 |
| 5,606,496 | A * | 2/1997 | D'Agostino | 396/235 |
| 5,649,104 | A * | 7/1997 | Carleton et al. | 709/204 |
| 5,774,663 | A * | 6/1998 | Randle et al. | 709/204 |
| 5,796,389 | A * | 8/1998 | Bertram et al. | 345/173 |
| 5,901,204 | A * | 5/1999 | Gallacher et al. | 379/90.01 |
| 6,021,400 | A * | 2/2000 | Gallacher et al. | 705/43 |
| 6,704,039 | B2 * | 3/2004 | Pena | 348/14.01 |
| 7,213,745 | B2 * | 5/2007 | Smith et al. | 235/379 |
| 8,177,126 | B2 * | 5/2012 | Meek et al. | 235/379 |
| 8,220,707 | B1 * | 7/2012 | Block et al. | 235/379 |
| 2004/0039701 | A1 * | 2/2004 | Nakamura et al. | 705/42 |
| 2007/0045397 | A1 * | 3/2007 | Ireland et al. | 235/379 |
| 2008/0040273 | A1 * | 2/2008 | Savage et al. | 705/43 |
| 2012/0265809 | A1 * | 10/2012 | Hanson et al. | 709/204 |

* cited by examiner

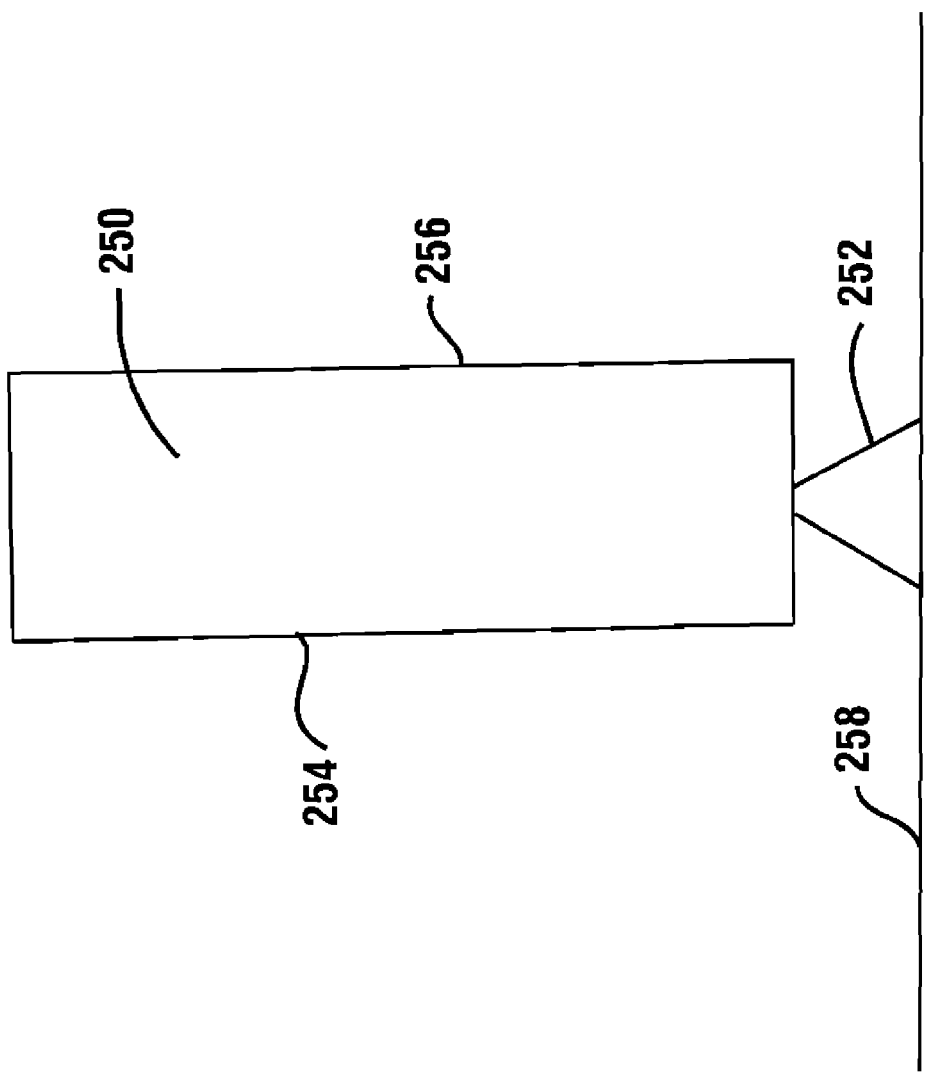

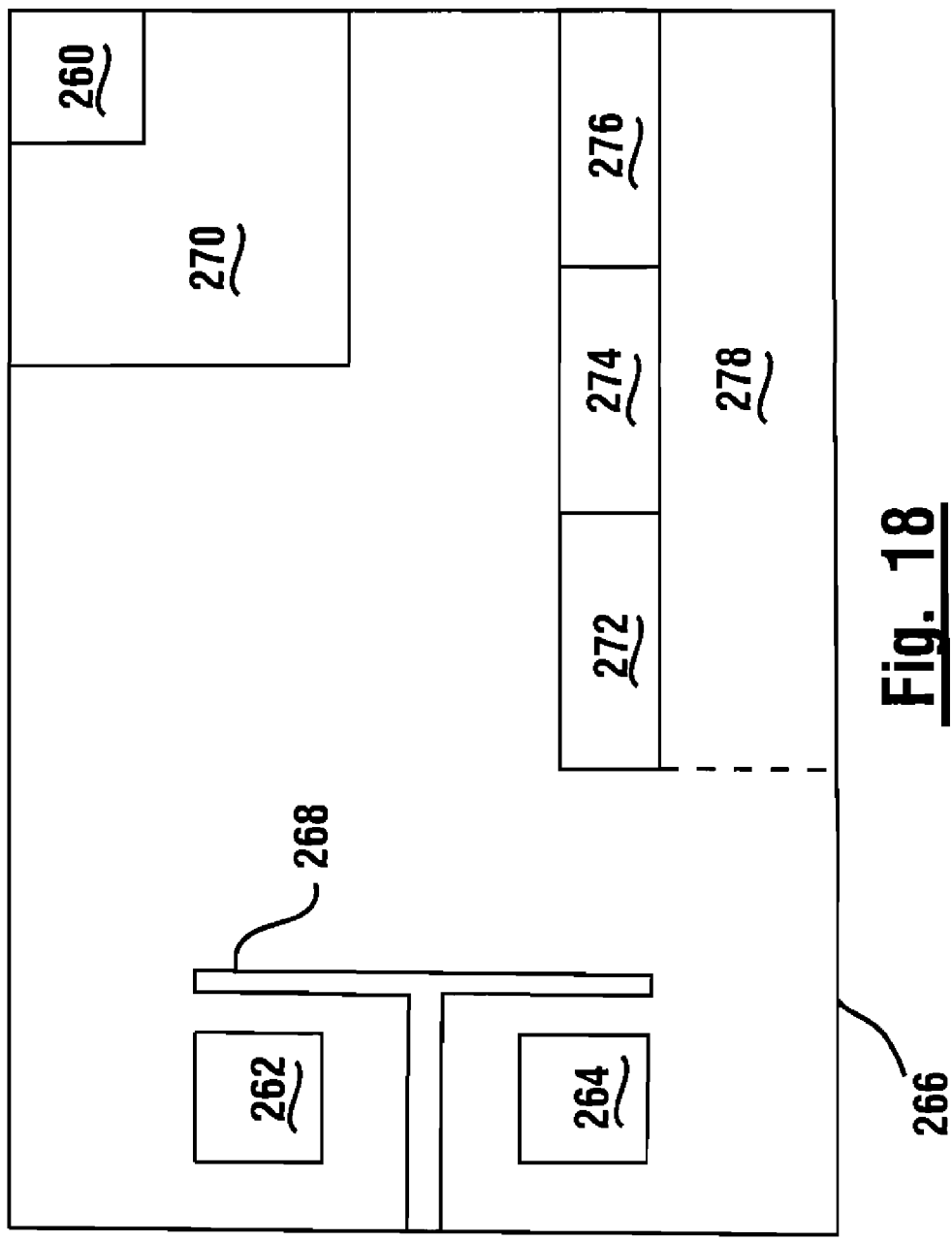

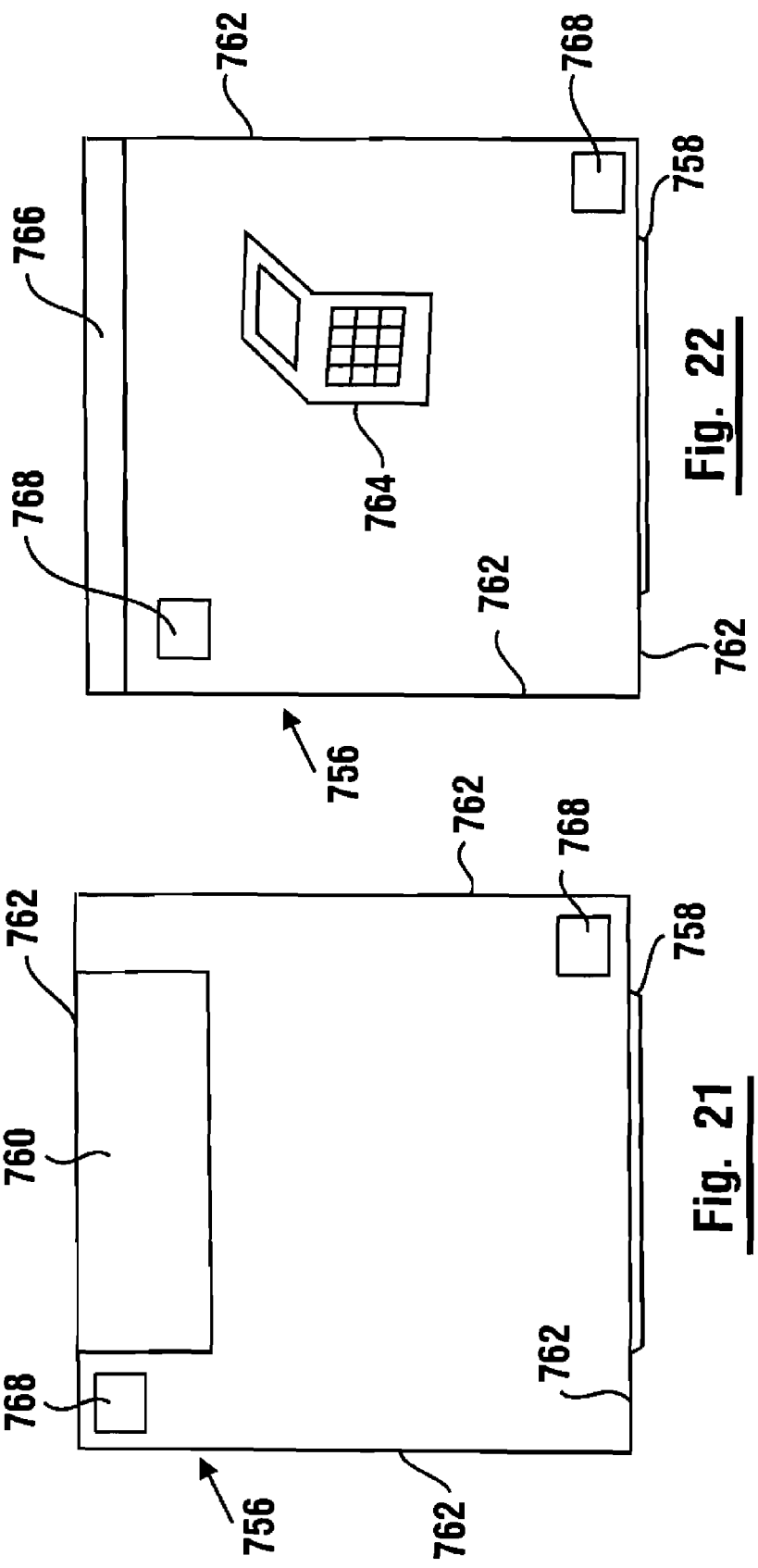

ATM THAT ALLOWS A USER TO SELECT A DESIRED TRANSACTION BY TOUCH DRAGGING A DISPLAYED ICON THAT REPRESENTS THE DESIRED TRANSACTION

CROSS REFERENCE TO RELATED APPLICATIONS

This application claims the benefit of U.S. Provisional Applications 61/479,005 filed Apr. 26, 2011 and 61/628,840 filed Nov. 7, 2011, and is also a continuation-in-part of each of: U.S. application Ser. No. 13/065,375 filed Mar. 21, 2011; U.S. application Ser. No. 13/066,323 filed Apr. 12, 2011; U.S. application Ser. No. 12/925,114 filed Oct. 14, 2010; and U.S. application Ser. No. 12/930,724 filed Jan. 14, 2011.

Application Ser. No. 13/065,375 is a continuation of U.S. application Ser. No. 12/799,551 filed Apr. 27, 2010, which is a continuation of U.S. application Ser. No. 12/291,839 filed Nov. 13, 2008, now U.S. Pat. No. 7,712,657, which claims benefit of U.S. Provisional Applications 61/002,833; 61/002,834; 61/002,841; 61/002,854; 61/002,860; 61/002,861; 61/002,863; 61/002,875; and 61/002,907, each of which was filed Nov. 13, 2007.

Application Ser. No. 13/066,323 is a continuation of U.S. application Ser. No. 11/360,008 filed Feb. 21, 2006, which claims benefit of Provisional Applications 60/655,728 and 60/657,104 filed Feb. 22, 2005. Application Ser. No. 11/360,008 is also a continuation-in-part of U.S. application Ser. No. 10/390,342, filed Mar. 17, 2003, which claims the benefit of U.S. Provisional Application 60/365,434, filed Mar. 18, 2002.

Application Ser. No. 12/925,114 is a continuation of U.S. application Ser. No. 11/732,410 filed Apr. 3, 2007, which claims benefit of U.S. Provisional Application 60/790,193 filed Apr. 6, 2006. Application Ser. No. 11/732,410 is a continuation-in-part of U.S. application Ser. No. 11/360,007 filed Feb. 21, 2006, which claims benefit of U.S. Provisional Applications 60/655,728 and 60/657,104 filed Feb. 22, 2005; Ser. No. 11/100,149 filed Apr. 5, 2005, which claims benefit of U.S. Provisional Application 60/560,100 filed Apr. 6, 2004; and Ser. No. 11/100,148 filed Apr. 5, 2005, which claims benefit of U.S. Provisional Application 60/560,054 filed Apr. 6, 2004.

Application Ser. No. 12/930,724 is a continuation of U.S. application Ser. No. 12/800,184 filed May 10, 2010, which is a continuation of U.S. application Ser. No. 12/584,491 filed Sep. 4, 2009, which claims benefit of U.S. Provisional Application 61/270,359 filed Jul. 6, 2009.

Application Ser. No. 12/584,491 is a continuation-in-part of U.S. application Ser. No. 12/455,602 filed Jun. 3, 2009, which is a continuation of U.S. application Ser. No. 11/370,513 filed Mar. 7, 2006, which claims benefit of U.S. Provisional Application 60/660,070 filed Mar. 9, 2005. Application Ser. No. 11/370,513 is a continuation-in-part of U.S. application Ser. No. 10/832,960 filed Apr. 27, 2004, which claims benefit of U.S. Provisional Application 60/560,674 filed Apr. 7, 2004. Application Ser. No. 10/832,960 is a continuation-in-part of U.S. application Ser. No. 10/601,813 filed Jun. 23, 2003, which claims benefit of U.S. Provisional Application 60/429,478 filed Nov. 26, 2002.

Application Ser. No. 12/584,491 is also a continuation-in-part of U.S. application Ser. No. 12/315,840 filed Dec. 5, 2008, which is a continuation of U.S. application Ser. No. 11/895,976 filed Aug. 28, 2007, which is a divisional of U.S. application Ser. No. 11/714,615 filed Mar. 6, 2007, which is a divisional of U.S. application Ser. No. 11/415,531 filed May 2, 2006, which is a divisional of U.S. application Ser. No. 10/795,926 filed Mar. 8, 2004, which is a continuation-in-part of U.S. application Ser. No. 09/826,675 filed Apr. 5, 2001, which is a divisional of U.S. application Ser. No. 09/076,051 filed May 11, 1998, which claims benefit of U.S. Provisional Application 60/082,299 filed Apr. 17, 1998.

Application Ser. No. 12/584,491 is also a continuation-in-part of U.S. application Ser. No. 11/975,907 filed Oct. 22, 2007, which claims benefit of U.S. Provisional Applications 60/918,453; 60/918,455; and 60/918,458, each of which was filed Mar. 16, 2007.

The disclosures of all of the above mentioned applications are herein incorporated by reference in their entirety.

TECHNICAL FIELD

This invention relates to banking systems controlled by data bearing records, and may be classifiable in U.S. Class 235, Subclass 379.

BACKGROUND OF INVENTION

Automated banking machines may include a card reader that operates to read data from a data bearing record such as a user card. Automated banking machines may operate to cause the data read from the card to be compared with other computer stored data related to the card bearer or the bearer's financial accounts. The machine operates in response to the comparison determining that the bearer record corresponds to an authorized user and/or a financial account, to carry out at least one transaction which may be operative to transfer value to or from at least one account. A record of the transaction is also often printed through operation of the automated banking machine and provided to the user. Automated banking machines may be used to carry out transactions such as dispensing cash, the making of deposits, the transfer of funds between accounts, and account balance inquiries. The types of banking transactions that may be carried out are determined by the capabilities of the particular banking machine and system, as well as the programming of the institution operating the machine.

Other types of automated banking machines may be operated by merchants to carry out commercial transactions. These transactions may include, for example, the acceptance of deposit bags, the receipt of checks or other financial instruments, the dispensing of rolled coin, or other transactions required by merchants. Still other types of automated banking machines may be used by service providers in a transaction environment such as a bank to carry out financial transactions. Such transactions may include for example, the counting and storage of currency notes or other financial instrument sheets, the dispensing of notes or other sheets, the imaging of checks or other financial instruments, and other types of transactions. For purposes of this disclosure an automated banking machine or an automated taller machine (ATM) shall be deemed to include any machine that may be used to carry out transactions involving automated transfers of value.

When banks are open for business, customers begin to enter the bank. The bank usually has no advance notice when a banking customer is going to enter the bank or how many customers will enter the bank for any given time period. At the time a banking customer enters a bank the bank has no way of knowing which type of transaction the banking customer is going to request, or if the banking customer will be requesting multiple transactions. If all customers currently in a bank approach the teller or any other human or machine resource of the bank at the same time, that banking resource may become overburdened and unable to process all the banking customer requests in a timely matter. Long wait times may occur and the banking customers at the end of a line for a particular banking service may have a negative banking experience.

When a banking customer enters a bank, he may not know where to proceed to conduct a particular banking transaction. The banking customer may need to resort to looking for signs pointing him to the area of the bank to conduct the particular transaction he desires to conduct. Alternatively, the banking customer may need to resort to looking for a map of the banking branch or facility so he may determine from a map where to conduct his transaction.

When a banking customer enters a bank branch, he often will want to conduct multiple transactions. The banking customer may have no way of knowing which bank resources are busy and which are available. The banking customer may just have to guess or just pick the transaction to conduct first by random thought process. If the banking customer guesses in a way that directs him to a resource for which there is a long wait, he will spend more time to complete his transactions.

Often when the banking customer needs to personally speak with a person who has more than just clerical authority, such as a banking officer, that officer may be busy. The banking customer may need to wait in a waiting area. The banking customer may leave the waiting area to talk with a friend, use the restroom, or simply get tired and leave the bank. Also, when the busy banking officer becomes free, the officer may go to the waiting area to greet the banking customer waiting to see them. However, because the bank officer often does not know what the waiting banking customer looks like, the bank officer needs to resort to calling the customer's name near the waiting area. The banking officer often may not have any way of knowing if the banking customer has left the waiting area or the bank.

For many banking transactions such as opening a new account, banking customers need to provide the bank information about themselves. Typically, a banking officer may call the banking customer to the banking officer's desk and then begin to ask the banking customer a lot of questions. For example, the bank officer may ask the banking customer for the customer's name, address, phone numbers, place of employment, who in the family may access the account, and then a series of questions about what type of account the customer is interested in opening. Sometimes as the banking customer provides the information to a banking officer, mistakes are made when the banking officer enters the banking customer information into the banking computer systems. The officer may hit the wrong keyboard key, and because the banking customer may not be looking at the computer screen the officer is looking at, the error goes undetected. Other banking customers may speak with an accent that is hard for the banking officer to understand, so errors may be entered into the banking computer system because of a misunderstanding between the banking customer and banking officer.

Bank tellers and officers often need to follow a precise sequence of events to properly process a banking customer banking request. There may be a certain sequence of steps to authenticating checks and a different sequence of steps to issue a certificate of deposit. Because banking employees need to follow many different sequences for many different types of banking transactions, sometimes steps are omitted or performed incorrectly. Often several different forms are filled out for each of a variety of banking transactions. Because banking employees need to know which of several forms correspond with each transaction, mistakes are made by forgetting to fill out a form, filling out the wrong form or making a mistake while filling out a form.

Banking machines, systems, and customer service may benefit from improvements.

OBJECTS OF EXEMPLARY EMBODIMENTS

It is an object of an exemplary embodiment to provide an automated banking apparatus that operates responsive to data read from data bearing records.

It is an object of an exemplary embodiment to provide an apparatus that utilizes data read from data bearing records to facilitate the carrying out of financial transactions.

It is an object of an exemplary embodiment to provide apparatus that improves customer banking transactions.

It is a further object of an exemplary embodiment to provide apparatus that improves the banking customer banking experience.

It is a further object of an exemplary embodiment to provide apparatus and methods to more efficiently use bank personnel and resources.

It is an object of an exemplary embodiment to provide apparatus and methods to efficiently collect banking customer information.

It is an object of an exemplary embodiment to provide apparatus and methods to guide a banking customer to the location of a particular banking transaction resource.

It is an object of an exemplary embodiment to provide apparatus and methods to reduce the errors entered into a banking computer system while collecting customer information.

It is an object of an exemplary embodiment to provide apparatus and methods to reduce the overall time a banking customer spends in a bank conducting banking transactions.

It is an object of an exemplary embodiment to provide apparatus and methods for a banking employee to recognize and personally greet a banking customer.

It is an object of an exemplary embodiment to provide apparatus and methods for a banking employee to provide better assistance and service to a banking customer.

It is an object of an exemplary embodiment to provide apparatus and methods to track a banking customer within a bank location.

It is an object of an exemplary embodiment to provide apparatus and methods to improve how a banking customer accesses data with a computer.

It is an object of an exemplary embodiment to provide apparatus and methods to allow more than one person to access and modify the same banking data through the same device at the same time.

It is an object of an exemplary embodiment to provide apparatus and methods to begin a banking transaction before a banking customer arrives at a bank transaction location.

It is an object of an exemplary embodiment to provide apparatus and methods to recognize high value banking customers and tailor a response to process their banking transactions.

It is an object of an exemplary embodiment to provide apparatus and methods for verifying if a certain customer is at a certain place at a banking location.

It is an object of an exemplary embodiment to provide apparatus and methods to reserve banking resources for a banking customer and to indicate those resources are reserved.

It is an object of an exemplary embodiment to provide apparatus and methods to secure different banking areas according to different groups of people or resources.

It is an object of an exemplary embodiment to provide apparatus and methods to route a banking customer to a bank or within a bank.

It is an object of an exemplary embodiment to provide apparatus and methods to route a banking customer from one banking transaction to the next banking transaction.

Further objects of exemplary embodiments will be made apparent in the following Description of Exemplary Embodiments.

The foregoing objects are accomplished in exemplary embodiments by a system which includes one or more welcome terminals near the customer entrance of a bank facility. In the exemplary embodiment the welcome terminal may be operatively connected to one or more branch bank computers. A welcome terminal may alternatively be referred to herein as a greeting terminal. For purposes of this disclosure, reference to a single computer shall include multiple computers and vice versa. The bank branch computer may be operative to monitor banking resources of the branch bank. For purposes of this disclosure, a "resource" of the bank facility refers to people or things that a banking customer uses or interacts with in order to carry out a transaction or a portion of a transaction. Thus resources may include, for example, an automated teller machine (ATM), an electronic kiosk, or other electronic terminal which may receive inputs from or provide outputs to the customer. Resources also include bank tellers who perform transactions for users, as well as teller stations at which a user may communicate with a teller or perform other actions. Resources may also include banking officers of the type previously discussed, who perform tasks other than the clerical or routine banking tasks that are performed by tellers for customers who stand in a line or otherwise have the service perform at a teller station. As previously discussed, banking officers may generally participate in more involved types of transactions or business activities with the customer than are conveniently conducted in a teller line. Of course, these types of banking resources are exemplary of resources that may be utilized within a banking facility.

In an exemplary arrangement, a banking customer enters the branch bank. The welcome terminal may be operative to provide outputs that prompt the banking customer to provide inputs to the terminal that indicate what banking transactions the banking customer would like to perform. In the exemplary embodiment the terminal operates to cause the availability of the banking resources corresponding to the requested customer transaction or transactions to be determined. This may be done through operation of the terminal and the at least one branch bank computer. In response to the determination, the terminal may direct the banking customer to the location of a resource needed to conduct a banking transaction that the computer has determined to be the most likely to be available to conduct the customer's desired transaction at the earliest time.

In some exemplary embodiments when the banking customer indicates to the welcome terminal the desire to perform a task that will involve the provision of customer data, the user terminal may operate responsive to the at least one branch bank computer to begin prompting the user to input to the terminal at least some of the data needed. The terminal operates in response to its programming to prompt the user to provide inputs to input devices on the terminal that correspond to at least some of the data needed for purposes of conducting the transaction. After such data has been input, the terminal thereafter operates to provide outputs to the user to direct the user to the resource in the banking facility that can complete the transaction desired by the user. When the banking customer eventually reaches the resource to execute the banking transaction needing the data entered at the welcome terminal, the bank computer system may operate to have already transferred that data from the welcome terminal to the resource at the transaction location.

In some exemplary embodiments while the banking customer may be operating the welcome terminal, a picture or image may be captured of the banking customer. This may be done using equipment that described in U.S. Pat. No. 6,583,813, the disclosure of which is herein incorporated by reference. The apparatus used to capture the image may thereafter cause the image to be output on a terminal or similar device to a bank employee who is responsible for carrying out a transaction requested by the customer. A banking employee may use the image to later find the banking customer. When the banking employee recognizes the banking customer from the image, the banking employee may personally greet the banking customer by name. In some exemplary embodiments the banking customer will be prompted through outputs from the welcome terminal on how to proceed from the welcome terminal to a waiting area or to a first transaction area associated with a banking resource. In some exemplary embodiments a computer in operative connection with the welcome terminal may compare the transactions the banking customer has indicated the customer wants to perform with the availability of the resources to perform those transactions. The transaction that could be performed the earliest may be determined through operation of the computer. The banking customer may then be prompted by outputs through an output device or by a banking resource how to proceed from the first transaction area to the next transaction area.

In some exemplary embodiments the banking customer may be tracked while moving about the banking facility. This may be done to allow the banking customer to be more readily found by a banking employee. In some exemplary embodiments the banking customer may be tracked with cameras and image recognition software. This may be done using a system like that described in the incorporated disclosures. This could be done through software that recognizes facial images. In other exemplary embodiments the banking customer may be tracked with cameras near floor level using software that can recognize a customer's shoe or shoes among different shoe patterns. In still other embodiments the banking customer may be tracked by an imaging system that operates to recognize features unique to the customer such as clothing or movement or style of walking that may be unique to that customer. In yet some other exemplary embodiments the banking customer may be tracked by sensors in the floor that detect the weight shifting caused by the user's walking pattern over an array of weight or other sensors as the banking customer walks across the banking surface. In yet some other exemplary embodiments, the banking customer may be tracked by movement of the customer's shoe images with low level cameras. In some exemplary embodiments the banking customer may be tracked by the way the banking customer walks or by a distinctive stride of the banking customer. In other exemplary embodiments, the banking customer may be tracked through the operation of multiple types of sensors of the type previously described. As can be appreciated, imaging systems, a plurality of sensors such as those operative to sense weight, location or other features, may be in operative connection with one or more computers. The computers operate responsive to the sensed information to determine the movement of and the then current position of the particular banking customer. Of course these approaches are exemplary.

In some exemplary embodiments after the banking customer indicates a desired transaction through one or more inputs at the welcome device, and the banking computer system determines the first transaction, a reservation indication may be placed at the first transaction resource or location.

In some exemplary embodiments a reservation indication may be given to an output device at the designated transaction resource or location, which output device is in operative connection with the at least one computer. The output device may operate to display the name or other identifying data associated with the banking customer, to advise the customer of the location of the resources where the customer is to conduct the transaction.

An exemplary embodiment may include a method of processing banking customer transactions that includes the steps of: (a) prompting a banking customer through outputs at a welcome terminal located near the bank entrance, to provide inputs to the terminal corresponding to the types of transactions the banking customer may want to perform; (b) capturing an image of the banking customer responsive to operation of the at least one computer while the banking customer may be at the welcome terminal; (c) determining with at least one computer responsive to the input received in step (a), which banking transaction will be processed first and where to route the banking customer; (d) directing through operation of the terminal, the banking customer to a first location; (e) outputting the image of the banking customer captured in (b) through an output device to a bank employee; (f) tracking the banking customer in at least one location through operation of at least one computer; and (g) operating the at least one computer to cause the at least one location of the banking customer on a handheld device operated by the bank employee whereby the banking employee can find the banking customer.

In another exemplary embodiment a method of processing banking customer transactions includes the steps of: (a) prompting a banking customer at a welcome terminal located near the bank entrance to input the types of transactions the banking customer may want to perform; (b) receiving the input from the banking customer corresponding to the desired transactions; (c) capturing an image of the banking customer while the banking customer may be at the welcome terminal; (d) processing the input received in step (a) to determine which banking transaction will be processed first and where to route the banking customer; (e) routing the banking customer to a first location; (f) transmitting the data entered by the banking customer to the banking resources that will handle the first banking transaction, wherein the first banking transaction may begin before the banking customer arrives at the first transaction location; (g) transmitting the image of the banking customer to a bank employee; (h) processing the first transaction; (i) determining which banking transaction may be processed second; (j) transmitting the data entered by the banking customer to the banking resource that will handle the banking transaction that was determined to be processed second, wherein the banking transaction to be processed second may begin before the banking customer arrives at the second transaction location; and (j) routing the banking customer to a second location corresponding to where the banking resource for the second transaction is located. In some exemplary embodiments when the banking customer is routed to the second location, the banking customer may be presented a map or floor plan of the bank and an indication of how to proceed from the first location to the second location. In the exemplary embodiment a position at the second location may be reserved for the banking customer and may be marked with a display output or other output indicating that the position is reserved for the banking customer and may include the name of the banking customer.

In some exemplary embodiments a banking computer system including at least one computer may be used to process banking customer transactions. A computer may be in operative connection with at least one banking database which is alternatively referred to herein as a data store. The database may include data corresponding to banking customer data and banking transactions. A computer may be operatively connected to at least one transaction terminal or automated banking machine. In some exemplary embodiments a computer may be operative to communicate with a mobile banking customer device such as a cell phone operated by a user remotely located from the bank. A computer may be operative to receive requests for banking transactions from a customer through operation of the mobile device. A computer may be operative to determine the closest bank that has the resources to process all the selected transactions. A computer may be operative to determine a first location for processing the first transaction. In some exemplary embodiments a computer may be operative to reply and cause the banking customer mobile device to prompt the banking customer to input into the banking customer mobile device the information needed for the requested banking transactions. A computer may be in operative connection with the at least one transaction terminal at the first location to cause a copy of information input through the banking customer mobile device to be transferred to the at least one transaction terminal or automated banking machine at the first location. The processing of the first transaction may begin at the first location before the banking customer arrives at the first location.

In some exemplary embodiments the first location may be the location of the nearest branch bank to the banking customer that has the resources to handle each of the requested transactions. In some embodiments the nearest branch bank may include a mobile branch bank which may be selectively located by the bank at different locations during different days or other time periods. In some exemplary embodiments a computer may be operative to cause the mobile device of the banking customer to display a map of how to proceed to the first location. In some exemplary embodiments a computer may be operative to retrieve data corresponding to a saved image and/or biometric data for the banking customer from a banking database, and transfer the image and/or data to the resource at the first location at the bank where the first transaction will be performed. In some exemplary embodiments a computer may be operative to assist in processing the first transaction at the first location.

In some exemplary embodiments a computer may be operable to determine one or more subsequent transactions which correspond to uncompleted transactions the banking customer requested through a mobile device or other input device. A computer may be operative to determine a second resource and associated location for processing the second transaction. A computer may be operative to communicate with and cause the mobile banking customer device to prompt the banking customer as to how to proceed to the second location. In some exemplary embodiments a reservation for the banking customer at the second location may be created in a data store through operation of the computer before the first banking transaction may be completed by the first resource at the first location. The processing of the second transaction may be started by the at least one computer before the first transaction may be competed or the banking customer arrives at the second location.

In some exemplary embodiments a computer may be operable to track the banking customer within and/or in proximity to the bank. In some exemplary embodiments the cameras inside the bank may be operatively connected to at least one computer. The at least one computer may be operable to track the banking customer within the bank using data corresponding to images captured from the cameras and image tracking software running on a computer.

In some exemplary embodiments the computer may be operably connected to a transaction terminal such as an automated banking machine at the first location. The transaction terminal may be operable to prompt a banking employee with outputs through a display that includes a summary of what needs to be accomplished to process the transaction. The computer may also be operably connected to the transaction terminal to present a list of steps to the banking employee in a fixed order.

In some exemplary embodiments the name of the banking customer may be displayed through an output device at the first location in response to operation of the computer. In some exemplary embodiments the first location may be resource which comprises a drive-through lane and a computer may be operative to reserve a drive-through lane for the banking customer. In some exemplary embodiments a computer may be operable to display the name or other identifier of the banking customer on a suitable output device or electronic display or sign to reserve the drive-through lane for the banking customer.

In some exemplary embodiments a computer may be operable to recognize when the banking customer approaches the bank. In some exemplary embodiments a computer may be operable to recognize the banking customer when the banking customer approaches the bank using data corresponding to images captured from the cameras and image analysis software such as facial recognition software running on a computer.

In some exemplary embodiments a computer may be operable to generate a one-time password or other identifying sequence of characters and send it to the banking customer mobile device. A computer may be in operable connection with a banking resource, and may be operable to verify that the banking customer may be located at the at least one banking resource when the banking customer enters the sequence through an input device at the at least one banking resource. In some exemplary embodiments the sequence may consist of digits and the banking resource may operate to dispense currency.

An exemplary embodiment may include a method of processing banking customer transactions that includes the steps of: (a) receiving at least one input from a banking customer mobile device, before the banking customer arrives at a bank, corresponding to the types of transactions the banking customer would like to perform; (b) accepting data entered by the banking customer on a mobile device that corresponds to the banking transactions requested; (c) processing the at least one input to determine which banking transaction will be processed first and where to route the banking customer; (d) transmitting the data entered by the banking customer to the banking resource that will handle the banking transaction that was determined by the computer to be the banking transaction to be processed first, wherein the banking transaction to be processed first may begin before the banking customer arrives at the first transaction location; (e) routing the banking customer to a first location as the banking customer arrives at the bank; (f) detecting when the banking customer arrives at the bank transaction location; (g) generating and presenting to the banking customer a one-time message to be used to verify the banking customer may be at the first location; (h) verifying that the banking customer may be at the first location; (i) processing the first transaction.

Some exemplary embodiments that operate to process customer banking transactions may use a banking computer system with at least one computer. A computer may be in operative connection with at least one banking database. The at least one banking database includes data which corresponds to banking customer data and banking transactions. A surface computer may be in operative connection with a banking computer and a banking database. In some exemplary embodiments the display surface computer itself may comprise an interface surface that allows multiple users to interact with the computer by providing inputs and outputs by viewing and through touching the surface. The surface computer may be adapted to allow a banking customer to selectively cause the display of indicia corresponding to banking services on the display surface, and may be operative to allow a banking customer to organize and compare the accessed banking services. In some exemplary embodiments the surface computer may be operative to allow the banking customer to view indicia corresponding to different features of the displayed banking services. In some exemplary embodiments the surface computer includes an interface adapted to allow a banking customer to select one of the banking services to be performed by touching the display surface.

In some exemplary embodiments the surface computer may have its input/output display surface comprised of a table top, or the surface computer may have its user interface on or in a wall. In some embodiments the display surface may include a single panel, while in other embodiments the display surface comprises multiple panels in a generally planar arrangement. In some exemplary embodiments the surface computer is in operative connection with an image capture device or other sensing device that senses inputs that are operative to cause the computer to recognize the banking customer and to automatically access data corresponding to banking services stored in the banking database that the recognized banking customer commonly performs. In some exemplary embodiments the banking customer may be recognized by identifying data corresponding to an image of the banking customer. In some exemplary embodiments the banking customer image may be recognized by a computer running facial or other image recognition software, and the banking customer image may be captured using a camera. The camera may be in connection with the surface computer. In other exemplary embodiments the banking customer may be recognized by one or more sensors that operate to capture data usable to recognize a mobile device or other item placed on the input/output surface computer belongs to or is uniquely associated with the particular banking customer. The mobile device may be a cell phone, laptop computer, or a personal digital assistant, for example.

In some exemplary embodiments the surface computer may include interfaces adapted to allow the banking customer to transfer data from the mobile device to the surface computer. The surface computer may operate or enable the banking customer to transfer data from the surface computer to the mobile data device. Such suitable interfaces for data transfer may include for example, radio frequency (RF) interfaces, infrared (IR) interfaces, photo sensor type interfaces, or other suitable interfaces that are operative to enable data to be passed between the surface computer and the mobile device. The surface computer may provide a visual interface that allows a banking customer to touch an icon corresponding to the data or instructions on the display surface computer and drag the icon to a zone around or adjacent the mobile device while the mobile device may be in contact with or adjacent to the display surface of the surface computer. In some exemplary embodiments the surface computer may be adapted to allow a banking customer to access existing banking account information. The surface computer may be adapted to display account information through outputs on the display surface of the computer.

In some exemplary embodiments a surface computer may be adapted to allow a banking customer to display banking account information stored on the banking database on the display surface. In some exemplary embodiments when the banking customer may be opening a new banking account, the surface computer may be operative to allow a banking customer and a banking employee to view and enter data on a common area of the display surface of the surface computer. In some exemplary embodiments the surface computer may be programmed to accept simultaneous inputs from both a bank employee and a customer through the display surface. In other exemplary embodiments multiple customers may conduct concurrent transactions at disposed areas of the display surface.

An exemplary embodiment may include a method of processing banking customer transactions with a surface computer that includes the steps of: (a) providing an interface allowing a banking customer to access banking services stored in a banking database through a surface computer; (b) displaying the accessed banking services through the surface computer; (c) providing an interface operative to allow a banking customer to organize and compare the accessed banking services through operation of the surface computer and to compare different features of the displayed banking services; (d) providing an interface operative to allow a banking customer to select one of the banking services through the surface computer to be performed; (e) recognizing a particular banking customer; (f) accessing banking services stored in the banking database through a surface computer that the recognized customer commonly performs; (g) providing an interface to allow the banking customer to transfer data from the mobile data device to the surface computer; and (h) providing an interface to allow the banking customer to transfer data from the surface computer to the mobile data device.

In some exemplary embodiments high value customers are identified when they arrive at the bank. When a high value customer (e.g., a VIP customer) is detected, then special banking facilities are reserved for them. In some exemplary embodiments the facilities reserved are for the types of transactions commonly reserved by the detected high value banking customer. In some exemplary embodiments the high value customer may be detected by a data bearing record which comprises a personal identification device given to the particular banking customer by the bank (or banking entity). In some exemplary embodiments the personal identification device may be a radio frequency identification (RFID) output device that outputs identifying radio signals that may be detected when the banking customer approaches or enters the bank. In other exemplary embodiments the personal identification device may be a near field communication (NFC) output device that outputs encrypted data a short distance and may allow for simplified transactions, data exchange and/or wireless connections between two devices in close proximity to each other.

In some exemplary embodiments a banking computer system may be used to create personal outputs or responses when communicating with a banking customer during a banking transaction. In some exemplary embodiments a banking computer system is in operative connection with at least one banking database. The database may include data corresponding to banking customer data and different types of banking accounts. In some exemplary embodiments at least one banking transaction terminal such as an automated banking machine is inside a bank, and a banking customer would approach the terminal to conduct a banking transaction. The banking transaction terminal contains a projector suitable for projecting an image that would be perceivable by the banking customer. A camera may be used that is adapted (operable) to capture images of the banking customer approaching or at the at least one banking transaction terminal. A software application running on a computer can be configured to use the images captured by a camera to identify the banking customer when the banking customer approaches the banking transaction terminal. In some exemplary embodiments a computer can be capable of retrieving the personal data about the banking customer from a database of personal information in operative connection with the computer system. The computer may retrieve the personal data of the banking customer to generate one or more personalized messages to the banking customer. A computer can be adapted to generate messages to a banking customer by using previous banking customer responses.

In some exemplary embodiments the projected image can be the image of a person. The projected image can be of a person of the opposite sex of the banking customer. Alternatively, the projected image can be of a person with similar age, appearance, weight, interests and social status to the banking customer. The projected image can be an image projected on a screen.

In some exemplary embodiments the projected image may comprise a three-dimensional hologram. In some exemplary embodiments the banking customer responses are stored in the banking database for subsequent use.

In some exemplary embodiments one or more computers may be configured to analyze the images, such as facial expressions, of the banking customer to determine the mood of the banking customer, so the response to the banking customer can be tailored to the mood of the banking customer. The computer can be adapted to analyze images of the banking customer to recognize a secondary characteristic such as: an item of clothing the banking customer is wearing, a new watch the banking customer has on, a new hair style, weight loss, new jewelry and another person accompanying the banking customer to the bank. When a secondary characteristic is detected, the generated messages to the banking customer may make reference to or be resolved based on the secondary characteristic.

In some exemplary embodiments one or more computers can be adapted to be in operative connection with a computer database which includes data corresponding to current weather data, recent news stories, and sporting event results. The computer can be operative responsive to selected items of this data to generate tailored messages to the banking customer. In some exemplary embodiments the database records corresponding to the personal information of the banking customer can be updated with each response received from the banking customer in response to output messages.

In some exemplary embodiments one or more computers can be operative (operable) to analyze images and movements or actions of the banking customer and resolve patterns that indicate when the banking customer may be in a hurry. When the banking customer is in a hurry then the responses generated by the at least one computer may be made quicker and shorter. In some exemplary embodiments the computer can be configured to analyze the images of the banking customer, recognize when the banking customer may be in need of medical care, and generate responses tailored to the medical care needs.

In another exemplary embodiment a method for providing a personal response to a banking customer includes the steps of: (a) recognizing a personal identity of a banking customer when the customer arrives at a bank, through operation of at least one computer; (b) presenting an image to the banking customer responsive to operation of the at least one computer; (c) retrieving personal data about the banking customer from a database in operative connection with the at least one computer; (d) giving the banking customer a personal welcome greeting through at least one output device responsive to operation of the at least one computer; (e) responding to a response from the banking customer through operation of the at least one computer, responsive to the banking customer response and the retrieved personal data to determine a tailored personal response to the banking customer; (f) storing data corresponding to the responses of the banking customer in the banking database for subsequent use; (g) analyzing images of the banking customer through operation of the at least one computer to determine the banking customer's mood so a response to the banking customer may be tailored to the mood of the banking customer; (h) analyzing images of the banking customer through operation of the at least one computer to recognize a secondary characteristic and when a secondary characteristic is detected, the response to the banking customer may be tailored to the secondary characteristic; (h) using through operation of the at least one computer current weather data, recent news stories, and sporting event results to tailor a message to the banking customer; (i) updating the personal database of the banking customer through operation of the at least one computer with a response from the banking customer; (j) analyzing images of the banking customer through operation of the at least one computer and determining that the banking customer is in a hurry, and when the banking customer is determined to be in a hurry, generating responses that are at least one of quicker and shorter; and (k) analyzing images of the banking customer through operation of at least one computer and determining when the banking customer is in need of medical care and tailoring the response to the medical care needs.

In some exemplary embodiments bank security may be improved through operation of a banking computer system with at least one computer. The computer can be in operative connection with a reader device, a plurality of banking resources, and at least one banking database. The banking database may include data corresponding to banking customer data and different types of banking accounts. A detection device can be used that is operative to detect a person entering the banking office. In some exemplary embodiments the banking computer system may assign a security level to the person detected entering the bank. A higher security level has access to more or different banking facilities or operations than a lower security level. In some exemplary embodiments the banking computer system can be operative to activate different banking resources corresponding to the level of security assigned to the person.

In some exemplary embodiments the detection device may provide data that causes a computer to operate to identify the person entering the bank office. The detection device and computer can be operative to recognize the person entering a bank responsive to face recognition software operating in at least one computer using images captured by cameras. The banking computer system may also be operative responsive to image or other data to track the person as he roams within the bank.

In some exemplary embodiments the at least one computer in operative connection with a detection device may identify the person by a radio signal emitted by a mobile device associated with the person. In some other exemplary embodiments the person can be recognized through operation of at least one computer responsive to sensing indicia on a card assigned to the person by the bank.

In some exemplary embodiments the banking resources operated by banking customers may include for example, one or more of computer terminals, information kiosks, computer databases, account information, safety deposit boxes, drawers, office spaces, storage areas, automatic banking machines, teller areas, safety deposit box areas, and vault areas. In some exemplary embodiments the security levels and access rights correspond to whether the person is designated as a high value customer, standard customer, new customer, management banking employee, supervisory bank employee, teller or other bank employee. In some exemplary embodiments only banking resources adjacent to the person are activated according to the security level of the person. In some exemplary embodiments only a banking resource immediately adjacent a person is activated if the person has the proper security level to operate that resource.

In some exemplary embodiments a detection device is operative to detect a person entering the banking office. The person entering the bank has been assigned to a designated one of a plurality of groups of people, where each group is assigned a different security or privileges level. A higher security level has access to more or different banking facilities or functions than a lower security level. In some exemplary embodiments the bank facility may be segmented into a plurality of security zones. A banking computer system can be operative to activate different banking resources within a security zone corresponding to the level of security or privilege of the people within that zone.

In some exemplary embodiments the security zones correspond to one or more of bank employee office spaces, teller areas, safety deposit box areas, automated banking machines, vaults, and/or public areas. In some exemplary embodiments the groups of people and access rights may correspond to high value customers, standard customers, new customers, management banking employees, supervisory bank employees, tellers and other bank employees. The level of security of high value customers and access rights may be greater than the security level for regular customers; the security level for regular customers and access rights may be higher than the security level for new customers; the security level and access rights for managers may be higher than the security level for supervisory bank employees; the security level and access rights for supervisory bank employees may be higher than the security level for tellers; and the level of security and access rights for tellers may be higher than the level for other bank employees.

In some exemplary embodiments the banking resources and capabilities accessed may be one or more of computer terminals, kiosks, customer stations, computer databases, account information, safety deposit boxes, drawers, office spaces, storage areas, automatic banking machines, teller areas, safety deposit box areas, and vault areas. The computer databases include a plurality of sub-databases, where each sub-database is assigned to a security level.

In some exemplary embodiments the bank employee with a higher security level or greater access rights may override a lower security level person with regard to using a banking resource that the employee needs to access if a person with a lower corresponding security level may be in the same security zone.

In another exemplary embodiment a method of providing improved security in a bank includes the steps of (a) identifying through operation of at least one computer a person entering the banking office; (b) assigning a security level to the person detected through operation of the at least one computer; (c) activating different banking resources, through operation of the at least one computer, corresponding to the level of security assigned to the person detected; and (d) recognizing the person detected in step (b) through operation of the at least one computer.

In another exemplary embodiment a method of providing security in a bank includes the steps of (a) operating a computer to divide the bank facility into a plurality of security zones; (b) assigning people who access the bank facility into a plurality of security zones through operation of the computer; and (c) activating different banking resources within a security zone responsive to operation of the computer, to the levels of security of the people within that zone.

Of course it should be understood that the features and methods described are exemplary and in other embodiments other approaches may be used.

BRIEF DESCRIPTION OF DRAWINGS

FIG. 17 shows a side view of a shared station having dual touch screens.

FIG. 18 shows a top view of a bank that houses a bank teller station, bank customer stations, and a bank teller area.

FIG. 21 shows a top view of a banking enclosure with a terminal.

FIG. 22 shows a top view of a banking enclosure with a surface computer.

DESCRIPTION OF EXEMPLARY EMBODIMENTS

Incorporated herein by reference in their entirety are the disclosures of U.S. Pat. Nos. 7,438,220; 7,438,222; 7,438,221; 7,438,219; 7,431,204; 7,433,844; 7,431,206; 7,428,984; 7,424,972; 7,416,112; 7,418,592; 7,419,089; 7,419,093; 7,404,515; 7,405,724; and 7,392,937. These patents disclose devices and systems used to carry out banking transactions, as well as features, methods, and capabilities that may be used in connection with the exemplary devices, systems, and methods described herein.

Figure 1:
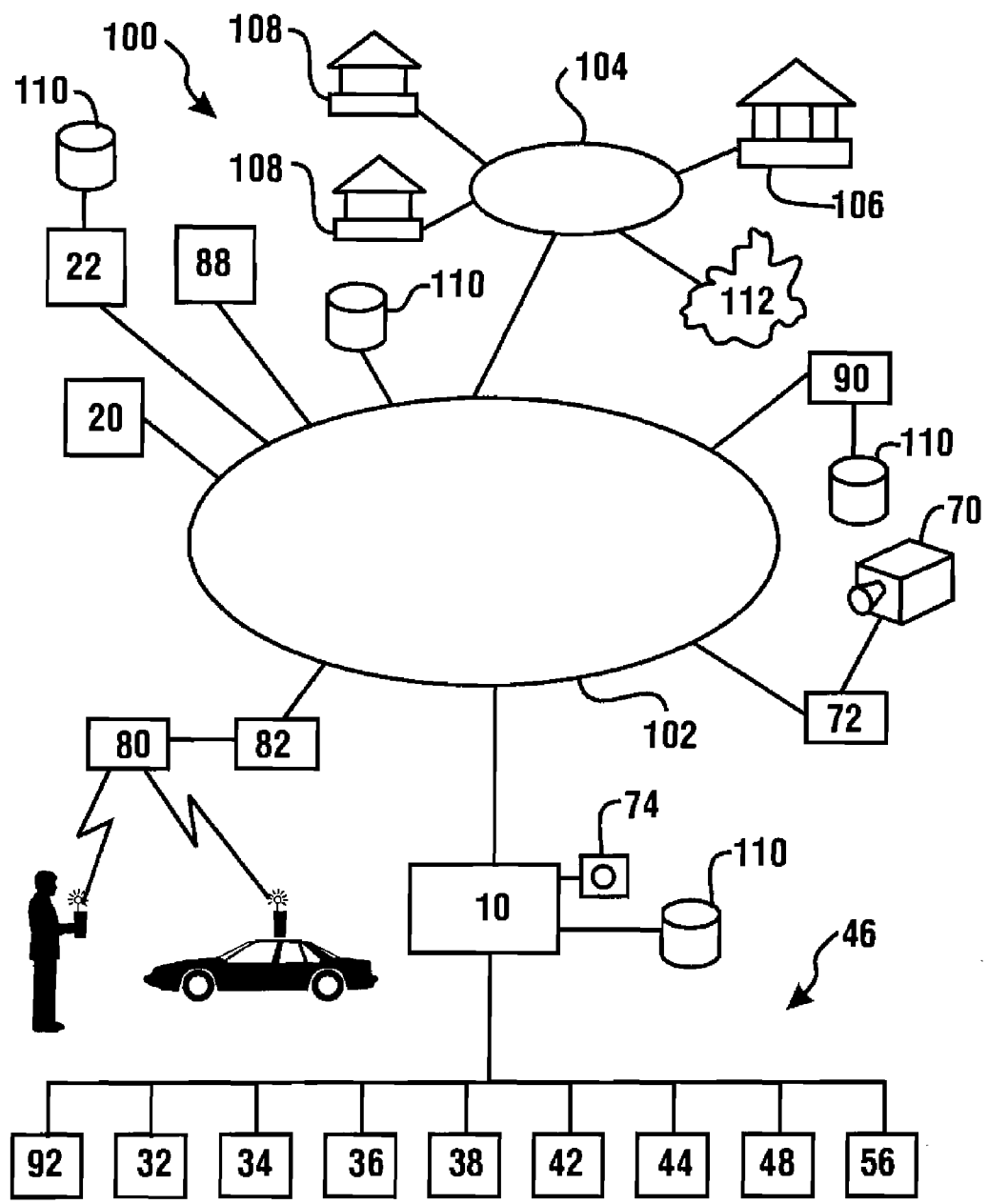
FIG. 1 is an example schematic representation of a computer system used in a banking operation.

Referring now to the drawings and particularly FIG. 1, there is shown an example schematic representation of a banking computer system 100. It should be understood that while only an exemplary number of each component of the banking computer system 100 may be shown in the exemplary banking computer system 100 of FIG. 1, in other exemplary embodiments the banking computer system 100 may contain any number of the same or different network components.

The exemplary embodiment may include a communication network 102. The network 102 may extend within a banking office building or other facility, or may be distributed among a plurality of banking office buildings or facilities. In the exemplary embodiment the network 102 comprises a data transport network environment such as a packet-switched TCP/IP-based global communication network. In the exemplary embodiment the network 102 may comprise a number of network devices such as routers, bridges, gateways, firewalls and any other device known in the art to allow the network 102 to be operable to provide communications between connected devices and systems. The network 102 may be a suitably comprised network including various message transport mechanisms such as, for example, Ethernet, Token-Ring, TM., 802.11, or other wire-based or mobile-based data communication mechanisms.

The network 102 may comprise a local area network (LAN), and can be operatively connected through a larger wide area network (WAN) 104. The WAN is in operative connection with one or more computers located at a host bank facility 106, and can be operatively connected to a plurality of computers located at other banking facilities 108. The WAN or LAN can also be operatively connected to the Internet 112.

A plurality of devices operative to conduct banking or other financial transactions are operatively connected to the exemplary network 102. A server 90 is operatively connected to the network that includes software running therein that causes the carrying out of banking transactions, operates to manage banking databases, and carry out other programmed functions. The server 90 can be connected to one or more data stores schematically represented as data storage device 110. The network can be directly operatively connected to one or more data storage devices 110.

Teller terminals 22 are operatively connected to the network 102. The teller terminals 22 may include computers with associated input and output devices or other devices that are operative to run software programs locally and can be connected to data storage devices 110. The exemplary teller 22 terminal may comprise a thin client software architecture in operative connection with a server running applications requested by the teller terminal 22. Alternatively the teller terminal may comprise a computer operative to run some applications locally therein while accessing other applications that are run remotely on another computer such as a server 90. In some exemplary embodiments teller terminals comprise automated banking machines. In the exemplary system, one or more banking computers 20 are operatively connected to the exemplary network 102. A banking computer 20 may comprise one of various forms of computers, including for example, a laptop, surface computer, desktop computer, embedded computer, self service terminal, automated banking machine, or handheld device operative to run applications useful in banking transactions.

The exemplary banking system 100 contains an automated banking machine 88 that in the exemplary embodiment performs the functions of a currency exchange terminal. The currency exchange terminal is in operative connection with the network 102. The terminal operates in accordance with its programming to carry out currency exchange transactions.

A welcome terminal 10 is schematically represented in FIG. 1, and discussed in more detail later, and is operatively connected to the network 102. The terminal 10 is in operative connection with one or more data stores schematically represented by data storage device 110. The welcome terminal 10 is operatively connected to a camera 74 which is operative to capture images. The welcome terminal may include features described in U.S. Pat. No. 6,583,813, which is herein incorporated by reference. Alternatively, the welcome terminal can be in operative connection with a separate computer or system which includes the features and capabilities of the incorporated disclosure. The exemplary welcome terminal 10 includes a plurality of input and output devices 46 operatively connected to at least one computer in the welcome terminal 10. Exemplary input devices may include a keypad 32, a keyboard 34, a mouse, 36, a microphone 42, biometric input device 56, a card reader 92 and an antenna 48. Exemplary output devices may include a speaker 38 and a display 44. The welcome terminal may also include a computer input and output device such as a touch screen. The terminal may also include other types of devices for reading data bearing records, such as an RFID reader, NFC device, document scanner, check reader, or other such devices for example. The welcome terminal 10 is operative to run software locally in its computer to cause the terminal to carry out all or portions of banking customer transactions. In some embodiments, welcome terminal 10 may comprise a thin client software architecture that may cause another computer such as a server 90, to cause the execution of software applications based on inputs to the terminal. The exemplary welcome terminal may include features like those in the incorporated disclosures and may have a computer including browser software operating therein. The computer architecture may operate to interpret and generate markup language documents for purposes of sending and receiving data and interface content which is exchanged with one or more remote computers. Of course this approach is exemplary.

The welcome terminal 10 is operative to display or communicate advertising tailored to a particular customer it may have detected and may have recognized. For example, in some exemplary embodiments the terminal may operate using features such as those described in U.S. patent application Ser. No. 11/827,966 filed Jul. 13, 2007. In such a system, for example, the user terminal may identify a user based on data read from a user card, other data bearing record that identifies the customer, and/or their financial accounts. Such identification of a customer from such inputs can be used to provide targeted output information through the welcome terminal in the manner of the incorporated disclosure. In some embodiments the welcome terminal may comprise an automated banking machine at which users can carry out transactions that include transfers of value. Some exemplary embodiments of the welcome terminals or other terminals connected in the system may include features and capabilities like those shown in U.S. patent application Ser. Nos. 10/449,096; 11/821,701; 11/899,846; 12/011,609; and 11/454,258, the disclosures of each of which are herein incorporated by reference in their entirety.

In some exemplary embodiments the exemplary banking computer system 100 can be further comprised of a plurality of cameras 70 operatively connected to one or more computers in the network. The cameras 70 are capable of capturing a series of images. For example, the cameras can be configured to capture data corresponding to visible and/or infrared images. The cameras in the exemplary embodiment can be operatively connected to the network 102 through a camera interface device 72 which may be of the type discussed in the incorporated disclosures. The camera interface device 72 may include a suitable network interface card or similar circuitry that enables the camera to operatively communicate with other computers and devices in the schematically indicated banking computer system 100.

In other exemplary embodiments, the terminal may include an optical card reader based on a camera or some other sensors built into the terminal. The terminal would be able to identify the user's card by merely viewing it through the optical card reader.

In some exemplary embodiments the banking computer system 100 may further contain one or more antenna 80 operatively connected to the network. The antenna 80 can be operatively connected to the network 102 through a mobile interface device 82. The mobile interface device 82 may include a suitable network interface card or similar mechanism that enables RF signals to be sent or received through the antenna 80. The interface and antenna enable RF communications with one or more computers schematically indicated banking computer system 100. The antenna 80 in the exemplary embodiment can operatively communicate with mobile devices internal or external to a banking facility such as cellular phones, laptop computers, handheld devices, and personal digital assistants (PDAs). The antenna 80 in exemplary embodiments may provide communication through one or more suitable mobile frequencies such as cellular, 802.11, and Bluetooth frequencies, for example.

For example, some exemplary embodiments may include features such as those described in U.S. Pat. Nos. 6,315,195; 6,702,181; 7,040,533; 7,201,313; 7,216,800; 6,905,072; 7,207,477; 7,418,427; 7,150,393; 7,025,256; 7,344,066; 7,392,938; and U.S. patent application Ser. No. 11/983,163 filed Nov. 7, 2007. The disclosures of each of these patents and application are herein incorporated by reference in their entirety. The features of these incorporated disclosures may be used in connection with systems in various embodiments.

Figure 2:
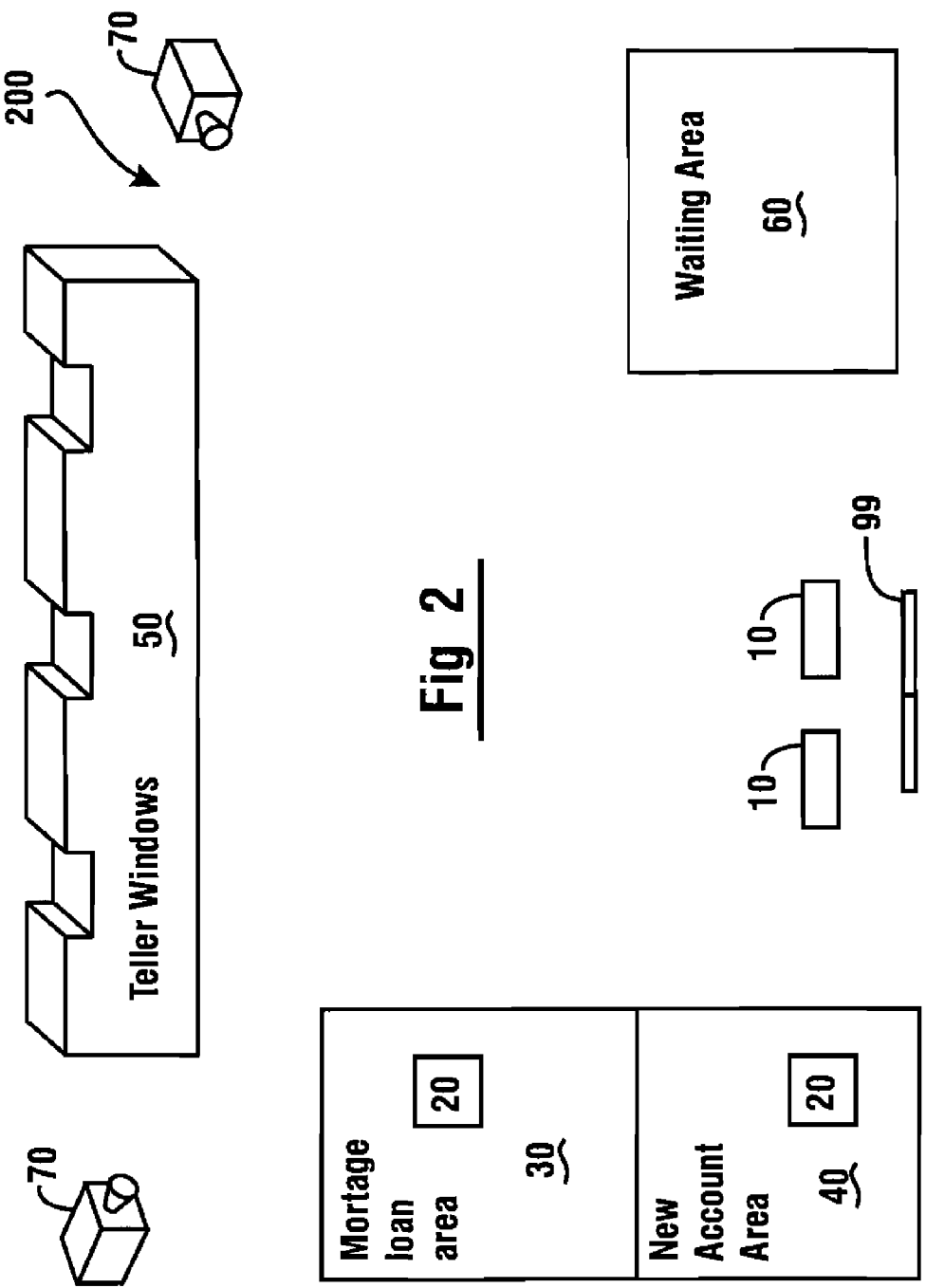
FIG. 2 is an example floor plan of the interior of a banking facility.

An exemplary floor plan of a banking facility is schematically shown in FIG. 2. In the exemplary embodiment one or more welcome terminals 10 may be placed near the front door 99 of the banking facility 200. The exemplary banking facility 200 includes a waiting area 60 where a banking customer may wait if the resources he needs to conduct the desired banking transactions are currently busy. In the exemplary arrangement for conducting transactions such as depositing checks, purchasing a certificate of deposit, or withdrawing of cash from an existing account, a plurality of resources comprising teller windows 50 may be provided. One or more of the teller windows 50 have adjacent thereto a teller terminal 22 (not shown in FIG. 2).

Such teller terminals in exemplary embodiments are operative responsive to inputs by human tellers, to assist in processing banking customer transactions. In other embodiments, the teller terminals may comprise an automated banking machine terminal that receives inputs from customers. In still other exemplary embodiments, teller terminals may include input and output devices that can be operated by both the human teller or other service provider and a customer, to carry out banking transactions. It should be understood that in exemplary embodiments the teller terminals include a computer with connected input and output devices that provide an interface to the teller and/or customer. The input and output devices are operative to cause the computer to cause the carrying out of transactions in accordance with the provided inputs. The teller terminal is also operative to communicate in the network with other computers so as to indicate activities at the teller terminal. This activity, which may be evidenced by a receipt of inputs at the terminal and/or through communications to other computers in the system, can be used to indicate the activity ongoing at the particular resource, and also that nature of such activities, to the other computers. Such information can be used in exemplary embodiments for purposes of determining through operation of the computer a time after which the teller station will become available to conduct transactions for other banking customers. Of course it should be understood that these approaches are exemplary, and in other embodiments other approaches may be used.

An office used for applying for a loan such as a mortgage or a car loan, 30, and a new account office 40 used for opening new accounts or other banking officer transactions, are shown in the exemplary embodiment of FIG. 2. Each office 30, 40 may contain a banking computer or terminal 20 operative to process transactions responsive to inputs corresponding to the appropriate customer requests. Terminals 20 may include a computer with connected input and output devices which provide a suitable interface for the input and receipt of the transaction data associated with the type of transactions to be conducted at those resources. As is the case with the previously discussed teller terminals, terminals 20 are in operative connection with other computers in a network.

The activities conducted at the terminals 20 and the messages that pass between such terminals and other computers are analyzed through operation of one or more computers in the system. Such analysis may be used to determine when the resource associated with a particular terminal is likely to become available, through operation of one or more computers connected in the system operating in accordance with programmed instructions to analyze the activities and/or messages from such terminals to make such a determination. The terminals or other computers may also be in operative connection with cameras, motions sensors, light sensors or other suitable sensors in the rooms that can provide signals indicative of when each room has persons present therein. Of course this approach is exemplary and in other embodiments other approaches may be used.

The banking facility 200 may contain cameras 70 for capturing images. The data corresponding to which images can be used for recognizing customers and tracking customers within a banking facility 200. Such cameras can be in operative connection with suitable interfaces and computers so as to enable such computers to identify and/or determine the location of persons within the facility. Connected computers are operative to analyze such image data to determine the locations of particular individuals in various locations. This may include, for example, the number of customers waiting to use a particular resource. It may also include evaluating the number of customers in various offices or in waiting areas at automated banking machine terminals, or in other locations, so as to provide data which is used by the computers for purposes of determining how to direct customers so as to accomplish transactions in the most expeditious manner. Such information may also be used to help assure that available resources within the banking facility are utilized effectively. For example, in some embodiments one or more connected computers may operate responsive to an indication that there are multiple customers waiting to access one resource, while a service provider such as a teller or a bank officer is currently not occupied at another resource. A computer may operate in accordance with a determination that such conditions exist, to cause a message to be sent to the resource to advise the bank employee who is currently not occupied to switch to another resource location within the facility, so as to assure that transactions for customers are accomplished promptly. Of course these approaches are exemplary.

In operation, the exemplary welcome terminal 10 operates to display advertising through a display to banking customers. The welcome terminal 10 is also operative to provide outputs that describe what banking transactions or services are available at the banking facility 200 where the welcome terminal 10 is located. The welcome terminal 10 may be positioned inside the banking location near a customer entrance. In other arrangements, the terminal may be located outside the bank in a location that may attract banking customers to cause them to provide inputs which correspond to banking transactions they may like to perform.

In some exemplary embodiments, when a banking customer approaches the welcome terminal 10 in response to one of the advertisements, the welcome terminal 10 may operate to prompt the banking customer to provide inputs responsive to the outputs through the display 44, speaker 38 and other suitable output devices corresponding to what attracted the banking customer to the advertisement. The customer may be identified by the terminal operating to read data from data bearing records which identify the customer. This may include a user card that is read through operation of a reading device in the welcome terminal. Such a user card may include a magnetic stripe card, RFID card, NFC card, customer Fob, token, mobile device, passbook, fingerprint, or other data bearing record which provides data usable to identify the customer or the customer's financial accounts. In some exemplary embodiments the welcome terminal 10 is then operative to tailor a response to the banking customer to provide further detailed information of further interest to the banking customer. This may be done in the manner described in the incorporated disclosure of U.S. patent application Ser. No. 11/827,966. Of course this approach is exemplary, and in other embodiments other approaches may be used.

In some exemplary embodiments the welcome terminal 10 is operable to use a camera 74 on the welcome terminal or other cameras 70 operatively connected to the network 102, to capture images of a banking customer at or approaching the welcome terminal. By processing the image data using image recognition software locally or such software in operative connection with other computers, the banking customer may be identified. For example, some embodiments may utilize the features described in U.S. patent application Ser. No. 11/825,553 filed Jul. 6, 2007, the disclosure of which is herein incorporated by reference in its entirety. When the banking customer is identified, information about the banking customer can be retrieved through operation of one or more computers, from a database 110. Such computers can be in a welcome terminal 10 or may be other computers connected in the banking computer system 100. By using the retrieved customer information, a personalized advertisement or other tailored messages may be presented to the banking customer through one or more output devices on the welcome terminal. In some exemplary embodiments a computer may operate to cause a personalized greeting to be displayed on the welcome terminal 10 to greet the banking customer. In other exemplary embodiments data corresponding to the most recent transactions of the banking customer may be displayed on the welcome terminal, and the welcome terminal 10 may provide outputs that prompt the banking customer to provide selected inputs if they would like to perform a transaction like one of the transactions displayed. The banking customer may then provide one or more inputs operative to select one or more transaction types they would like to perform at the banking facility 200. In an exemplary embodiment, the welcome terminal may operate in accordance with its programming to cause indicia corresponding to the desired tasks to graphically appear in a list in an area of the display 44 of the welcome terminal 10 for reference by the banking customer.

In some exemplary embodiments when the banking customer is not interested in the advertising and does not provide an identifying input in response thereto, and the customer is not recognized in another manner, the banking customer may otherwise identify himself to the welcome terminal 10. In some exemplary embodiments the banking customer may identify himself by inserting a data bearing record such as a bank or credit card into a card reader 92. In some exemplary embodiments, the user may also or alternatively enter a personal ID number (PIN) through the keypad 32 or enter a password through the keyboard 34. In some exemplary embodiments the banking customer may be identified by the welcome terminal 10 by sensing biometric data with a biometric data input device 56. Such a biometric input device may include a fingerprint reader, iris scanner, retina scan, hand scanner, voice print recognition device, or other suitable device that can recognize a biometric input associate with a user. At least one computer operatively connected in the system will then operate in accordance with its programming to analyze the received data and compare it with stored data to identify the particular user who has provided the input. In some embodiments the computer may operate to identify a user in response to multiple inputs or combinations of inputs that can be analyzed and correlated with a particular user. After a banking customer identity has been determined, the welcome terminal 10 may operate to retrieve the banking customer account information and present it to the banking customer through the display 44 or other output device, for example.

If the banking customer is not recognized and not verified, he may be prompted to provide inputs indicating what type of new customer banking product or service he may be interested in. In some exemplary embodiments the new customer may be shown on a welcome terminal 10 output device indicia corresponding to types of accounts the banking customer may open that the banking location 200. The new banking customer may be prompted with account information tailored to the type of account that the banking customer selected. The welcome terminal may also operate to output indicia corresponding to other types of banking transactions and services which are offered by the banking facility. The banking customer may provide inputs to the terminal indicating the type of transaction or service in which the customer is interested. In some exemplary embodiments when a possible new banking customer is detected, an image of the banking customer can be captured responsive to operation of one or more computers in the banking computer system 100. The image is sent to a terminal or other output device in proximity to a banking employee to allow the banking employee to offer a more personal welcome greeting to the banking customer.

In some exemplary embodiments when an existing customer or a new customer has provided inputs to the welcome terminal 10 indicating a request to open an account or process a banking transaction, the banking customer may be prompted through outputs from the welcome terminal to begin entering customer information at the welcome terminal 10 related to the activity or transaction that the banking customer is capable of entering. The information may include the name, address, phone number, income history and other personal information of the banking customer pertinent to the requested transaction. If the banking customer is an existing or former customer, then the personal data of that customer may be retrieved through operation of one or more computers from a database on the computer network 100. The data associated with the banking customer can be used at the welcome terminal 10 to supply data for the requested transaction along with data the banking customer has entered at the welcome terminal 10. For example in some exemplary embodiments, the welcome terminal may operate in accordance with its computer's programming to provide an output that asks the banking customer to confirm information that is retrieved through operation of the bank's computer from the data store. In this way, information that has changed can be updated. This might include, for example, contact information for the user, including information such as new cell phone numbers, email addresses, a mailing address or other information that may be helpful in terms of providing services to the customer.

In some exemplary embodiments the welcome terminal 10 can be in operative communication with a pre-transaction processing system that includes task analyzer software, task queuing manager software, and way finding software. In some exemplary embodiments portions of each of these software functions may reside on different banking computers or computers in resources in the banking computer system 100, which are operable to execute software instructions. In some exemplary embodiments the banking computer system 100 architecture may be balanced and the software and corresponding databases 110 distributed among operatively connected computers in a way that allows for a banking computer system 100 that has high throughput of customer transactions and reasonable banking computer system 100 costs. Of course those approaches may be used in different embodiments.

In some exemplary embodiments task analyzer software is operative to analyze the desired banking transactions identified by a banking customer and determine which tasks (if any) a banking resource could currently begin. For example, if the banking customer indicated they wanted to do a transfer and apply for a home equity line of credit, a banking system computer may begin to execute steps in accordance with its programming to process the home equity line of credit first. The banking resource such as a computer terminal located in the office to which the customer will eventually be directed to review and sign loan papers may begin to operate in response to communication with one or more other computers to begin to populate the forms with data that is available in connected databases in the banking system. Thus the banking resource that will be associated with the transaction will begin to take the steps necessary to open the home equity line of credit to the extent possible without customer or banking officer involvement. When the banking customer is later directed to the home equity loan officer, the home equity loan officer would already have some of the necessary work completed. The capability of pre-processing banking customer banking transactions may produce a more pleasant, efficient and integrated banking experience for the banking customer. The bank may benefit in reduced employee cost and with less resources needed to process banking customer transactions. Of course this approach is exemplary, and in other embodiments other approaches may be used.

In some exemplary embodiments task queuing manager software is operative to determine how the requested banking transactions may most efficiently be completed. In the exemplary embodiment the task queuing manager software may dynamically determine the best and most efficient way to prompt the banking customer on how to accomplish the requested transactions. For example, a banking customer may indicate a desire to perform two types of transactions. One transaction may be performed at a currency exchange terminal 88 rather than the welcome station. The second transaction may need a banking employee teller to accomplish the task (purchase a certificate of deposit, for example). The task queuing manager software can be operative in real-time to look at the availability of the two banking resources required. If it is discovered that the currency exchange terminal 88 was not being used at that time, but all the teller stations operating were currently busy, the banking customer would be directed through outputs from the welcome terminal to the currency exchange terminal 88 to perform that banking transaction first.

The banking customer can be directed to the currency exchange terminal 88 by displaying a prompt on the display 44 of the welcome terminal 10. The banking customer may also be presented a map output on the display 44 showing how to proceed from the welcome terminal 10 to the currency exchange terminal 88. At the same time, the banking customer can be placed in a "virtual queue" for a teller station. When the banking customer finishes the currency exchange transaction, the currency exchange terminal 88 may then be operative responsive to messages from the computer establishing the virtual queue to direct the banking customer to the appropriate teller station.

A teller at the station to which the customer is directed may be expecting a banking customer with any "pre-work" already completed. Such work can be accomplished through communications between the teller terminal at the particular teller station and one or more computers which are operative to accomplish the necessary processing steps associated with the transaction type which the customer indicated the customer wished to conduct through inputs at the welcome terminal. The task analyzer software discussed earlier operates to cause the banking teller terminal in conjunction with the teller at that station to accomplish the preliminary work. Alternatively, if the currency exchange terminal 10 was not immediately available but a teller station was available, then the task queuing manager software is operative to direct the banking customer to proceed to the banking teller station and then the customer would then be directed to the currency exchange terminal 88 after the transaction at the teller station was completed.

In the exemplary embodiment the way finding software is operative to analyze outputs from the queuing manager software. In some exemplary embodiments the way finding software is operable to generate outputs that include directions that can be presented to the banking customer on resources which include devices operatively connected in the banking network 102. The directions can be presented to the banking customer through a display in the welcome terminal 10, currency exchange terminal 88, banking terminal, a display at a teller location 50, waiting area 60, a display surface of a surface computer, or any device location through which a banking customer may receive directions. Other resources within the banking facility may include transaction stations such as those described in U.S. patent application Ser. Nos. 10/390,342 filed Mar. 17, 2003, and/or 11/100,148 filed Apr. 5, 2005, the disclosures of each of which are herein incorporated by reference in their entirety. Such resources may also include terminals used in connection with accessing facilities such as safety deposit box areas in vaults such as those described in U.S. patent application Ser. No. 12/004,758 filed Dec. 21, 2007, the disclosure of which is also incorporated herein by reference in its entirety. In addition, in some exemplary embodiments resources may include transaction stations located in walk-through or drive-through lanes associated with the banking facility. These may include systems such as those described in U.S. patent application Ser. No. 11/825,752 filed Jul. 9, 2007, the disclosure of which is herein incorporated by reference in its entirety. Of course these resources, devices, features and functions are exemplary, and in other embodiments other approaches may be used.

In some exemplary embodiments the directions to customers can be provided in audio format from any location which includes a suitable output device from which a banking customer may receive audio directions. In exemplary embodiments the directions can be output to allow a banking customer to find the way to the next destination which has a resource to complete the next in a series of banking transactions the customer wishes to conduct. For example, when the queuing system software determined the banking customer was to proceed to the currency exchange terminal 88, the way-finding analyzer would operate using data corresponding to that destination along with data corresponding to the known current location at which the banking customer is interacting with other devices on the banking system 100, to resolve a route for the banking customer to follow. A route can be shown graphically to the banking customer in the form of a map in the context of the floor plan of the banking facility 200. In some exemplary embodiments the map can be displayed on an output device on a resource or through output devices where the banking customer is currently located in the banking facility.

In other embodiments, outputs including a map can be provided to a user through a mobile device. This mobile device may be of the type supplied to the customer by the banking facility to facilitate user transactions. Such a device may include a device that a customer may receive from the welcome terminal or from a bank employee for use only during the time that the banking customer is in the bank. Alternatively, the banking customer can be provided with a fob, token or other suitable device which includes an indicator or output device which the banking customer may retain when the banking customer is outside the bank. Further in alternative embodiments, directions and other information can be delivered to a customer's portable phone or other mobile device so as to facilitate the customer's movement efficiently between resources in the banking facility. Of course these approaches are exemplary.

In some exemplary embodiments computers in the system may operate so there is coordination with the destination point for a customer. An output device can be operated so a message may be displayed at the location of the resource, such as "reserved for (customer name) . . . " or "welcome Mr. (customer name)." Alternatively, the computers may operate to facilitate maintaining the customer's privacy. This may include providing outputs on a display that include only the customer's first name and last initial. Alternatively, a display may include only initials. Further in some embodiments other customer identifiers may be used that further maintain anonymity of the customer. These may include numerical or character designators which are associated with outputs provided to the customer through the welcome terminal or other resources, or through a customer's mobile device. After a banking transaction is complete at the first destination or resource, the way finding software may cause output of a map or information showing the banking customer how to proceed to the next destination.

In some exemplary embodiments banking resources such as automated teller machines, the teller terminal 22, and the banking computers 20 are operative to run workflow analysis software, customer awareness software, and image tracking software. In some exemplary embodiments portions of each of the workflow analysis software, customer awareness software, and image tracking software may reside on different computerized banking resources in the banking computer system 100 operable to execute software instructions. Of course these approaches are exemplary, and other types of systems, software architectures, and concentrated or distributing processing systems may be used.

In some exemplary embodiments the workflow analyzer software is operable to receive outputs from the task analyzer software discussed earlier, and is operative to define what steps a human teller will need to perform in order to complete the selected transaction for the customer. In some exemplary embodiments after the task analyzer software resolves the steps needed to execute a banking transaction, it may provide outputs to the teller (or other appropriate bank personnel) on a display device corresponding to those items and/or action steps that apply to the task. For example, if the requested banking transaction is to open a certificate of deposit, the workflow analyzer software may prompt on an output device of the banking employee's terminal, to carry out only those items that adhere to the business rules associated with opening a certificate of deposit. In the exemplary embodiments the workflow analyzer software is operative to present as outputs to the banking employee, only the forms and procedures that pertain to opening the certificate of deposit. In the exemplary embodiment forms and procedures may come to the banking employee with data already populated into an electronic form that was generated and/or processed earlier from the task analysis software phase and populated with information that may have earlier been collected at the welcome terminal 10 or gathered through operation of a computer in connection with one or more data stores in the system that include the customer's information.

In some exemplary embodiments the banking customer awareness software may alert the appropriate bank employees to certain information about customers that may currently be in the banking facility 200. For example, if an individual that is not identified as a current customer indicated at the welcome terminal 10 an interest in opening a checking account, the welcome terminal 10 may operate to capture an image of that customer and cause that image to be conveyed to a banking customer awareness software function. In the exemplary embodiment the banking customer awareness software may make a bank employee aware of where that banking customer was directed go and transmit that image to an output device so the employee may see what the banking customer looked like. In some exemplary embodiments computers connected in the system may operate responsive to their programmed instructions to cause outputs to a selected banking employee's terminal which include visual information which indicates, for example, "Customer #1 is interested in opening a checking account and was told to go to the waiting area . . . and the banking customer looks like 'this'<shows their picture>." With that information, a bank employee may go to the waiting area to greet the new customer in a more personal manner because the bank employee already knows who to approach. For example, the bank employee is now enabled to say: "Hello. My name is Bob Jones and I understand you'd like to open an account with us. Please let me take you to our new accounts manager." In alternative systems, bank employees may be provided with mobile terminals which include suitable output devices for receiving messages and pictures. Computers connected in the system may operate in accordance with their programming to send messages via wireless communication to the particular employee's mobile terminal which identifies the customer and provides the information on the customer and the type of transaction that customer would like to conduct. This approach enables the bank employees to be roaming and still receive the information. Of course this approach is exemplary, and in other embodiments other approaches may be used.

In some exemplary embodiments the image tracking software is operative to track banking customers and/or bank employees wherever they were relative to the floor plan of the banking facility 200. For example, if a banking customer was directed to proceed to a waiting area and the banking customer never made it to the waiting area because the banking customer may have been distracted by a friend in another area of the lobby, the bank employee may not be able to greet the customer. In some exemplary embodiments the banking customer tracking can be accomplished by utilizing the image data captured through video surveillance of the entire banking facility 200. A video stream of the floor area from all the cameras can be fed to image tracking software running in one or more computers.

In the exemplary embodiment all the points of customer interaction can be recorded as data values stored in memory associated with a computer so those points are known relative to customer positions on the floor of the facility. For example, the welcome terminal 10 may be at a floor grid with coordinates E7. When the image tracking software determines that Customer #1 has provided inputs that correspond to a request to open a banking account at the welcome terminal 10, the welcome terminal may provide that data to the computer running the person image tracking software. In some exemplary embodiments the image tracking software is then operative to cause data to be generated that corresponds to the location of the Customer #1 being at the welcome terminal 10 which corresponds to coordinate E7. Next, the image tracking software operates to track Customer #1 as the customer moves from one camera 70 field of view to another. The cameras 70 may feed image data corresponding to the real-time movement of the customer to the image tracking software which may use a mapping function to overlay the coordinates of each customer being tracked on a floor plan of the branch. The computer may operate to output this "live" information to bank personnel through output devices operatively connected to the computer through an animated graphic with customer names, privileges, reference numbers, or other data shown attached to the moving objects.

In an exemplary embodiment if the bank employee does not find Customer #1 in the waiting area 60, the employee may provide an input to a handheld device and data corresponding to an animated map of customer movement within the lobby could be sent to the handheld device of the bank employee. With information about where Customer #1 is located on a layout of the banking facility 200, the banking employee may now approach Customer #1 and great them in a proper manner.

In other exemplary embodiments the banking customers can be tracked by capturing and processing image data which is analyzed by one or more computers that identify the particular customer by various properties that can be sensed by sensors and devices in operative connection with the computer. In some exemplary embodiments the banking customer can be tracked using signals from a plurality of sensors positioned in an array throughout the banking facility 200 floor. Sensors in the floor may sense the weight of a banking customer and how that weight is distributed to various portions of the footprint of a banking customer as the banking customer moves about the banking facility 200. The sensors may also or alternatively include an array of photo sensors. The sensors are in operative connection with one or more computers. The computers operate to analyze the data from the sensors indicating the weight that is currently sensed thereon and/or the interruption of photo sensor beams. The computer may then operate to track the user from the known starting point throughout the area of the bank where the sensors are located. In some other exemplary embodiments the shoe print of a banking customer may be captured with cameras at a low level or in the banking facility 200 floor. In exemplary embodiments, low height level cameras may operate to identify an image of a customer's shoe as associated with that particular customer. The image of the shoe can be analyzed and recorded such that when the image of that shoe is seen by other cameras, the computer operates to identify a particular customer that is associated with the shoe image. The banking customer may then be tracked within the banking facility 200 by tracking his shoe image. It should be understood that in other embodiments other articles on or associated with customers could be used for tracking the customer within the banking facility. This may include articles of clothing, items of jewelry, or other identifiable features that will remain associated with the particular customer through the customer's activities at the bank facility.

In other exemplary embodiments a banking customer can be tracked by a unique signal emitted from a mobile device the banking customer carries. A plurality of sensors may detect the unique mobile signal and that signal may be triangulated within the banking facility 200 to determine the location of the banking customer. In yet some other embodiments a banking customer can be tracked by sensors and software operative to detect biometric data such as readable scanning features of the eye or facial features as the banking customer arrives and moves within the banking facility 200.

Some exemplary embodiments may include special areas within a banking facility reserved for a segment of banking customers with "high net-worth customers" that are of high value to the banking facility. The explanation of a banking customer segment here will use "high net-worth customers" and services they find of value, but the use of a banking customer segment may be used to identify other groups of people with common transaction characteristics, such as small business customers, or safe-deposit customers, for example.

In some exemplary embodiments the use of a personal identification device can be used to identify a banking customer segment to the bank or even individual customers of high interest or value. In some exemplary embodiments the personal identification device may comprise a device that is specifically issued to the customer who is within the customer segment or category. For example in some embodiments, the personal identification device may comprise a fob, card or other article that is operative to emit or provide one or more unique signals or data that identify the customer. For example in some embodiments, the personal identification device may include an RFID device which is operative to provide a unique signal that identifies the customer. Such an RFID device may include articles such as a credit or debit card which includes an RFID indicator thereon. Alternatively, the article may include a token, fob or other item that a user may include on the user's person when traveling to the banking facility. Of course these approaches are exemplary.

When a person in the segment is detected upon their approaching or arriving at the banking facility, the banking facility and banking computer system are operative to identify the banking customer by matching the signals emitted or output by the person's identification device with data stored in at least one data store. In some exemplary embodiments once the banking customer is identified, the banking facility may begin to prepare the banking environment for services that particular person, or a person in a particular customer segment, typically desire. This may include, for example, providing outputs on display devices or at the customer terminal acknowledging the customer by name. Alternatively or in addition, at least one computer is operative to communicate with a computer terminal or a portable device carried by a banking employee. The communications with the portable device or the bank employee computer are operative to advise the employee of the identity of the customer approaching the bank, and advise the employee to greet the customer. Further in some exemplary embodiments, the computer is operative to recover data corresponding to an image of a customer that is displayed to the bank employee. This will facilitate the employee identifying the customer so that the employee can personally greet the customer as the customer enters or approaches the bank. In some exemplary embodiments detection by the personal identification device may also be operative to begin execution of the previously discussed software routines like the way finding software, queuing manager software, and task analyzer software.

In some exemplary embodiments the personal identification device can be a biometrically enabled device. The biometric personal identification device may only become active when the person to whom it has been registered has personal possession of the device and provides a unique biometric input. For example, the personal identification device may only be operative to output one or more signals for a period of time after a user has provided an input such as a fingerprint over a scanner included on the device. Alternatively in some embodiments, the identification device may respond to a user's voice print or other perceptible input to cause it to provide the identifying output. In some exemplary embodiments when the personal device is active it may emit a radio frequency signal that can be detected by one or more receiving devices that are operative to receive the signal and operatively communicate data corresponding to the signal to the banking computer system of the banking facility when the customer approaches or enters the facility.

In some exemplary embodiments upon being detected, a particular banking customer or a person belonging to a specific banking customer segment would have a space reserved for them (a private financial consultation room, for example) allowing them to proceed directly to that space. This may include, for example, the computer operating in accordance with an instruction to activate an output device to indicate the customer's name or other identifier on an output device associated with the private meeting room. One or more sensors adjacent to the meeting room may operate to unlock a door or other access control device as the user's identification device is sensed in proximity to the door. In some exemplary embodiments after a reservation was in place for a particular customer, no other banking customer could use that room even if they also had a similar device. In some exemplary embodiments once the banking customer for whom the room was reserved for enters the room, they may again need to identify themselves with the device or otherwise before they may proceed with the special services. This can be accompanied by one or more sensors sensing the device within the room. Alternatively or in addition, the user could further identify themselves through a secondary form of authentication. This could take the form of providing inputs to an input device, such as a card reader reading a card, an input of a PIN number through a keypad, or a biometric input. Of course these approaches are exemplary, and in other embodiments other approaches may be used.

Figure 3:
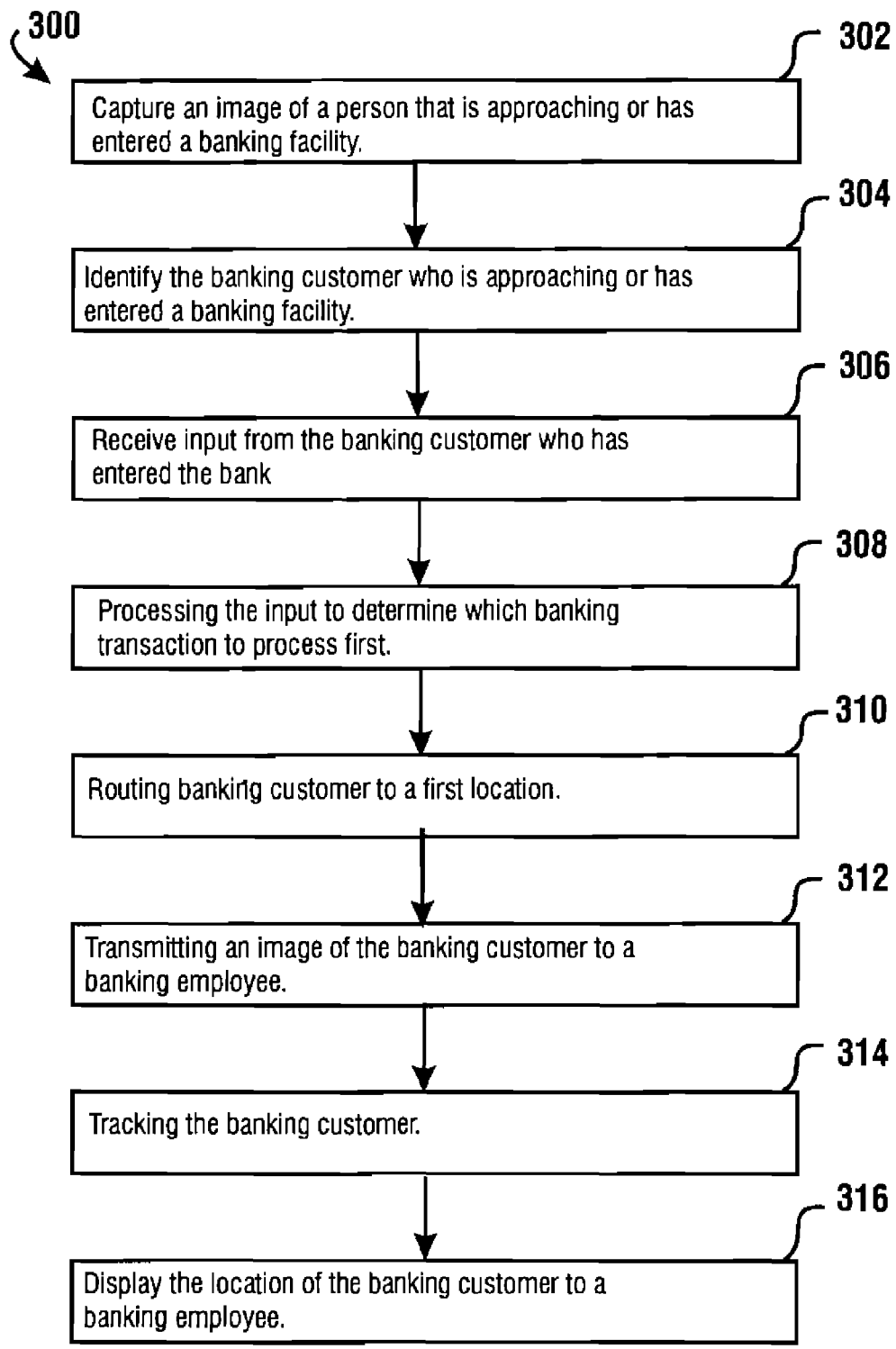
FIGS. 3 and 4 are schematic diagrams of a method associated with processing banking customer transactions using a welcome terminal.

FIG. 3 shows schematically an exemplary method of processing banking transactions using a welcome terminal 300. The method may include a step 302 where an image of a banking customer approaching or at a banking terminal is captured through operation of one or more computers. The image may be optical or of any method that is useful to identify or track the banking customer. The banking customer may be identified in step 304. The identification can be by computer analysis of optical images, facial images, infrared images or any other method to identify the banking customer. At step 306 input may be received at a welcome terminal located near the bank entrance from a banking customer that has entered a bank. The input may include information about the types of transactions the banking customer wants to perform at the banking facility 200. In some exemplary embodiments the banking customer may now begin entering data corresponding to the types of transactions the banking customer would like to transact. At step 308 the input received from the banking customer is analyzed through operation of a computer to determine which transaction may be processed first. The determination can be made by a banking computer system determining which resources are needed for each requested transaction and which of the needed resources are then currently available. The banking customer may be routed to a first location at step 310 through outputs from the welcome terminal and/or other devices. In some exemplary embodiments one or more computers may operate to present the banking customer with a map at the welcome terminal displaying how to proceed to the first location. At step 312 an image of the banking customer can be transmitted through operation of one or more computers to a computer or other output device accessible to a bank employee. The image can be used by the bank employee to personally greet the banking customer or to find the banking customer. The banking customer can be tracked in step 314. The tracking can be performed by the banking computer system through one or more of the approaches as discussed above. At step 316 the location of the tracked banking customer is presented to a banking employee through one or more output devices such as a computer display or a portable handheld terminal. The displayed location may enable a banking employee to more easily find the banking customer.

Figure 4:
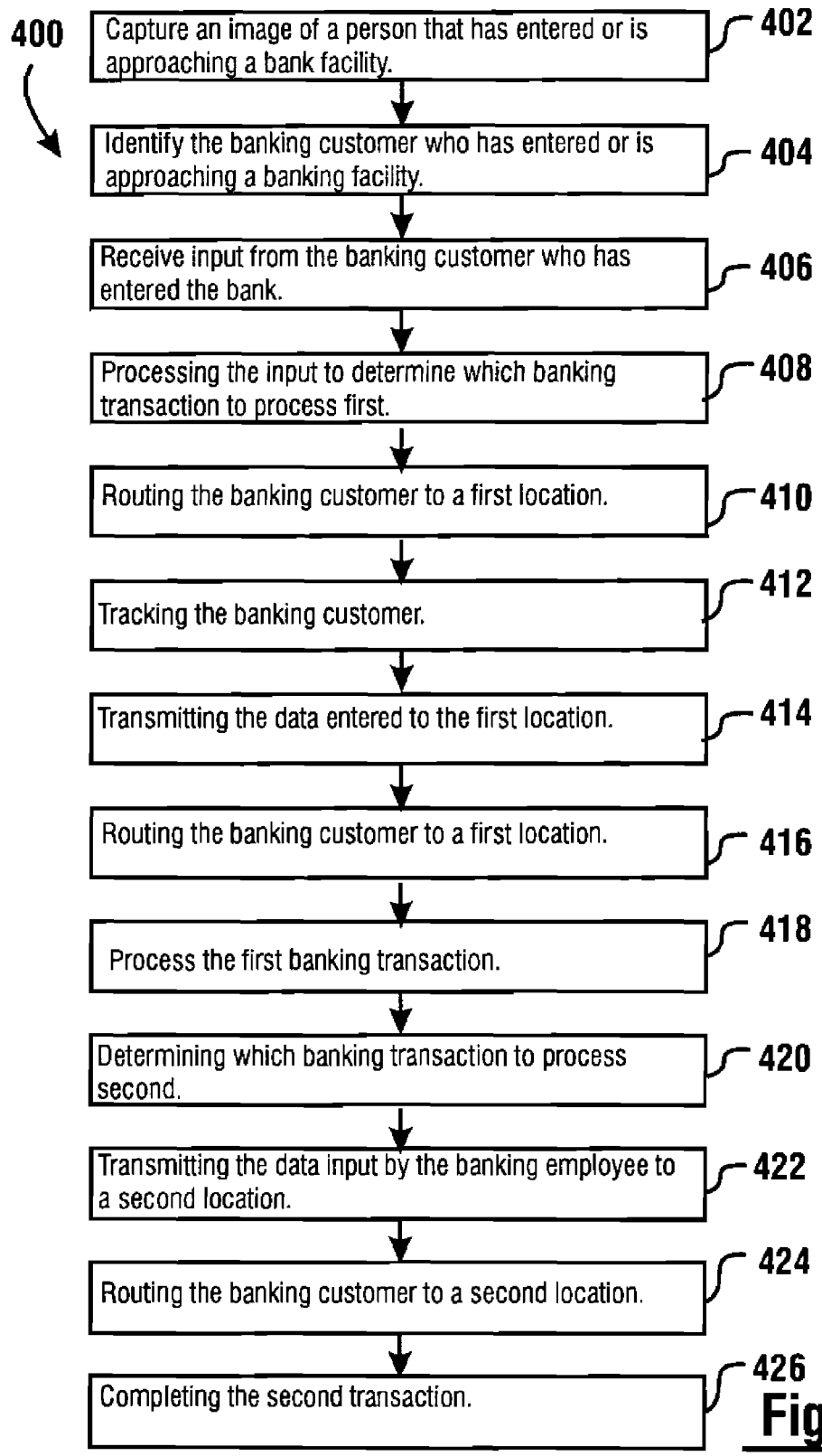

FIG. 4 schematically represents an exemplary method of processing banking transactions using a welcome terminal 400. The first five steps of the exemplary method may be identical to the first five steps of the method in FIG. 3. At the sixth step 412, the banking customer can be tracked through operation of one or more computers. At step 414 the data the banking customer may have entered into the welcome terminal is communicated to one or more computers that are operative to analyze and/or communicate the customer data to a resource at a first location where the customer is being directed to carry out a transaction. A banking resource such as a computer terminal or other device at the first location operates to begin processing the first transaction before the banking customer arrives at the first location. At step 416 the banking customer may be presented information through the welcome terminal or other output device about how to get to the first location. The first banking transaction is processed at step 418. This is accomplished by the customer interacting with the banking resource at the first location. This may include, for example, providing inputs to terminal devices either by the customer or human operator, or other activities as are necessary to carry out the transaction. At step 420 a determination is made through operation of a computer as to which banking transaction may be processed second. The determination can be made by the computer or computers in a similar manner as was the determination to determine the first transaction in step 408. One or more computers operate to cause data corresponding to the customer and/or the selected transaction which is to be processed second to be transmitted to the banking resource at the second location in step 422, which may allow the second transaction processing to begin before the banking customer arrives at the second location. At step 424 the banking customer is routed to the second location by the first resource or other manner, and the second transaction is completed at step 426. If there are more transactions, then step 420 through 424 may be repeated for each transaction until all transactions are completed.

In some exemplary embodiments rather than waiting until a banking customer has arrived at a welcome terminal, the banking customer may contact the banking facility before arriving at the bank, through the customer's mobile device. This may be done by the mobile device communicating with one or more computers in the banking network. This may be done, for example, through a cell phone connection or other wireless communication methodology. In some exemplary embodiments some of the functions of the welcome terminal discussed above, such as identifying a banking customer, may be accomplished by the messages from (i.e., an originating phone number or network address of) the mobile device. This may include, for example, receiving from the customer suitable identifying inputs through the mobile device. The identifying inputs are transmitted to one or more computers and compared to stored data so that the customer may be identified. One or more computers in the banking network may operate to generate and cause to be presented on the mobile device a list of the banking transactions a banking customer may desire to perform. The customer may operate the mobile device to provide inputs which correspond to the one or more banking transactions which the customer desires to perform. This can be done through operation of the mobile device and software operating therein, as a result of communications with one or more computers in the banking system. Such inputs may cause one or more computers of the banking system to begin preprocessing or other activities to prepare for the transactions that the banking customer will conduct when the customer arrives at the banking facility.

In some exemplary embodiments the mobile device may comprise a personal device such as a mobile phone or PDA. In some exemplary embodiments a mobile device may connect with the banking computer system through any mobile system including cellular, Wi-Fi, WiMax or 802.11. Of course these are exemplary.

After a mobile device is in operative connection with a computer in the banking network, it may be used to pre-order financial services or banking transactions from wherever and whenever the banking customer desired. In some exemplary embodiments the pre-ordered transactions or services may then be processed through operation of the computers at a convenient time and place before the banking customer needs them completed or arrives at a banking facility. If the banking customer does not need the transactions completed that day or later that day, the banking computer system may schedule the transactions to be completed at a future time, or completed to the extent possible until the banking customer arrives at a banking location.

For example, a customer may have a mobile device that can be used to communicate with one or more computers in the banking system, and has 10 checks the customer wishes to deposit. The banking customer may enable an application on their handheld device to begin to operate and communicate with one or more computers in the banking computer system. In some exemplary embodiments portions of the mobile application may reside in the mobile device or on computers in a banking computer system. In some exemplary embodiments the mobile software application can be text message based, or may communicate using a web application.

Using a mobile device, the banking customer may provide one or more inputs to identify themselves and enter a personal identification number (PIN) in private. In some exemplary embodiments the transaction sequence carried out through operation of the mobile device interface may be similar to the transaction sequence described above with a welcome terminal, except that it is being conducted on a mobile device. The banking customer may select from a menu output on a display of the mobile device to "deposit checks" at a branch. The mobile device may then operate to cause data corresponding to the customer's selections to be communicated to one or more computers in the banking computer system. The banking computer system may then provide communications to the mobile device that cause the device to instruct the banking customer how to proceed to the nearest banking facility 200 location that may accommodate the desired transactions. The banking customer may be prompted through outputs that include a map or directions to the banking facility 200.

The banking customer arrives later at the banking location to which the customer was directed. In some exemplary embodiments the presence of the banking customer can be detected at the banking facility 200 through operation of the mobile device. In some exemplary embodiments a signal such as an RFID, NFC, Bluetooth, or other radio signal may output by the device and detected by the banking computer system. In some exemplary embodiments when the banking computer system detects the arrival of the banking customer, the banking computer system may process the banking transactions the banking customer requested earlier using the task analyzer software and queuing manager software as previously discussed.

In some exemplary embodiments, NFC may be utilized to read a user's card or conduct a transaction. A customer's mobile device, such as a smart phone, tablet, computer or the like may contain a NFC chip. NFC chips may send encrypted data a short distance to a reader located in the terminal, for example. The user may be able to initiate or complete transactions by waving or tapping their NFC enabled mobile device near or on the NFC reader in the terminal. NFC may permit the user to make a payment, deposit or withdraw cash. In an exemplary embodiment, the user may walk up to a NFC enabled terminal and wave their card or mobile phone next to the reader on the terminal and enter the user's PIN or ID number in order to operate the ATM. Alternatively, the user may log onto the bank's web site and select the option to withdraw cash, for example, and indicate the specifics related to the transaction, such as the particular account from which they want to make a withdrawal and the amount to be withdrawn. Once the user has completed the transaction online, the user may then receive a text message via SMS that may include a temporary PIN or ID number to use at the nearest terminal. For security reasons, the PIN may have a time limit attached to its use, such as that the PIN must be used within 30 minutes of receipt and that the PIN may only be used one time. As an alternative, any appropriate type of device may include an NFC chip, such as a user's vehicle key fob, personal computer and the like.

In addition, the user's NFC enabled device may serve as an encrypted security device, personal ID card and/or banking ID card. The user's NFC device may read NFC tags located on a bank's display to get more information, special offers, or an audio or video presentation related to some existing or new products or services. Using the phone as a reader may allow the phone to interact with RFID-enabled objects, such as posters embedded with chips that connect to web sites, mobile web sites or applications. In an exemplary embodiment, the bank may provide "smart" posters or advertisements that may include RFID tags, whereby the banking customer may tap their NFC mobile device against the RFID equipped poster or advertisement. The customer may then receive promotional offers from the bank.

The terminal may include NFC in any appropriate or desired location of the terminal. For example, the terminal may include NFC in the display, touch screen, or signature pad. This may be done in a manner where the card is read by bringing it adjacent to the desired portion of the terminal that includes the NFC communications. This would allow a transaction to occur where a user would bring their card near or physically touch their card to the portion of the terminal with NFC in order to start the transaction. In this manner, the card may be read through NFC associated with that specific part of the terminal, such as the display screen, touch pad, track pad and the like.

In some exemplary embodiments the banking computer system may operate in accordance with its programming to identify the resource that is available to perform the requested transactions and may direct the banking customer through outputs from the banking customer's mobile device where in the branch to proceed. In some exemplary embodiments the mobile device may receive communications that direct the banking customer and cause the device to output a map or floor plan of the banking facility. This may be accomplished in a manner similar to the maps shown on the welcome terminal discussed earlier. In some exemplary embodiments the banking customer may be prompted responsive to software similar to the operation of the way finding software discussed earlier to cause the mobile device to present a map accompanied with a message such as "Please proceed to Check Deposit Terminal #1." In some exemplary embodiments "Terminal #1" may be reserved by providing an output that includes the name of the banking customer. This may be done, for example, by the computer system operating to cause an output through an output device adjacent to or on the terminal, which output indicates the customer name or other identifying information for the customer. Of course this approach is exemplary, and in other embodiments other approaches may be used.

In some exemplary embodiments when the banking customer arrives at the terminal, they may press an application button on their mobile device or provide another type input that operates to inform the banking computer system they are at the indicated location. The banking computer system may generate a verification message for one-time use and display the message on the terminal where the banking customer should now be located. The banking computer system may then operate to instruct the banking customer through their mobile device to enter a one-time message that the banking computer generated, as inputs into the banking customer's mobile device. If the banking customer enters the verification message, this is received by one or more computers and operates to verify to the banking computer system that the banking customer is at the targeted terminal. In some exemplary embodiments, the banking customer is from this time instructed through the mobile device, the terminal, or both, to refer to instructions on the terminal's display to execute the physical check deposit into the automated banking machine terminal. Once the checks are deposited, the check images and summary information can be compiled into an electronic acknowledgment. One or more computers in the banking system operate to cause to be transmitted to the customer's mobile device, a record of the transaction.

In another example, a small businessman places a request from his mobile device to pick up his cash drawer money for the day (banded bills and rolled coins) in a drive-up lane. The small businessman may complete a mobile-based ordering transaction similar to the first example and indicate his desire to pick up his order at a pneumatic tube terminal, which is also referred to as a VAT terminal in a drive-up environment. This may be done through inputs to the user's mobile phone. The mobile phone is operative to communicate data corresponding to the inputs wirelessly to one or more computers in the banking system. The banking system is operative responsive to its programming to cause one or more computers to analyze the inputs and determine what steps should be taken prior to the customer's arrival to accomplish the customer's desired transactions. When the small businessman arrives in the parking lot, he may be detected automatically as discussed above. Alternatively, the customer may be detected by a camera system that captures images and that is in operative connection with a computer that operates facial recognition software. Of course these approaches are exemplary. The detection initiates a queuing function in at least one computer and may reactivate the computer processing data corresponding to the pending transaction. The businessman is queued for the cash pickup transaction for "Lane #1" and is instructed to proceed to that lane on his mobile device. This is done responsive to operation of one or more computers which provide outputs that are wirelessly transmitted to the customer's mobile device. The mobile device is operative to output instructions to the customer through its display or other output device.

Once the businessman arrives in the correct lane, he may press an application button on his mobile device or otherwise provide inputs to indicate to the system he is in position. The system is operative to generate a one-time use pass code, transmit it, and cause it to be output to the customer, who may view it on his mobile device. The output through the mobile device is operative to prompt the customer to enter the one-time use pass code into a keypad or other input device positioned adjacent to or on a customer terminal of a pneumatic tube transport system. For purposes of this disclosure, a pneumatic tube transport system is also referred to as a "VAT" system. The input of the code through the input device is operative to indicate to one or more computers in the system that the businessman is where he should be and may receive the currency.

The computer system operates in response to the one-time use input to cause the requested funds to be delivered to the customer through the pneumatic tube system. This may be done, for example, by the computer operating to cause one or more outputs through an output device associated with a resource such as a teller terminal. In response to such an output, a teller may collect the desired items and place them in a pneumatic tube carrier for transmission to the customer. Alternatively in other embodiments, an automated device which may be of the type in the incorporated disclosure operates to collect the desired items and place them in a carrier on an automated basis which is transmitted through the pneumatic tube system to the customer. In still other embodiments, the one or more computers in the banking system may communicate with devices such as cash dispensers and rolled coin dispensers to make available the items that have been requested by the customer, so that either a human teller or an automated system may cause them to be placed in and delivered to the pneumatic tube system. Of course these approaches are exemplary, and in other embodiments other approaches may be used.

In some exemplary embodiments a banking customer may be issued a banking card when the banking customer opens an account at the banking location. The banking card can be operatively used to identify the banking customer to the welcome terminal or remote automated banking machines or ATMs. The banking card can be operatively used to identify a banking customer to a mobile device used by banking employees before the mobile device is authorized to request or conduct transactions within the banking facility 200. The banking card may include one or more features therein or thereon that are operative to provide outputs that identify the customer. These may include, for example, an RFID tag or an NFC tag that is operative to provide data which can be used to identify the customer. In other embodiments the card may include a memory chip or other memory device which holds data that can be used to identify the customer. In still other embodiments the card may include a magnetic stripe which has data encoded thereon that can be used to identify the customer. Numerous different types of data storage arrangements may be used in various embodiments. Further it should be understood for purposes of this discussion, a card may include other articles of a small and portable variety that can be suitable to provide identifying inputs associated with a customer.

In some exemplary embodiments, the terminal can be set up to have transactions be more readily performed through the user's mobile device. For example, although the terminal would normally have a video output through the display, the terminal could be set up so that it hands off the video presentation or dialog with an actual teller to the user's mobile device. This may be done, for example, by having some correlation between the user ID, such as the user's card number or some other user identifying value, and the user's mobile phone number. When the user starts a transaction at the terminal, they might select to have the transaction carried out on their mobile phone. Responsive to having determined that the particular customer is at the terminal, one or more computers are operative to cause the terminal to transfer the details of the transaction to the user's mobile device. The voice client on the phone could then allow them to carry out the transaction either via voice commands or by manual inputs to the phone. Conversely, transactions could also be started the opposite way, such as initiating the transaction on the mobile device and then finishing the transaction at the terminal. In both instances, handing off the transaction from the terminal to the user's smart phone, or vice versa, would facilitate a more private discussion related to the transaction and may free up the terminal for other customers to use, while still allowing the initial customer to continue their discussion after they leave the terminal.

During transactions of this type, there may be the need for some validation to indicate that the user is in fact located at or near a terminal. In some exemplary embodiments, the terminal may require that the user input a code into their phone, either by speaking the code or by inputting some output indicated on the terminal display. The terminal may output a one-time use code on the screen that the user then needs to input into his mobile device. Alternatively, the user could be required to receive a value on the mobile device and input that value into the terminal. Another alternative may be to have a QR code on the screen of the terminal or on the screen of the mobile device, which could then be read by the opposite device. This would enable verifying that the person conducting the transaction on the phone was in fact at the terminal. A further enhancement on this concept can be to have voice ID as a secondary authentication factor for the user on the call. Voice ID can be done through any appropriate operation, such as APIs. This may essentially allow a user to conduct a transaction on a "bring your own display" basis. This may be done using features like those shown in U.S. patent application Ser. Nos. 13/068,461 filed May 11, 2011; 13/135,526 filed Jul. 7, 2011; and/or 13/134,128 filed May 31, 2011, the disclosures of each of which is incorporated herein by reference in its entirety.

In some exemplary embodiments, other personal forms of identification may also be utilized to further identify a user at a terminal. For example, a user's vehicle key fob may be used. The vehicle key fob may include an ID that can be read at the terminal to further identify the person. Similarly, NFC and RFID tags in the user's mobile device can be utilized.

In other exemplary embodiments, the floor space around the terminal may include a covering or coating with a sensor network. When the user is located on the floor space around the terminal, the sensor network located within or on top of the floor space surrounding the terminal may send a signal to the terminal to indicate that the user is currently located at the terminal. Responsive to having determined that the particular customer is at the terminal, one or more computers are operative to cause the terminal to provide outputs appropriate for the particular user.

In some exemplary embodiments, in order to further identify the customer, the terminal may include a sensor system similar to an electroencephalograph (EEG) that may measure the fluctuations in the brain activity of the customer. The identification software can be in operative connection with the banking computer system that may store a database of identifying information for each customer. Each person has a unique pattern of neural pathway that determines their brain activity. This makes an EEG biometric system hard to forge and therefore desirable for use in identification. The customer would need to have an authentication of the EEG, a sort of base "fingerprint" or "signature" to compare subsequent authentications against. The initial authentication procedure can be non-invasive, using a removable cap that may have even fewer electrodes than used in standard EEGs. The data taken may then be sent to one or more of the computers in the banking network 102 for analysis and filing away in a database. This method of authentication may be incorporated with other types of identification to create a secure system of identification.

Figure 5:
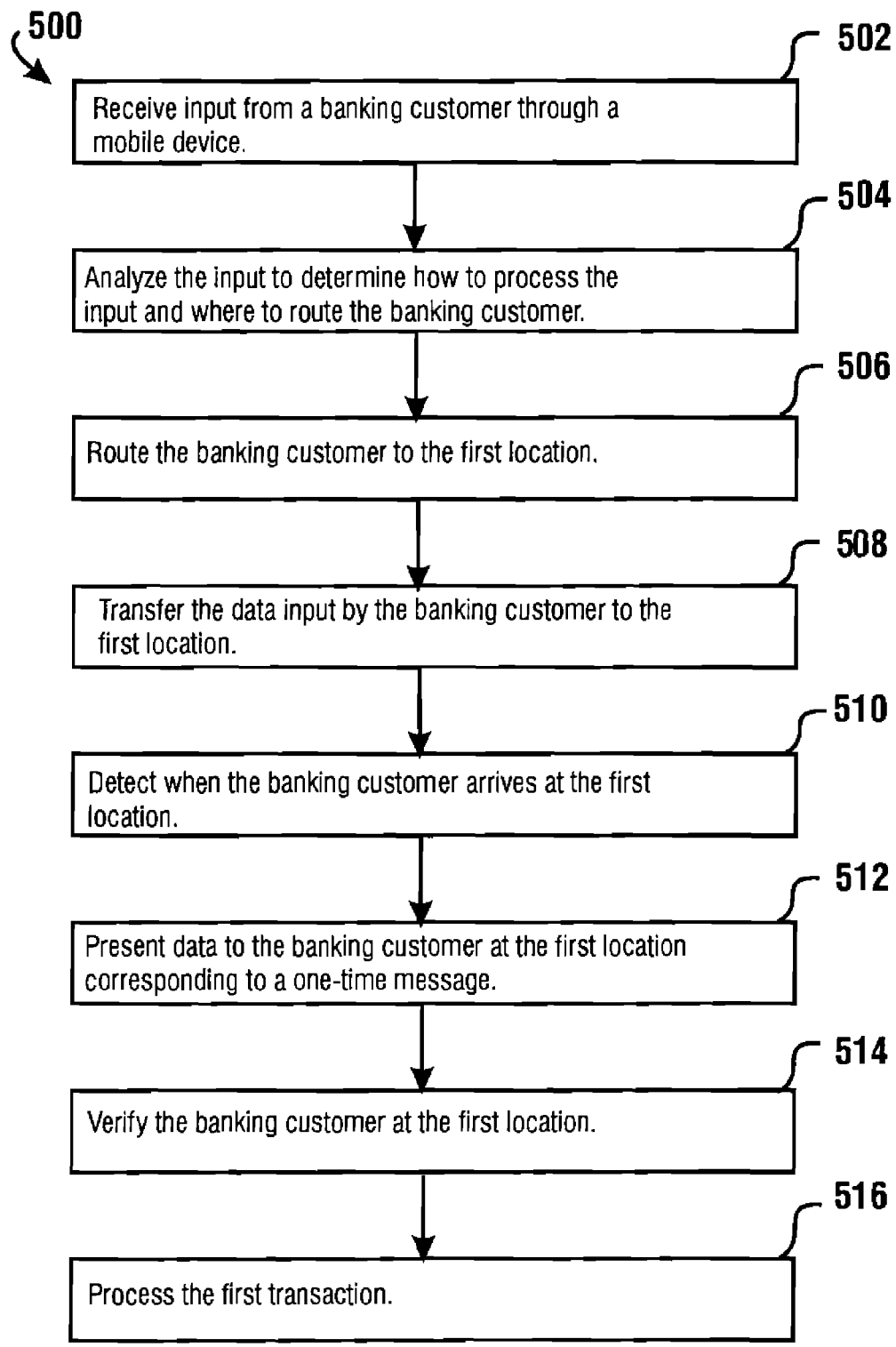
FIG. 5 is a schematic diagram of a method associated with processing banking customer transaction requests made from a mobile device.

FIG. 5 shows a schematic representation of an exemplary method of processing banking transactions in a system that includes a welcome terminal 500. The method may include a step 502 where one or more inputs are received from a banking customer through an input device included on a mobile device. The input can be received before the banking customer arrives at a bank and may contain information about the types of transactions the banking customer would like to perform. Data corresponding to the one or more inputs is transmitted through wireless communication to one or more computers included in the banking computer system. At step 504 the input is analyzed through operation of one or more computers to determine which one of a plurality of banking transactions requested by the customer will be processed first and where to route the banking customer once the customer arrives at the bank. The banking customer is routed to a first location in step 506. This is done through communication between one or more computers in the system and the mobile device. The mobile device provides outputs to indicate to the customer where the customer is to go. Alternatively, the customer may be provided with outputs through other output devices that are perceivable in the area where the customer is located, either inside or outside of the banking facility. This may include, for example, beginning to prepare necessary items for delivery to the customer through operation of a self service terminal or automated banking machine. Alternatively it may include the generation of electronic and/or paper forms through operation of a computer terminal. In other embodiments it may include the generation of other items by a service provider in response to outputs from a teller terminal or other terminal device.

In step 508 data entered by the banking customer is transmitted through operation of at least one computer to a first location. The first location may correspond to the banking resource that will handle the first banking transaction. Transferring the data to the first location may allow the first banking transaction processing to begin by the resource before the banking customer arrives at the first transaction location. At step 510 the banking customer may be detected when they arrive at the bank location. This may be done, for example, by detecting the presence of the customer's mobile device at the bank location by sensing RF signals or other signals emitted from the device. Alternatively, detecting the customer at the bank can be accomplished through image analysis based on images captured by cameras and processed through one or more computers to identify a facial or other image associated with the customer. In still other embodiments other identifying aspects associated with the customer, such as the customer's unique identification card or other article, may be sensed. Of course these approaches are exemplary.

At the first location a one-time message or password may be presented to the banking customer in step 512. The one-time message can be generated through operation of one or more computers in response to their programming. The one-time message can be communicated to a device such as a self-service terminal or other resource that the customer is to utilize in carrying out the customer's transaction. The customer may then input the one time message. The message is input by the customer to the customer's mobile phone. The message included as part of the message from the mobile device is communicated through operation of the mobile device to one or more computers in the banking system. In accordance with their programming, one or more computers are operative to compare the input message received from the mobile device to the one-time message generated by the system. In some exemplary embodiments the computer is also operative to analyze the source of the communication, such as the particular mobile device and/or the location of the mobile device, based on outputs which can be detected by the system. This may include, for example, the system determining the phone number, network address, or other identifying data associated with the mobile device to confirm that it is the mobile device of the customer. Likewise, GPS or other tracking data can be used to determine the location of the particular mobile device from which the input is received.

In response to one or more computers in the system determining that the data input through the mobile device corresponds to the customer and the indicated output code, the at least one computer is operative to cause outputs or operations at the particular banking resource that cause the customer's requested transaction to occur. At step 514 a verification determination is made that the banking customer is at the first location. The verification may include prompting the banking customer to enter the one-time message into a mobile device used by the banking customer and analyzing related data. At step the first 516 transaction is processed.

In an alternative exemplary embodiment the banking computer system can be used to generate personal messages to a banking customer. As a banking customer approaches the bank, welcome terminal, teller terminal, automated banking machine, or other resource location a banking customer may approach to conduct a banking transaction, the banking computer system is operative to identify the banking customer. The banking customer may be identified by any of the methods described above, for example image recognition by devices recording images of persons in the banking facility. When the banking customer is identified through operation of one or more computers, data associated with that customer can be retrieved from one or more data stores. Data is used by the banking computer system to cause to be produced, a personal greeting or other messages to the banking customer.

In some exemplary embodiments, an electronically communicative chip, such as a RFID or NFC chip for example, may be implanted into any appropriate or desired location in or on a human person. For example, in order to use the terminal the user would not need to have any other device with them while at the terminal in order to process a banking transaction. The RFID implant may be placed under the user's skin. For example, the chip can be as small as a grain of sand and be able to be syringe-injected. The chip implant can be in operative connection with a banking computer system to activate the identification software and would be able to identify the user during a banking transaction. These chips may also be placed in any other desired object, such as a pen, a ring, a pair of earrings or the like. Responsive to having determined that the particular customer is at the terminal based on the implanted or other associated identifying device, one or more computers are operative to cause the terminal to provide outputs appropriate for the particular user.

In other exemplary embodiments, these chipped customers are able to walk past a "reader" that may verify the customer's identity and links it to their current banking accounts. These implanted chips may even automatically open doors to exclusive areas of the bank for them. The customers may then conduct various banking transactions with a wave of their hand and do not need to worry about losing a banking ID card, credit card or wallet. Implanted chips may eliminate the need to carry ID documents and credit cards.

In other exemplary embodiments, an electronic device having physical properties that are similar to human skin may seamlessly integrate and conform onto the surface of the human skin, such as a patch acting as a temporary tattoo. For example, the epidermal electronic circuit may initially be mounted on a thin sheet of soluble plastic or paper and then laminated onto the human skin with water, just like a temporary tattoo. Once the electronic patch is on, it may bend, wrinkle and stretch along with the user's skin. When the electronic patch is no longer desired or needed, the patch can be peeled off like a layer of dead or sun burnt skin Adhesion of the patch may last as long as desired, such as twenty-four hours or a week. An electronic patch like this may be desired when going to beach or some other place where it may be inconvenient to carry a phone, wallet or purse. This electronic patch may communicate with the terminal to act as a personal ID. Alternatively, the electronic device can be temporarily or permanently tattooed onto the skin of the user, such as with a form of electronic ink. This electronic device is able to communicate with the terminal.

In some exemplary embodiments, other authentication ideas may include greater use of facial recognition. As discussed in prior embodiments, a computer is capable of retrieving the personal data about the banking customer from a database of personal information in operative connection with the banking computer system. The banking computer system is operative to activate the recognition or identification software. The customer can be detected by a camera system that captures images and that is in operative connection with a computer that operates facial recognition software. Responsive to having determined that the particular customer is at the terminal, one or more computers are operative to cause the terminal to provide outputs appropriate for the particular user. Of course these approaches are exemplary.

During an initial authorization process at the bank, a photo of the customer can be taken and entered into the facial recognition software. The facial recognition software may identify faces by extracting landmarks or features from an image of the user's face, such as the relative position, size, and/or shape of the user's eyes, nose, cheekbones, jaw and the like. In addition, facial recognition software may utilize 3-D technology to detect and identify distinctive features on the surf ace of the user's face, such as the contour of the eye sockets, nose, chin and the like. Other identification or authentication software may analyze visual details of the user's skin.

Later or during another visit, the customer's face can be analyzed by the facial recognition software to compare the real-time face of the customer to the data related to the face and facial features of the customer that is saved on the bank's server or network 102, which can provide instantaneous and accurate identification of the customer. This facial recognition data may also be stored on a chip, such as an RFID or NFC chip, located within the user's banking or ID card or within a chip on the user's mobile device. If the facial recognition data of the customer does not match the data of the card or mobile device user, the bank's security team can be notified and the user may not proceed with any banking transactions. In an exemplary embodiment, the facial recognition software may operate as a security and identification measure taken at the terminal, whereby instead of using a banking card or PIN, the terminal may capture an image of the user's face and compare that image to the image stored in the bank's database in order to confirm the identity of the user.

In some exemplary embodiments a database of personal information for each banking customer is in operative connection with the banking computer system. Information, such as data corresponding to the history of the transactions the banking customer conducted at the bank, can be saved in the database. Other information such as the height, weight, hair style, clothes worn, visual images, hobbies, political views, family history, jewelry, health history, previous banking responses, special interests the banking customer may have, and other personnel information can be saved in a database. The banking computer system is operative responsive to image data captured through one or more cameras to recognize the face, image, clothes, hair, jewelry, watch, shoes, responses and actions of a banking customer during visits to a banking facility and store data corresponding to this information in a banking database for future reference.

In some exemplary embodiments the current mood of a banking customer can be operatively determined through operation of the banking computer system. This may be done by analyzing the customer's actions, motions, body language, facial expression or other detectable parameters. If, for example, it is detected that the customer is acting in ways that suggest the customer is in a hurry, the computer may cause the banking resource such as a self service terminal to provide outputs more rapidly, provide outputs that are shorter, or eliminate promotional messages and take other steps to cause the terminal to operate more promptly consistent with the customer's determined status as in a hurry. Alternatively or in addition, the customer might be presented with the option through an output device on one or more banking resources such as an automated banking machine or a self service terminal, to indicate that the customer is in a hurry to complete the transaction. When this occurs, one or more computers either within the terminal or outside the terminal may operate in accordance with their programming to take steps such as those previously discussed to cause the transaction to be completed more quickly. Of course these approaches are exemplary.

In some exemplary embodiments the greeting or response can be displayed on a screen of a display device of a welcome terminal or other device in the form of text. Alternatively, the greeting or response message may be presented on a screen in the form of a virtual person speaking the message with a corresponding computer generated audio voice output. In some exemplary embodiments the greeting or response can be presented by a device that projects a realistic three-dimensional image of a person speaking the personal message or response message responsive to operation of one or more computers. In some exemplary embodiments the device is operative to project a holographic image of a person.

In some exemplary embodiments the banking computer system is operative to determine, based on stored data, the age of the banking customer. The computer operates to cause an image of a simulated person of similar age to be displayed to the banking customer on an output device. In some exemplary embodiments the banking computer system is operative to make a determination of a kind of person likely to put the banking customer most at ease, based on stored data. The at least one computer is operative responsive to this data to display the image of this type of person to the banking customer for welcoming and responding to the banking customer. Of course these approaches are exemplary.

In some exemplary embodiments the greeting or other messages output to the banking customer is tailored to changes in the appearance of the banking customer. Records of past banking visits can be retrieved from a database. Past data on the clothes, wrist watches, shoes, hair styles, weight, jewelry, and/or other data of interest pertaining to the banking customer can be retrieved. In some exemplary embodiments if the banking computer system detects any change in this data, a personal greeting or response to the banking customer can be generated through one or more computers that compliments the banking customer on the change. In some exemplary embodiments the banking computer system may analyze image data to detect and identify family members or other people accompanying the banking customer. The computer is operative to generate personal greetings and responses to the family members or other persons accompanying customers. In some exemplary embodiments a greeting or response to the banking customer is generated responsive to image data and/or other information about the people accompanying the banking customer.

In some exemplary embodiments data on pets of the banking customer is obtained from one or more sources and stored in a data store in operative connection with the system. In response to identifying the particular customer, one or more computers are operative to access the data corresponding to the particular customer's pet or pets. The computer may then operate to include in the personal messages to the customer comments or messages about the particular customer's pet or pets.

In some exemplary embodiments one or more computers in the banking system may operate to analyze the data concerning the customer and make a determination that the customer has certain characteristics which cause that customer to be classified within a particular category or group. In some exemplary groups the classification may correspond to social status. In other exemplary embodiments, the classification associated with the customer may indicate that the customer is not a native English speaker. In other exemplary embodiments the classification may indicate that the customer has a particular disability and require outputs of a particular type from automated banking machines in order to utilize those machines. Based on this determination as to the category in which the particular customer is classified, the one or more computers are operative to provide outputs to devices through banking resources that correspond to the particular classification.

In some exemplary embodiments the banking computer system is operatively connected to one or more databases with information on the current weather data, recent news stories, and sporting event results, for example. This information can be used by one or more computers to generate a greeting or personal responses to a banking customer tailored based on such data. In some exemplary embodiments the banking computer system is adapted to analyze the images of the banking customer and to recognize movements or other detectable indications that the banking customer is in need of medical care. This might include analysis of image data that indicates that a customer is doubled over, is listing, is shaking, or has fallen, for example. The greeting message and responses can be tailored to the medical care needs. If the banking customer is in need of urgent medical care the banking computer system may operate to send one or more messages to bank personnel or to a hospital or an ambulance requesting assistance for the banking customer.

Figure 6:
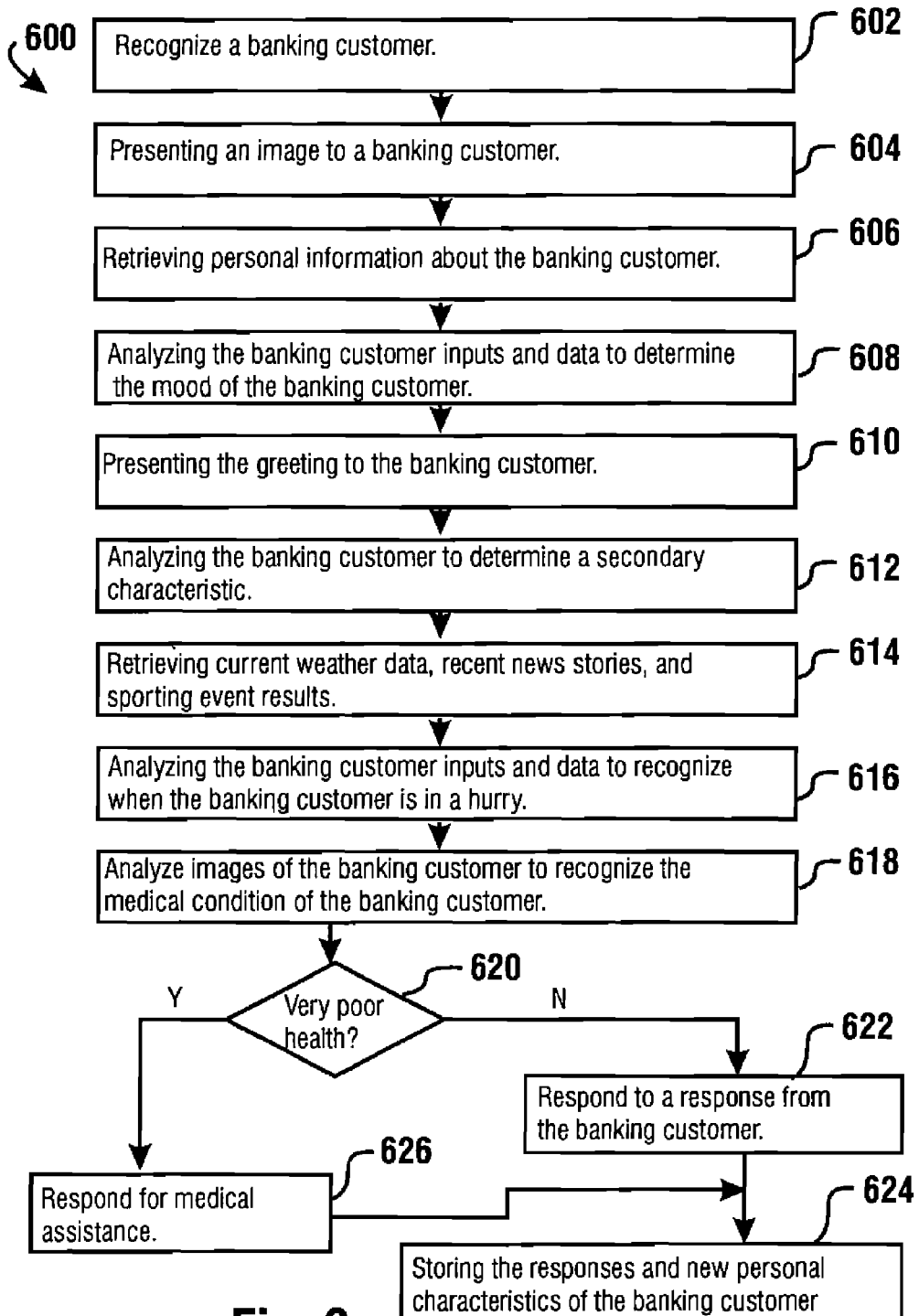
FIG. 6 is a schematic diagram of a method associated with processing banking transactions using a surface computer.

FIG. 6 is a schematic representation of an exemplary method of processing banking transactions 600. The method begins at step 602 by identifying a banking customer. The banking customer may be recognized when the customer arrives at the bank. This may be done through operation of one or more computers, based on received data in one or more of the ways previously discussed. At step 604 the banking customer is presented an image through an output device. The image can be a personalized welcoming image and can be presented in one or more of the ways described above. At step 606 personal data about the banking customer is retrieved from a database of personal information in connection with the banking computer system. At step 608 the images, inputs or other available data or properties associated with the banking customer, or the inputs the customer has recently provided to devices connected to the computers, is analyzed to determine the mood of the banking customer. The data is analyzed through operation of one or more computers to determine one or more properties corresponding to a probable mood of the banking customer. The computer then operates responsive to the resolved probable mood data to generate a greeting to the banking customer which corresponds to the result of the analysis. At step 610 the banking customer is presented with the greeting. The greeting may be personalized to the banking customer and can be tailored to the resolved data concerning the mood of the banking customer.

At step 612 one or more images of the banking customer are analyzed to recognize a secondary characteristic. Secondary characteristics may include for example, clothes, hair, jewelry, wrist watches, shoes, or other perceivable features associated with the banking customer. When a secondary characteristic is detected, the computer may operate to provide messages to the banking customer tailored to the secondary characteristic. At step 614 data corresponding to current weather data, recent news stories, and sporting event results is retrieved through operation of one or more computers. This data can be retrieved from one or more data stores included in the banking system. Alternatively such data can be retrieved from an external source such as sources accessible through the Internet or other operatively connected network. This data can be used by one or more computers to generate messages to the banking customer. At step 616 data corresponding to images, movement, properties, inputs, tone of voice, or other data associated with the banking customer is analyzed to make a determination as to when the banking customer is in a hurry. In some cases the customer may provide an input in response to an output message from the welcome terminal or an automated banking machine asking the customer to provide one or more inputs to indicate the customer is in a hurry. When it is resolved or otherwise determined that the banking customer is in a hurry, the computer may operate to cause outputs, wait time, or information provided to a customer to be shorter, or the computer may operate to eliminate the display or provision of advertising, additional queries, or output of other information that might be provided when a customer is determined not to be in a hurry.

At step 620, images, movement, characteristics or properties associated with detectable aspects of the banking customer are analyzed to determine a probable medical problem of the customer. If the banking customer appears to have a medical problem, one or more computers are operative to generate a request for medical assistance at step 626. If the banking customer does not appear to have a medical problem, one or more computers are operative to generate a response to a banking customer as represented at step 622. At step 624 a database of personal information corresponding to the banking customer is updated responsive to operation of one or more computers based on the responses and new personal characteristics of the customer.

Figure 23:
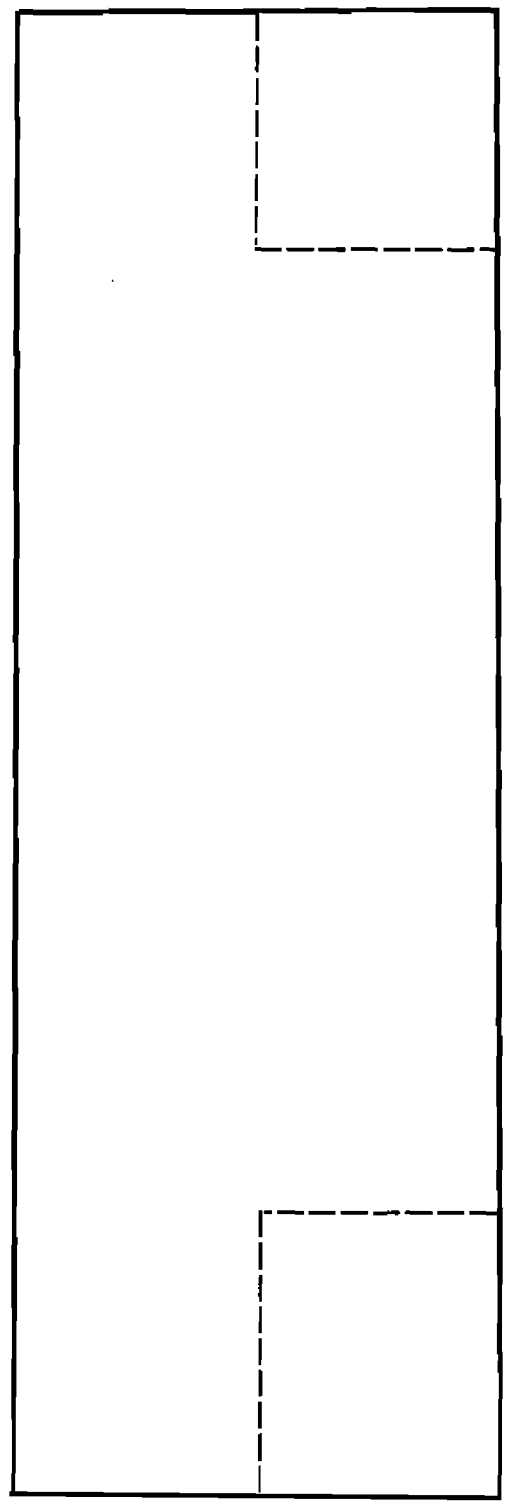
FIG. 23 shows an example of an automated banking machine touch screen interface including at least two disposed user locations.

In some exemplary embodiments a surface computer is operative to process customer banking transactions. The surface computer is operatively connected to the network 102 of FIG. 1. For purposes of this disclosure, a surface computer will be deemed to be a computer including a large, generally planar display surface. Through such a display surface multiple users may at the same time or during a single transaction session or during overlapping transaction sessions, receive visible outputs from the display surface and provide inputs to through physical contact with the display surface. In an exemplary embodiment the surface may comprise a surface which provides a visible output while at the same time enables the receipt of inputs from multiple users through contact with the surface in disposed areas. In some embodiments the display surface may comprise a large single touch screen panel, while in other embodiments the display surface may include a plurality of such panels arranged to have the surface thereof in generally a single plane. FIG. 23 shows an example of a display surface. The areas bounded by broken lines in FIG. 23 represent user locations.

In other exemplary embodiments the terminals may include signature pads, whereby the user's signature is captured at the terminal. For example, a display or track pad on a mobile device, which is touch sensitive, can be utilized to allow a user to write on it with their finger or a stylus. As another alternative, a signature pad can be integrated into the touch screen of the terminal. Features may be used like those shown in U.S. Patent Application 61/479,005 filed Apr. 26, 2011 which is incorporated herein by reference in its entirety. For example, a glass surface can be utilized, whereby the glass may measure the amount of force applied to it. A user may write on the touch screen with their finger or a stylus and the terminal may not only sense the positions through which the finger passes, but also the pressure that is applied to the touch screen. The pressure features and speed may be indicative of a genuine signature based on repeatability. This type of force-touch touch screen can be integrated into the terminal. Another alternative is to include a smart stylus device. The smart stylus device may be like a pen, but the touch and speed measuring aspects may be located within the stylus device, whereby the stylus device would be able to capture and detect if the signature was valid. Alternatively, the accelerometers located in mobile devices can be utilized to allow the user to essentially write their name in the air using their phone to produce their signature. For example, the mobile device can be operatively connected to the terminal via wireless communications.

In some exemplary embodiments, avatars and facial transformation software may operate to present the customer with a constant user experience from the same "person." Features may be used like those shown in U.S. patent application Ser. Nos. 12/384,479 filed Apr. 3, 2009 and 12/925,114 filed Oct. 14, 2010 the disclosures of each of which are incorporated herein by reference in its entirety. For example, a user may approach the terminal and that person can be asked if they would like to have the same teller assist them that may have helped them with their previous transactions. If they did, then a virtual person who looked the same (such as avatar or face and voice transformation) may assist them with the transaction. This way the user could establish a relationship with that virtual teller that would appear to be the same person. For example, a file or database of personal information and preferences could be maintained on each user, whereby that information could be provided during each user session.

In an exemplary embodiment each banking customer may have a variety of information stored on a bank network 102 database, such as keeping track of how long it has been since the user last visited the bank, referencing the user's clothing, additional persons who are accompanying the user, pets that accompany the user, changes to the user's hairstyle, the presence of any bandages or casts related to discussions of any injuries, noticing the user's use of a handkerchief or tissue that might indicate a cold or health issue, and other things that may be the basis for casual conversation, such as the weather, sporting events and the like, so as to make the terminal-presented teller appear more like a regular individual.

In other exemplary embodiments, the computer generated person projected at the terminal may include and utilize eye tracking software. The eye tracking software may operate to provide inputs into the terminal. The eye tracking software may also be used by the terminal-presented teller or avatar so that the teller appears to look at the user when "speaking" In addition, eye tracking software may operate to permit the customer to communicate with the terminal and complete banking transaction using only the customer's eyes and eye movements. For example, the user may control the functions of the terminal with the movement of their eyes, whereby the user's eyes may act as a pointer or cursor on the screen. Features may be used like those disclosed in U.S. patent application Ser. No. 16/930,724 filed Jan. 14, 2011 the disclosure of which is incorporated herein by reference in its entirety.

In some exemplary embodiments the surface computer operates in accordance with its programming to allow a banking customer to display indicia corresponding to banking services to be output through a display surface of the surface computer, and to allow a banking customer to organize and compare the accessed banking services. A surface computer is in operative connection with one or more cameras or other devices that operate to sense the then current position of the user's face and/or eyes. This may be done through software which is operative to analyze data corresponding to such features. In such exemplary embodiments when a person selects banking data to be displayed with the surface computer, the computer is operative to cause the display surface of the surface computer, based on where on the display surface the banking customer appears to be looking, to display the data at that location. The surface computer is operative to allow the banking customer to compare and sort indicia corresponding to different features of the displayed banking services and to select one of the banking services to be performed through contact with the display surface. The surface computer may also be operative to enable a banking customer to display, sort and select indicia corresponding to icons or other indicia output through the display surface to carry out transactions such as a review of banking account information and to open a banking account. The exemplary surface computer interface is adapted to allow a banking customer to touch, slide a finger and tap the surface computer with a finger when organizing, comparing and selecting data. The touch, sliding and tapping of the surface computer surface is operative to cause the opening, closing, rotating, flipping, stretching and shrinking of indicia and data displayed on the display surface responsive to operation of the computer.

In some exemplary embodiments the surface computer may have the display surface included as all or part of a desktop or a wall surface. In some exemplary embodiments the surface computer may receive inputs that enable the computer to identify the banking customer and operate to automatically access information stored in a banking database about banking transactions that the identified customer commonly performs. For example in some embodiments, images of the banking customer are captured by cameras located within the display surface of the surface computer. The banking customer images can be analyzed by a computer running facial recognition software. The facial recognition software operating in the surface computer may operate to identify the customer and provide outputs or other information in response thereto. In other embodiments a surface computer may receive inputs through the display surface such as biometric inputs. Such inputs may include, for example, a fingerprint scan or hand scan. The data which is input can be used to identify the customer. Of course these approaches are exemplary, and in other embodiments other approaches may be used.

In some exemplary embodiments the banking customer can be recognized by sensors that capture data that enables the computer to recognize that a mobile device placed on or adjacent to the display surface of the surface computer belongs to a particular banking customer. This may be done through sensors that are operative to capture image data or other visible data of the mobile device that identifies it as belonging to a particular user. Alternatively or in addition, the display surface may include other sensors which are operative to sense other characteristics of items. This may include cards, passbooks, checks, tokens, fobs or the like. Further, in still other embodiments, the surface computer can be in operative connection with an input device such as a wireless input device. The wireless input device may receive inputs from a mobile device or other article carried by the user that provides data that can be used by one or more computers to identify the user. Of course these approaches are exemplary.

The surface computer is adapted to recognize the cell phone, laptop computer, or personal digital assistant of a banking customer. The surface computer may include an interface that enables the banking customer to transfer data from a mobile device to the surface computer, and the surface computer can be adapted to allow the banking customer to transfer data from the surface computer to a mobile device. This may be done, for example in some embodiments, by an optical interface that enables sensors included in the display surface to read data output on a screen associated with a mobile device. Alternatively the data interface may include transmission of data through optical signals that are exchanged between the mobile device and the display surface or other interface that is in operative connection with the surface computer.

In some exemplary embodiments the surface computer is operative to allow data to be transferred to the mobile device by providing an interface to allow a banking customer to touch an icon on the display surface and drag the icon to a zone adjacent to or around the mobile data device while the mobile device is on or touching the display surface. The surface computer may operate to allow a banking customer to access existing banking account information of the banking customer and to display the account information on the display surface. In some exemplary embodiments the surface computer is operative to automatically retrieve banking customer data from a portable mobile device the banking customer may have placed near the surface computer. Of course these approaches are exemplary.

In some exemplary embodiments, the terminal may include a display or touch screen made of glass. The glass may have a film or other coating placed on the inside surface of the glass, whereby the film may enable projection of images onto the glass display which can be viewed from outside the glass and yet still allow for viewing through the glass from the inside out. This glass display or touch screen may operate to permit a camera to view through the display while at the same time projecting images thereon. This glass display or touch screen may operate to allow the terminal to identify a user by having the user place their driver's license up against the display. For example, the camera behind the display may view the user's face through the glass as well as the user's driver's license. Facial recognition software may then be used by at least one processor to determine if the driver's license corresponds to the user at the terminal. Additional elements located on a valid driver's license, such as the presence of holograms and the like, may also be resolved by operation of the at least one processor and may be used in determining that the driver's license is genuine. As a result, the facial recognition of the person and verification of the driver's license can be performed at the same time. In addition, the user can be verified as the person at the terminal without the need to maintain an additional database of information regarding the user. The glass display may also provide the capability of having the customer hold up a check to the display, whereby the check can be imaged through operation of the camera and at least one processor and/or viewed by a remote teller. Features may be used of the type shown in U.S. patent application Ser. No. 13/066,323 filed Apr. 12, 2011 the disclosure of which is incorporated herein by reference in its entirety.

In other exemplary embodiments, the terminal may also include a display, such as a glass display, that may be positioned and/or function as a shelf, whereby the shelf may generally be parallel to the floor space. This glass shelf may function as a display, touch screen, track pad, surface computer and the like. The shelf may include a film whereby images can be projected onto the underside of the shelf. For example, to complete a banking transaction the shelf may project an image of a card or a mobile device on the shelf to indicate that the user should place their card or mobile device on the shelf to complete the transaction. The shelf may interact with both the users touch as well as the users electronic devices, such as via NFC.

Figure 7:
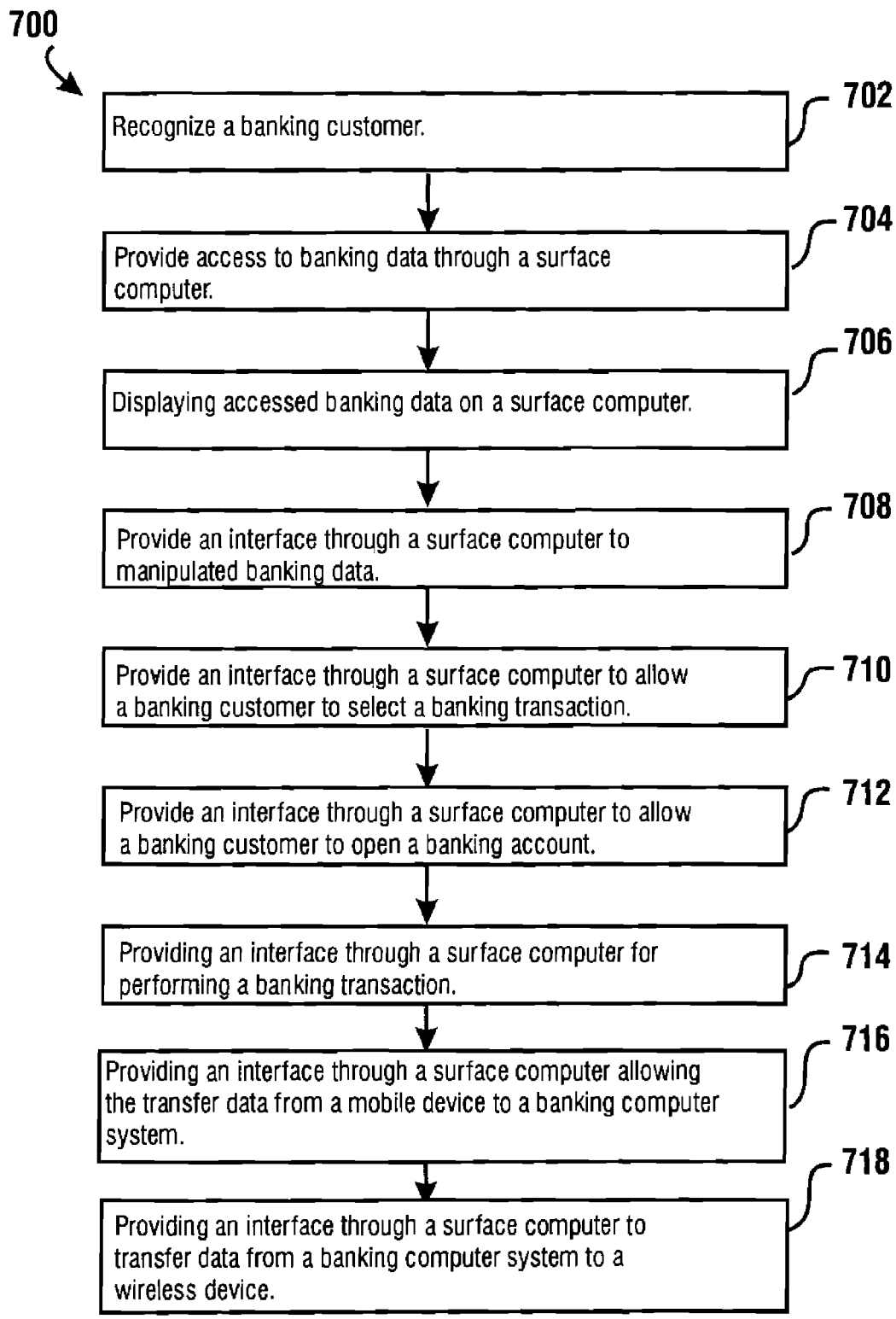
FIG. 7 is a schematic diagram of a method associated with processing banking transactions in a manner personal to the customer.

FIG. 7 schematically represents an exemplary method of processing banking transactions using a surface computer 700. The method begins at step 702 by identifying a banking customer. The banking customer can be recognized through image data captured by devices within the display surface of the surface computer or by image capture devices operatively connected thereto. Such customer recognition may be accomplished by capturing images of the customer's face, thumbprint, or other biometric features. One or more computers including the surface computer may operate to identify the user based on one or more biometric features. Alternatively, a user can be identified based on an article or signals output by or sensed from the article, such as the user's mobile device, token, passbook, check, checkbook, card or other item that is uniquely associated with the customer.

The computer receives data corresponding to the one or more inputs and operates to determine if the received inputs have a corresponding relationship to data stored in at least one data store in operative connection with the computer. In response to determining that the received data corresponds to stored data for a particular customer, the computer operates to determine the customer's identity and to resolve that the identified customer is to be authorized to conduct transactions through the surface computer. At step 704 access is provided that allows banking data to be accessed by the identified customer through the surface computer. The computer operates responsive to the one or more inputs received through the display surface to cause data to be retrieved which corresponds to that requested by the computer's inputs. At step 706 the data that is received responsive to the inputs is displayed on the surface computer. At step 708 an interface is provided through the display surface of the computer to allow a banking customer to organize and compare indicia corresponding to the accessed banking services. At step 710 an interface is provided through the surface computer to allow a banking customer to provide one or more inputs operative to select a banking transaction. At step 712 an interface is provided through the surface computer to allow a banking customer to open a bank account. An interface to allow the performance of a banking transaction is provided at step 714. At step 716 an interface through the surface computer is provided to allow the transfer data from a mobile device to a banking computer system. At step 718 an interface is provided through the surface computer to transfer data from a banking computer system to the surface computer. Thus as can be appreciated, the surface computer may provide various interfaces through the display surface that enable the provision of outputs and the receipt of inputs that cause selected transactions for users to be carried out. Of course these approaches are exemplary.

In some exemplary embodiments a surface computer is combined with one or more transaction function devices to provide an automated banking machine with transaction capabilities that users may perform on a self service basis. This may include for example, providing devices that can accept bills and/or checks in an area within or below the display surface of the surface computer. For example in some embodiments a device capable of receiving bills and/or checks through an opening, is positioned with the opening extending in a wall or other surface vertically below a portion of the display surface. Such a device is operative to receive bills and checks from a user in some embodiments. In other embodiments such a device is operative to dispense currency bills to users. Further in some embodiments several such devices can be positioned in laterally spaced relation below a generally continuous display surface which extends vertically and horizontally in a plane on or in connection with a wall.

In some exemplary embodiments transactions may be conducted using the principles previously described. A user may move adjacent to the display surface of the surface computer in general alignment with the opening of such a device. Such activity may be facilitated by including an output through the display surface in such an area. Further as discussed previously, some embodiments may provide an output including a customer name or identifier based on a particular area of the display surface being determined by a computer as the transaction resource a customer is to use to conduct a transaction. In response to the output, the customer may approach the surface computer and provide the inputs required to accomplish a transaction. This may include for example, the customer providing a card input, biometric input, numerical input, password, PIN or code input, mobile device input, or other input of the types previously described which can be used to identify the particular customer and/or that the particular customer is at that location of the surface computer. In some arrangements, the surface computer may provide virtual buttons, a keypad, a keyboard, a dial or other virtual component output through the display surface, which the user can contact, touch and/or manipulate in order to provide identifying or other inputs. In other embodiments the display surface may include a card reader opening for a card reader. The card reader can be mounted behind the opening. In other embodiments a card reader can be mounted adjacent to the display surface. In other embodiments a contactless card reader can be mounted in or behind the display surface. Of course these approaches are exemplary.

Responsive to having determined that the particular customer is at the location at the display surface, one or more computers are operative to cause the surface computer to provide outputs appropriate for the particular user. This may include a predetermined transaction that the customer has requested through a welcome terminal or mobile device as previously described. Alternatively, the customer can be presented with transaction options through indicia that are output through the display surface. The customer may provide inputs corresponding to data or transaction selections which are operative to indicate the type, characteristics or properties of the transaction which the user wishes to conduct. The inputs from the user are received through the display surface and used through operation of the surface computer or other connected computers to carry out the customer's requested transactions.

For example, if the customer has requested to receive cash, the device located adjacent to the display surface of the surface computer in the area where the customer is standing may operate to cause the cash to be dispensed from the opening.

The display surface may operate to indicate to the customer that the cash should be retrieved from the opening below the display surface. This can be done through text outputs, arrows, graphics, or other outputs presented through the display surface. Likewise if the customer is providing a deposit transaction, the customer may be prompted through graphics or other outputs on the display surface to input bills, checks or other accepted items into the opening below the display surface. The items can be received through the opening and processed through operation of the device in a manner like that discussed in the incorporated disclosures.

In exemplary embodiments the customer may also receive other prompts or outputs through the display surface. For example, the surface computer may output a query to the customer as to whether the customer wishes to receive a receipt. In response to an input to the display surface indicating that a receipt is requested, the device positioned in the area where the customer is located may operate to deliver a receipt through the opening. Of course as can be appreciated, other items can be exchanged with the customer and other transactions conducted.

As can be appreciated, in exemplary embodiments the display surface of the surface computer may comprise a relatively large surface with multiple spaced locations at which transaction sessions for multiple transactions by different users can be concurrently conducted. Customers may be selectively directed to such locations in the ways previously discussed, so as to facilitate the carrying out of transactions. Further, transactions that do not require the exchange of tangible materials can be conducted in areas intermediate of the locations and openings in which transaction function devices are located. Further it should be understood that various types of transaction function devices can be located below, above, beside, or even within display surfaces. This may include transactions that are carried out by transporting items to and from the user through use of a VAT carrier. This provides the capability for having numerous different configurations and transaction types. Of course these approaches are exemplary, and in other embodiments other approaches may be used.

In some exemplary embodiments it may be desirable to enhance security within a banking facility by tailoring the security to the locations of banking employees and customers within the banking facility. In some exemplary embodiments one or more detection devices operative to detect a person entering the banking facility, can be used to identify individuals entering or within a banking facility. The person can be detected and/or identified by any previously discussed detection method. In some exemplary embodiments the banking customer or employee can be automatically identified or may be identified when the person presents a banking card to a card reading device. Alternatively a user can be identified by a token, mobile device, fob, passbook or other article that can be read through operation of a reading device or that emits signals that can be used to identify the particular device and/or customer associated therewith. A security level can be assigned to the banking customer or employee detected entering the bank, through operation of the banking computer system. It should be understood that for purposes of this disclosure a security level corresponds to authorization and ability to access or operate selected data, functions, devices, areas or other things in accordance with rules or limits that are stored or resolved by one or more computers associated with the facility.

In an exemplary embodiment a banking customer or employee may only have access to the resources that correspond to the security level assigned to them. A banking computer system is operative to activate different banking resources corresponding to each identified banking customer or employee when the banking customer or employee approaches the resource. Some exemplary banking resources that can be activated according to the assigned security level of the banking customer or employee are computer terminals, computer databases, self service terminal, safety deposit boxes, access control devices, drawers, office space, storage areas, meeting rooms, automatic banking machines, teller areas, safety deposit box areas, and vault areas. In some exemplary embodiments one or more computers operate so that only banking resources adjacent to the determined current location of the person or within a small immediately adjacent zone around the person are activated if authorized according to the security level of the person.

The security level may correspond for example, to whether the person is a high value customer, standard customer, new customer, management banking employee, supervisory bank employee, teller, other bank employee, or in another group of people. The level of security of high value customers may provide access to more resources, areas or data than the security level for regular customers; the security level for regular customers may provide greater access than the security level for new customers; the security level for managers may provide greater access than the security level for supervisory bank employees; the security level for supervisory bank employees may provide greater access than the security level for tellers; and the level of security for tellers may provide greater access than the security level for other bank employees. It should be understood that the category of a particular individual based on the individual's identity as resolved by one or more computers in connection with the system, may provide such individuals with different types of access to resources, devices, areas, data, or other capabilities of the system. It should be understood that for different categories, the nature of the types of activities that can be performed, as well as the extent of authorization to utilize particular aspects of the available capabilities, may be different. Further for purposes of this disclosure, greater access may not necessarily require quantitatively greater capabilities, but only access to different capabilities of the facility, system or data.

In some exemplary embodiments a banking facility can be segmented into a plurality of security zones. Zones may correspond to different areas within the banking facility or to different banking resources. The security zones may include office spaces, teller areas, storage areas, safety deposit box areas, vault areas and public areas. Banking resources that may correspond with a zone include computer terminals, computer databases, account information, safety deposit boxes, drawers and automatic banking machines or other items. Each computer database may include a plurality of sub-databases each with its own security level.

In some exemplary embodiments a bank employee with a higher security level may override a lower security setting on a banking resource that the bank employee needs to access if a person with a lower corresponding security level is in the same security zone.

Figure 8:
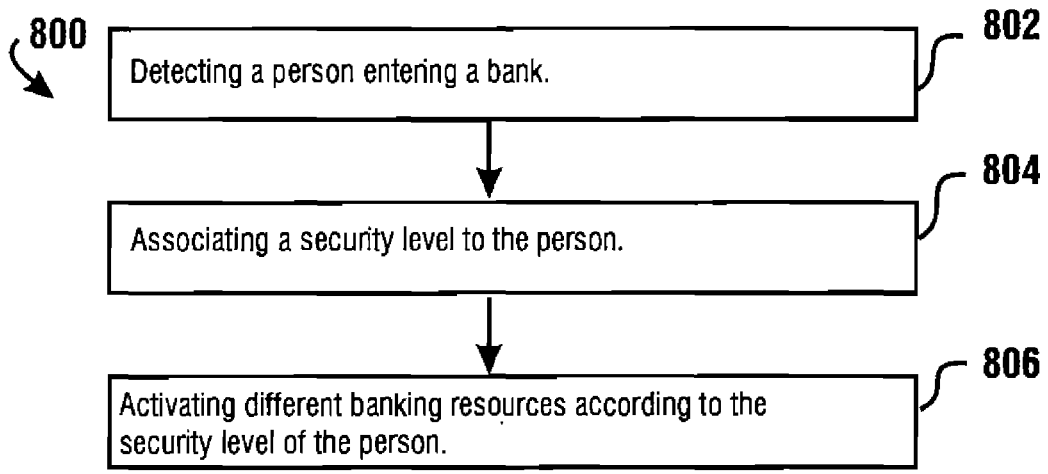
FIG. 8 is a schematic diagram of a method associated with improved banking security using security levels.

FIG. 8 schematically represents an exemplary method of improving banking security using security levels associated with a person 800. The method begins at step 802 by detecting a person entering a bank. When a person is detected, that person may also be identified through operation of one or more computers. At step 804 a security level is assigned to the person detected through operation of such computers. Different banking resources corresponding to the level of security assigned to the person detected are activated in step 806. The banking resources activated responsive to such computers may be only the resources right in front of the person, adjacent to the person or within a limited range of the person to which the person's security level authorizes the person to have access. Of course these approaches are exemplary.

Figure 9:
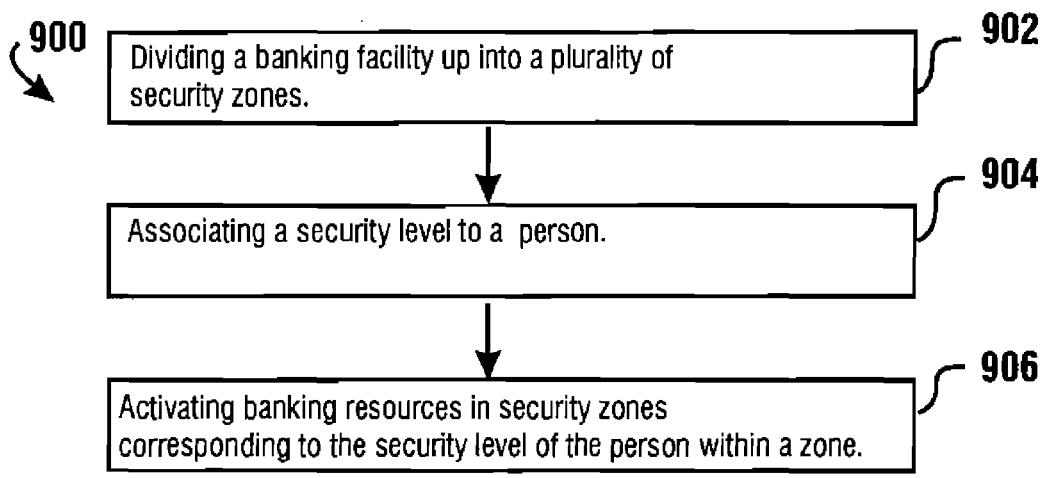
FIG. 9 is a schematic diagram of a method associated with improved banking security using security zones.
Figure 10:
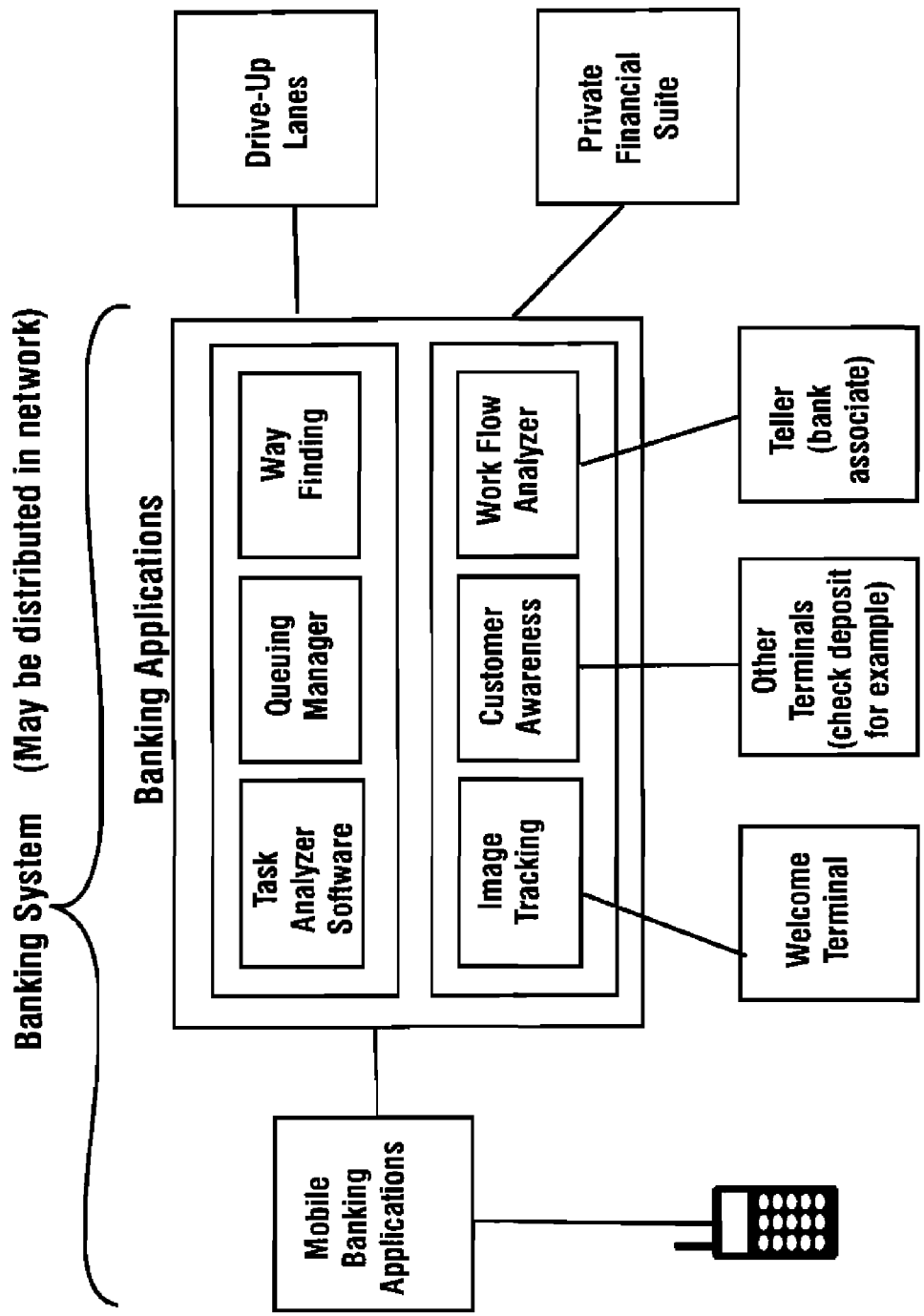
FIG. 10 is a schematic diagram of exemplary software used to improve banking customer transactions.
Figure 11:
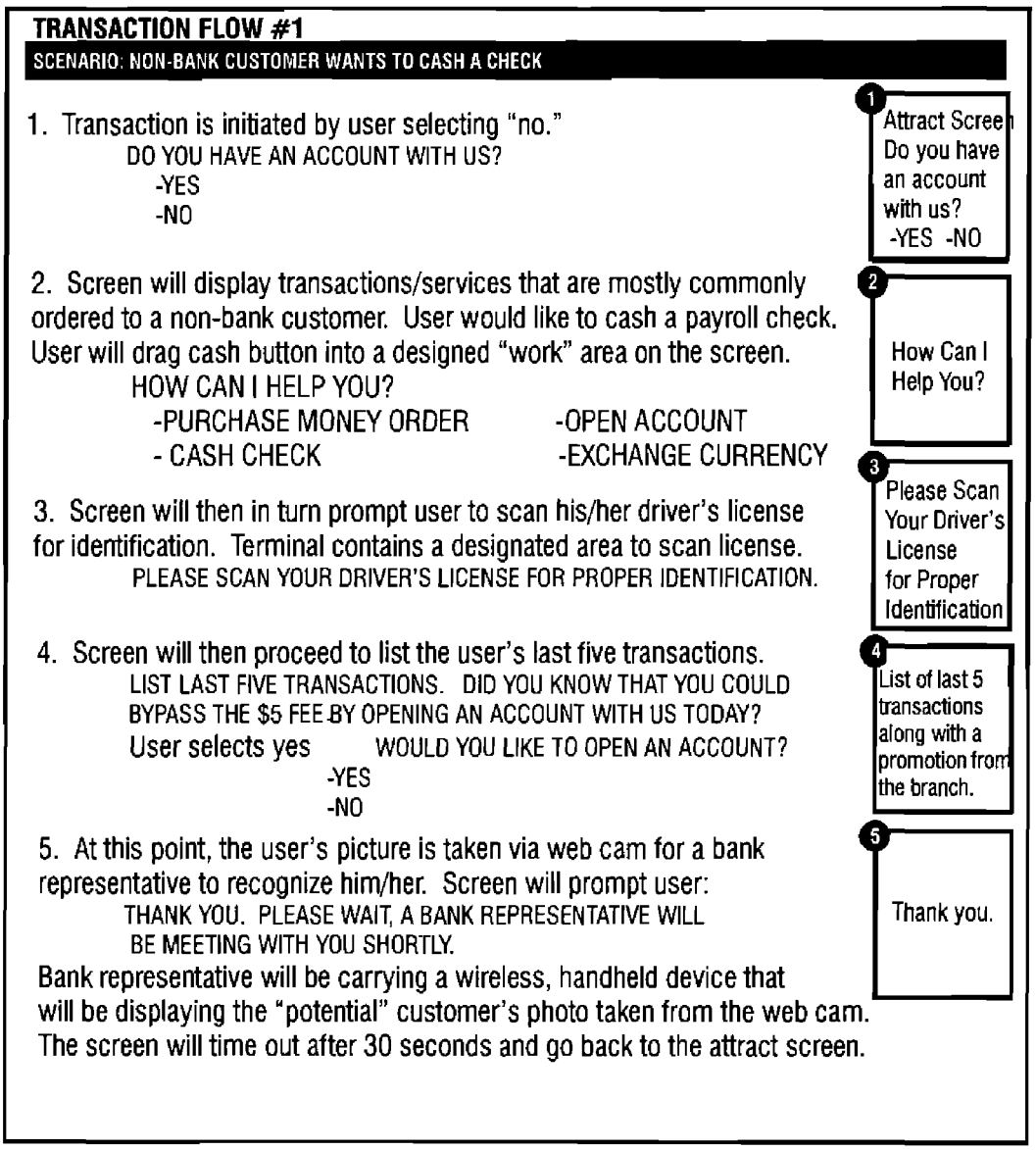
FIG. 11 is a schematic logic flow diagram of an exemplary user interface sequence for a request by a non-banking customer to cash a check.
Figure 12:
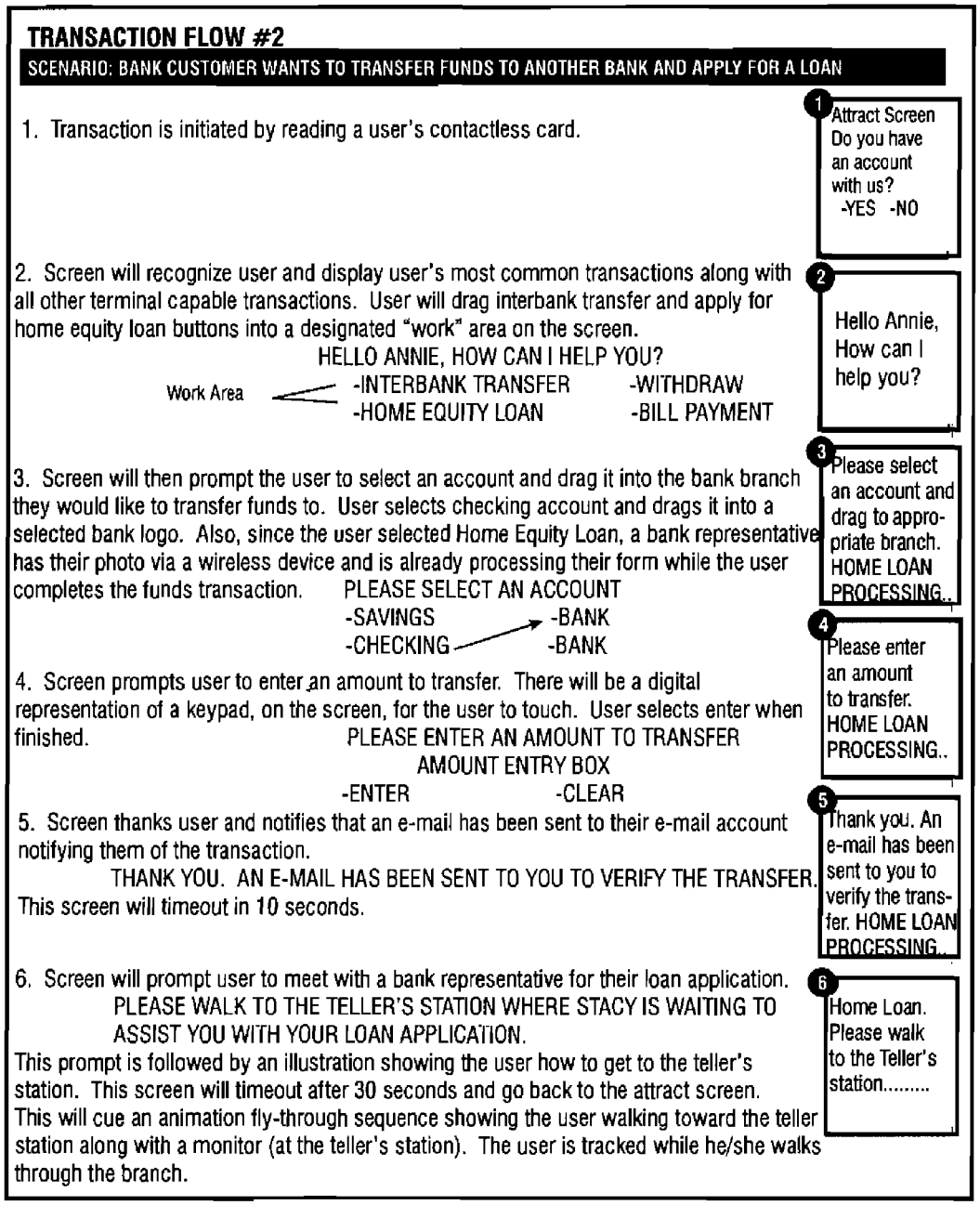
FIG. 12 is a schematic logic flow diagram of an exemplary interface sequence for a request by a banking customer to transfer funds to another bank and apply for a loan.
Figure 13:
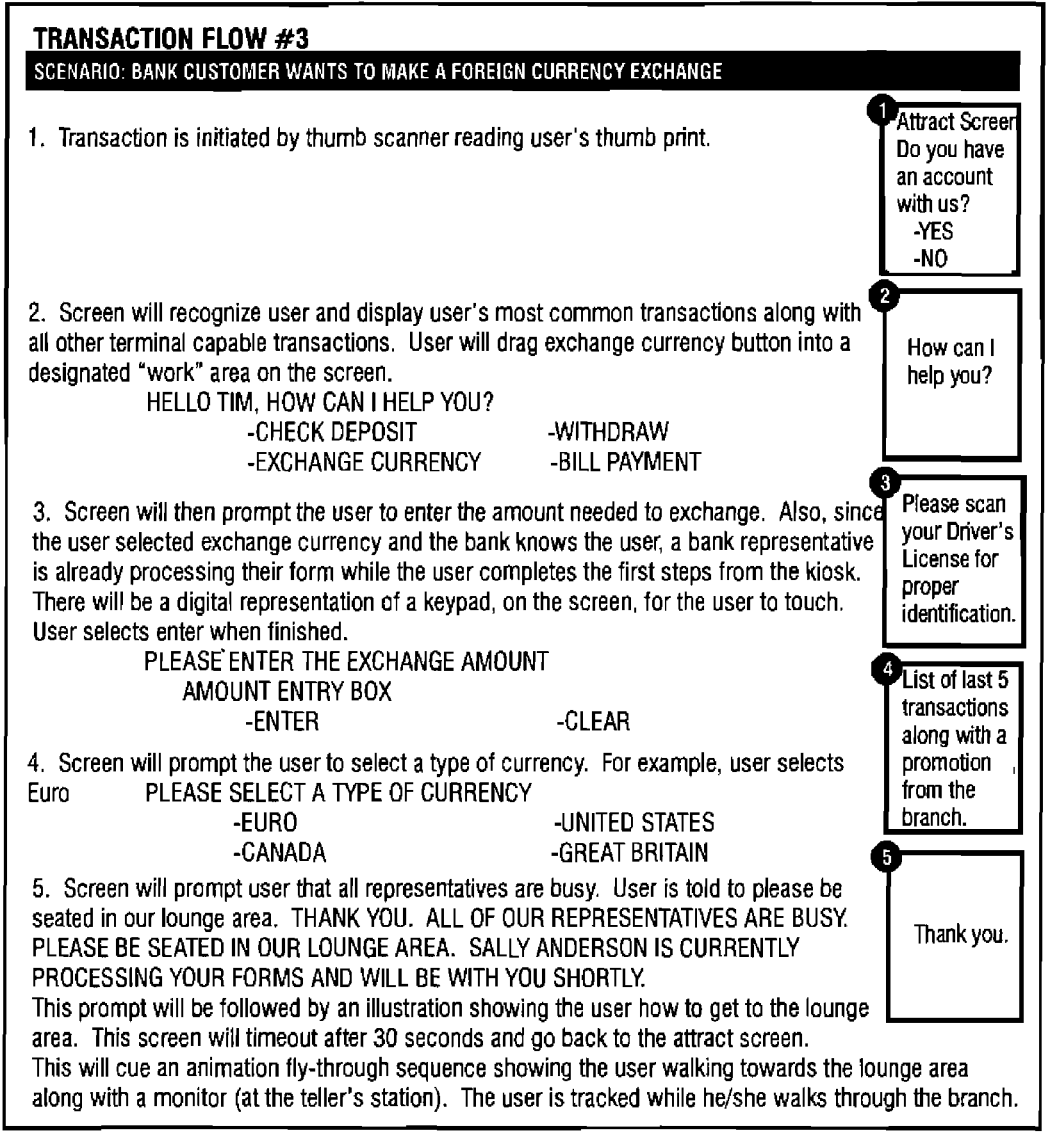
FIG. 13 is a schematic logic flow diagram of an exemplary interface sequence for a request by a banking customer for foreign currency exchange.
Figure 14:
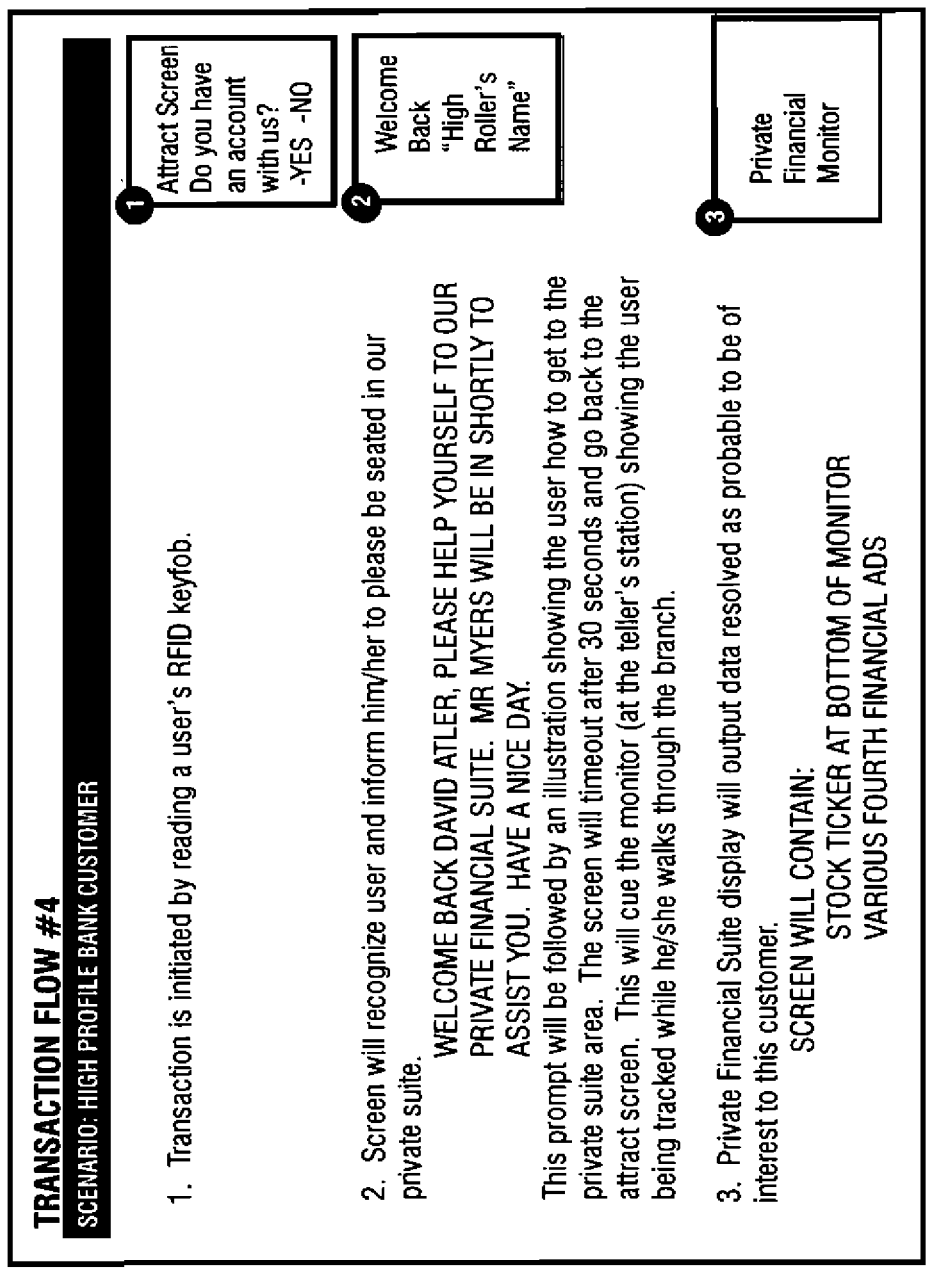
FIG. 14 is a schematic logic flow diagram of an exemplary interface sequence for a request by a high profile banking customer for access to a banking resource.

FIG. 9 schematically represents an exemplary method of improving banking security using security zones 900. The method begins at step 902 by dividing the banking facility through operation of a computer into a plurality of security zones. Zones may correspond to different areas within the banking facility or to different banking resources. In step 904 a security level is assigned to an identified person. In step 906 banking resources within a security zone are activated corresponding to the level of security of a person within that zone. Through operation of one or more computers, the identified individual may operate to receive access to one or more resources, areas, capabilities, data, functions, or other aspects that may be accessed within the banking facility. Computers may operate to minimize the risk of unauthorized activities through the categorization and security levels that are applied to particular individuals. As can be appreciated, in the exemplary embodiments the capabilities of identifying individuals and of granting them different privileges and access to various resources and capabilities enables the more secure conduct of transactions, as well as the preservation of a more secure environment within the banking facility. Of course it should be understood that these approaches are exemplary, and in other embodiments other approaches may be used.

Exemplary embodiments also include a financial transaction arrangement in which a service provider's terminal (or station) is in operative connection with a customer's terminal. The operative connection permits the service provider (e.g., a bank teller) to view the same transaction information as the customer. For example, the service provider may view (through their touch screen) the same transaction screen that is currently being displayed through the customer's touch screen. The communication arrangement can include a system like those described in U.S. patent application Ser. No. 11/360,008 filed Feb. 21, 2006, the disclosure of which is herein incorporated by reference in its entirety.

The operative connection between the service provider's touch screen and the customer's touch screen also allows the service provider to make markings on their touch screen which get displayed through the customer's touch screen. That is, with the same transaction screen being simultaneously displayed to the teller and the customer, the teller can mark on their display to cause the mark to be displayed on both touch screens. For example, the teller can touch their touch screen to create a marking (or drawing) that circles the "I accept" button being output in the common transaction screen being displayed on a teller's touch screen. The creation of this marking made by touching the teller's touch screen also causes this same display marking to be displayed on the customer's touch screen. While a marking is being drawn it can be simultaneously displayed on both touch screens. That is, a marking being made through one screen can be displayed in real time on the other screen.

In an exemplary arrangement, a marking can be produced by the teller sliding or dragging a user finger while it remains in contact with the touch screen, from a first location on the touch screen to a second location on the touch screen. A marking can comprise an outline of a path that follows the movement of a finger placed in contact with the touch screen and then is slid while it remains in contact with the touch screen. The marking created will correspond to the path taken by the teller's finger. That is, the marking generated will follow the course of (trace) the screen-contacting finger (or other screen writing tool).

Likewise, a marking made through the customer's touch screen is also displayed on the teller's touch screen. That is, a customer can produce markings that the teller can see.

The service provider's terminal and the customer's terminal both include application software that allows their touch screens to communicate with each other over a network. The touch screen can be part of various forms of terminals or computers, including for example, a laptop, surface computer, desktop computer, embedded computer, self service terminal, automated banking machine (e.g., ATM), iPad, tablet, smart phone, a handheld portable device, or other device operative to run applications useful in communicating display screen overlays.

A marking can be created using display screen overlay software. The application software causes the same screen overlay that is created by the teller touching the teller's touch screen, to be reproduced through the customer's touch screen, and vice versa.

The service provider can be local or remote relative to the customer. For example, a local service provider may comprise a bank teller (or other bank employee) in a bank building, where the teller is assisting a customer in the same bank building. In contrast, a remote service provider may be located in one building while the customer is in another building. A remote service provider may even be located in a different country.

The service provider can provide inputs through the customer's touch screen to guide the customer through a transaction. The communication arrangement link between the service provider's touch screen and the customer's touch screen permits the service provider to electronically point to specific locations on the customer's touch screen. For example, the service provider may control a virtual pointer which is movably displayed on the customer's touch screen to point out banking options or information. Such a pointer may also be used to show a customer which input devices to press to engage a particular transaction function. These customer input devices can be physical function buttons that are located adjacent to a customer screen's side. Such input devices can also be virtual buttons or icons that are displayed through the customer's touch screen.

In another example, the service provider may use a type of teleprompter which enables the customer to view an arrow on the customer's touch screen. Besides the touch screen, the service provider station may also include input devices such as a touch pad and mouse that enable the service provider to move indicators such as a pointer, highlighter, or icons on the customer's display screen. In this way a service provider is able to indicate to the customer, particular features or items as appropriate in connection with the display currently being output on the customer's display screen. The exemplary arrangement allows a service provider to better assist a customer in understanding exactly which button or key to operate, or which section of the customer's touch screen to touch to achieve the desired effect.

An exemplary arrangement allows the service provider to physically contact their touch display screen to provide (e.g., draw) hand written notes, comments, marks, and/or symbols which get displayed through both the service provider's touch screen and the customer's touch screen. The service provider also has options for turning their (and the customers') multi-displayed drawing feature on and off.

The service provider can create a marking by contacting their touch screen with their finger(s) or with some other hand drawing/writing implement. For example, such implement can comprise an electronic pen, teleprompter, finger pad, or mouse.

Figure 15:
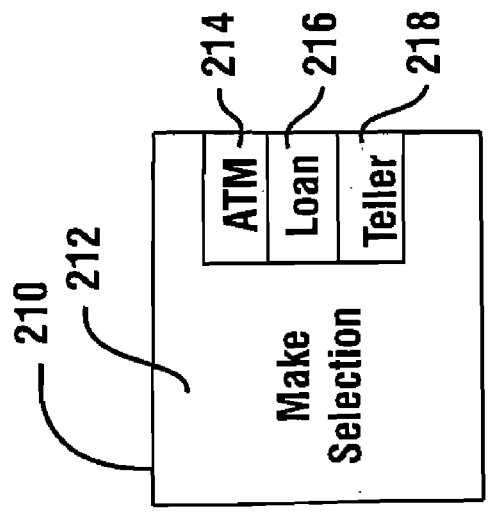
FIG. 15 shows a front view of a customer touch screen.

FIG. 15 shows a customer's touch screen 210 that is part of a customer station (or terminal) which can also have a computer and other components/devices. As previously discussed, the screen has a display area which can output information that allows a customer to carry out a desired transaction or other banking function. In the example shown, the screen 210 presents an output 212 that includes a (make selection) message and virtual buttons (function keys) for selecting a function involving any of an ATM 214, a loan 216, or a teller 218. A customer can touch the corresponding key to select the transaction function desired. Touching the ATM key 214 correspond to a customer selection that causes the customer station to function as an ATM, which can include a user data reader (e.g., card reader, biometric reader), cash dispenser, check acceptor, an/or a deposit acceptor. Touching the loan key 216 presents the customer with a series of screen outputs for filling out a loan application request. Touching the teller key 218 connects the customer with a teller. The teller key 218 may be shown in every screen output so the customer can always contact the teller for assistance. It should be understood that many other buttons and screen displays can be presented to a customer. The displays output through the customer screen 210 are determined and controlled by corresponding computer programming.

Figure 16:
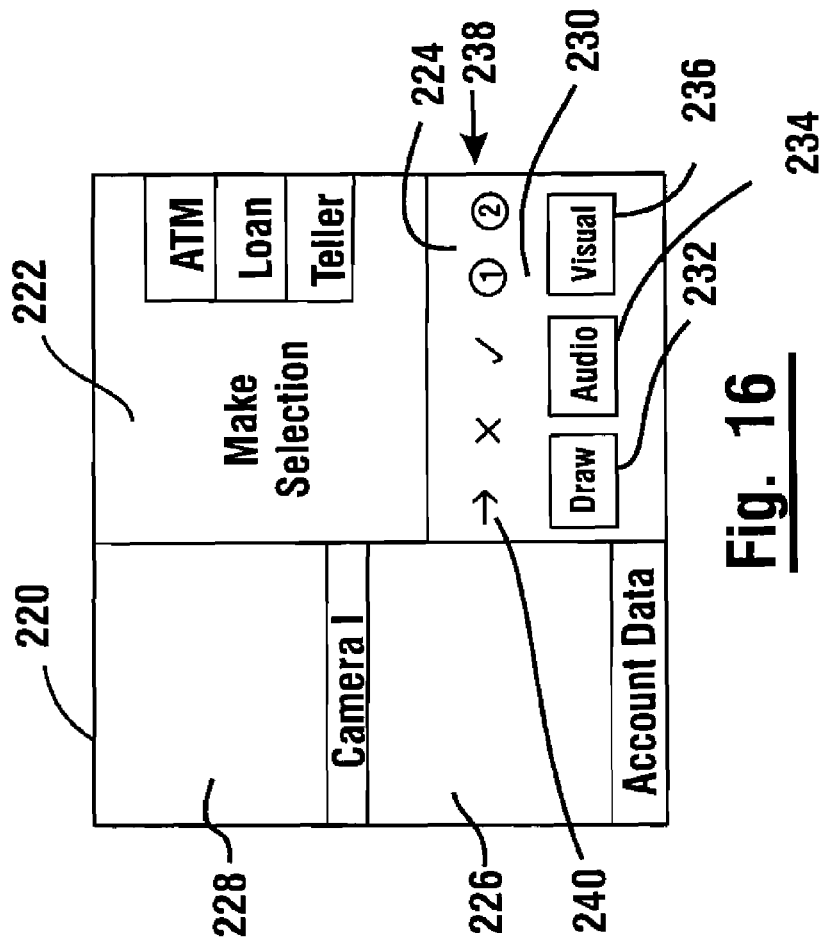
FIG. 16 shows a front view of a service provider touch screen.

FIG. 16 shows a service provider's touch screen 220. The provider's touch screen 220 can be physically larger (with a larger display surface) than the customer touch screen 210. The extra area of the service provider's display surface can include information usable by the service provider to assist the customer in performing a banking function. This information can include data which the customer cannot see.

The provider screen 220 can simultaneously output several different displays in respective different areas (or portions) of the display surface. For example, a first display area 222 can display the identical customer screen output 212 that is being displayed (as shown in FIG. 15) through the customer's display screen 210. A second display area 224 can provide visual tools 230 which the provider can use in assisting the customer. A third display area 226 can output customer account data. A fourth display area 228 can output real time images of the customer, which are captured by a camera near the customer station.

The on-screen visual tools 230 can include (for example) predetermined icons, symbols (e.g., arrows), words (e.g., instructions), thumb nails, and/or images. The example work tools shown include selectable symbols 238 for an arrow, "X", check mark, and the numerals one and two. The example work tools also include virtual buttons for selection of draw, audio, and visual. Touching the draw button 232 allows the service provider to manually mark on the screen, which in turn (as previously discussed) causes the generated mark to be displayed on both touch screens. The audio button 234 places the provider in audio communication with the customer. The visual button 236 allows the provider to view the customer in the display area 228.

The service provider can touch their screen 220 to drag and drop a symbol from the display (work) area 224 onto the display area 222 that shows the reproduction of the customer's screen output. For example, the service provider can move (e.g., using a finger, a mouse, etc.) the visual arrow 240 (or a shadow copy thereof) to an exact location on the customer screen output 212 shown in the display area 222. This movement causes a copy of the arrow 240 to visibly remain at that specific location on both the reproduced customer screen output 222 and the actual customer screen output 212. The finger-sliding drag and drop feature also allows the arrow 240 (or a different visual symbol) to be rotated so it can be pointed in a specific direction (or orientation) at a particular item (e.g., a virtual button) being displayed in the customer's screen output 212.

An exemplary arrangement involving a local service provider will now be discussed. A customer enters a bank and proceeds to a self-service transaction machine (e.g., customer terminal, customer station, ATM, etc.), which includes a touch screen and audio/video devices. The machine has the bank's customer assistance application operating thereon. While using the machine to perform a transaction, the customer provides input to the machine that requests assistance. The bank's customer communication network places the machine in contact with an available bank employee (e.g., a bank teller) who is located in the bank. This enables the bank employee to view on the touch screen of their terminal, the same screen output that is being displayed through the machine's touch screen. The network also places the bank employee and customer in real time audio and visual communication with each other via the terminal and machine. The bank employee can converse with the customer to determine the type of assistance desired. The bank employee can assist the customer such as by contacting their touch screen with their finger in pointing to a specific area of the screen output. This contacting causes a marking to be produced and displayed on both the bank employee's touch screen and the machine's touch screen. The marking produced corresponds to (matches) the movement of the bank employee's finger while it was contacting the touch screen. As previously discussed, the marking can be an indication that informs the customer or designates a particular area of the customer's screen, including markings of an arrow, circle, rectangle, asterisk, letter "X", number(s), character(s), underline, note, highlight, etc.

In some exemplary embodiments, the terminal may have the ability to have documents filled out and executed using the terminal. The display may provide for a split screen where a teller may be present on one side and a form may be present on the other side. The user may then complete the form with the help of the teller by touching the screen. The user may also sign the form in a manner such as previously discussed, by the movement of their finger over the screen or by agreeing that their image as taken by a camera or other input constitutes their designated signature on the form. Features may be used as disclosed in U.S. patent application Ser. No. 13/135,143 filed Jun. 27, 2011 the disclosure of which is incorporated herein by reference in its entirety. Alternatively, instead of completing the documents at the terminal, the documents from the terminal may be loaded onto the mobile device of the user, whereby the user could then transport the documents home to be completed at their convenience, such as on their mobile device.

The teller may be located at a remote location and be able to handle several different land based terminal locations. The teller can be a live human being or be a computer-generated teller. The terminal may include a help button. For example, if a customer initiates a banking transaction on their own, but during the transaction finds that they need assistance completing the transaction, the user may push a help button and a video feed of a live teller may come on the display screen to assist the user in completing their banking transaction at the terminal. As an alternative, the user could just opt to have a live teller assist them through the entire banking transaction from start to finish immediately upon walking up to the terminal. The use of a live teller being presented via a video or a virtual teller may provide additional services to customers up to twenty-four hours a day, thereby giving banking customers the benefit of a teller during non-traditional banking hours.

The customer may have a live or virtual teller assist them in any desired kind of banking transaction, such as withdrawing or depositing money, transferring money between accounts, issuing money orders, depositing checks, filling out a loan application, and the like.

In some exemplary embodiments, the terminal may include voice response systems. These systems can be interactive or automated, and may be utilized to help guide customers through various transactions. For example, the terminal may respond to voice commands from the customer as well as audibly respond back to the customer, whereby the entire transaction may take place verbally without any physical interaction required on the part of the customer, such as pushing buttons or touching the touch screen. Responsive to listening to the customer, one or more computers are operative to cause the terminal to provide outputs appropriate to assist the user through the desired transaction.

An exemplary arrangement involving a remote service provider will now be discussed. Instead of the service provider being a bank teller who is located in the same bank as the customer (as discussed above in the local service provider arrangement), the service provider is remotely located from the customer. For example, the service provider and the customer may be located in different cities. The customer can still use a self-service transaction machine (e.g., customer terminal, customer station, ATM, etc.), which includes a touch screen and audio/video devices. However, the machine is not limited to being located inside of a bank building. The machine has a customer assistance software application operating thereon. A communication network (which may include the Internet) allows the customer to place the machine in communication with the service provider's station. This enables the service provider to view on their touch screen the same screen content that is being output through the machine's touch screen. The service provider can provide assistance by contactingly engaging their touch screen to cause a corresponding marking to be displayed on the machine's touch screen. Likewise, the customer can contactingly engage their touch screen to cause a marking (e.g., a question mark) to be displayed on the service provider's touch screen. Audio (microphone/speaker) and visual (camera/display) communications are also available.

Another exemplary arrangement involving a remote service provider will now be discussed. Instead of the customer using a self-service transaction machine (as discussed above in the prior remote service provider arrangement), the customer uses a personal portable computing device, which has a display screen. For purposes of this example, a smart phone will be used. However, as discussed previously, it should be understood that many other types of personal portable computing devices can be used.

The phone has the customer assistance application thereon. The customer can be a client of a transaction assistance service that is affiliated with the application. The service offers live human assistance to carry out financial transactions. The transactions may involve banking, stock trading, investing, gambling, etc. A financial institution (e.g., bank, brokerage, casino) may provide the service for free to a customer who is considered to be a VIP (very important person) by that institution. Alternatively, a customer may be required to pay a fee for the transaction assistance service.

While the customer is using their phone to carry out a remote banking transaction, assistance with the transaction is needed from the service. The customer uses the customer assistance application to access the service's communication network. This access allows the customer to communicate with a live service provider. This access also allows the service provider's touch screen to be linked with the phone's display screen. The service provider can view through their display touch screen the same transaction information that is being output through the phone's display screen. In a manner previously discussed, the service provider can provide assistance to the customer by manually slidingly engaging their touch screen to cause a corresponding sliding marking to be output through the phone's display screen. Furthermore, the phone screen can be a touch screen, enabling the customer to cause similar markings to be generated and displayed through the service provider's touch screen.

Both the service provider terminal and the customer terminal can include more than one display screen. The exemplary arrangement also permits visual and audio communication between the service provider and the customer. The service provider and the customer can view each other through a respective display screen. For example, a touch screen can be used that allows a PIP (picture in picture) type of display.

The exemplary arrangement enhances customer service because it allows the service provider to view the same transaction information (e.g., same display screen output) that the customer is currently viewing. The exemplary arrangement can reduce average time used by a teller in assisting a customer to carry out a banking function.

FIG. 17 shows a side view of a shared station 250 having a configuration that includes dual touch screens and a stand 252. A service provider touch screen 254 is on one side of the configuration and the customer touch screen 256 is on another side (e.g., opposite side or an adjacent side). The screens can have the same dimensional size. The arrangement allows for the customer and the service provider to be situated at the same table 258. The relative closeness allows direct visual and audible conversation between the parties. Alternatively, the shared station 250 can be built into a (dividing) wall, with the different screens 254, 256 located in different rooms.

In another embodiment, a shared station may have only one display touch screen. For example, the display screen can be a display surface of a surface computer arrangement. The service provider can provide touch screen input that causes the screen output to be rotated 180 degrees. This feature allows a document to be flipped back and forth for reading between the service provider and the customer.

FIG. 18 a top view of customer stations 262, 264 that are separated yet locally positioned with a common service provider station 260. The touch screens 262, 264 are located in the same building facility (e.g., a bank) 266. The customer stations are provided with a privacy screen 268. The service provider touch screen 260 is in operative connection with the customer touch screens 262, 264. The service provider station is in a room 270 which is secure from (e.g., inaccessible to) bank customers. The security room provides physical safety to the human service provider (e.g., the assisting bank employee). The arrangement allows the bank employee to simultaneously provide assistance to (and safely communicate with) a plurality of local bank customers. Bank customers can also walk up to bank teller windows 272, 274, 276 (or stations) to receive assistance from tellers located in a teller area 278.

Figure 19:
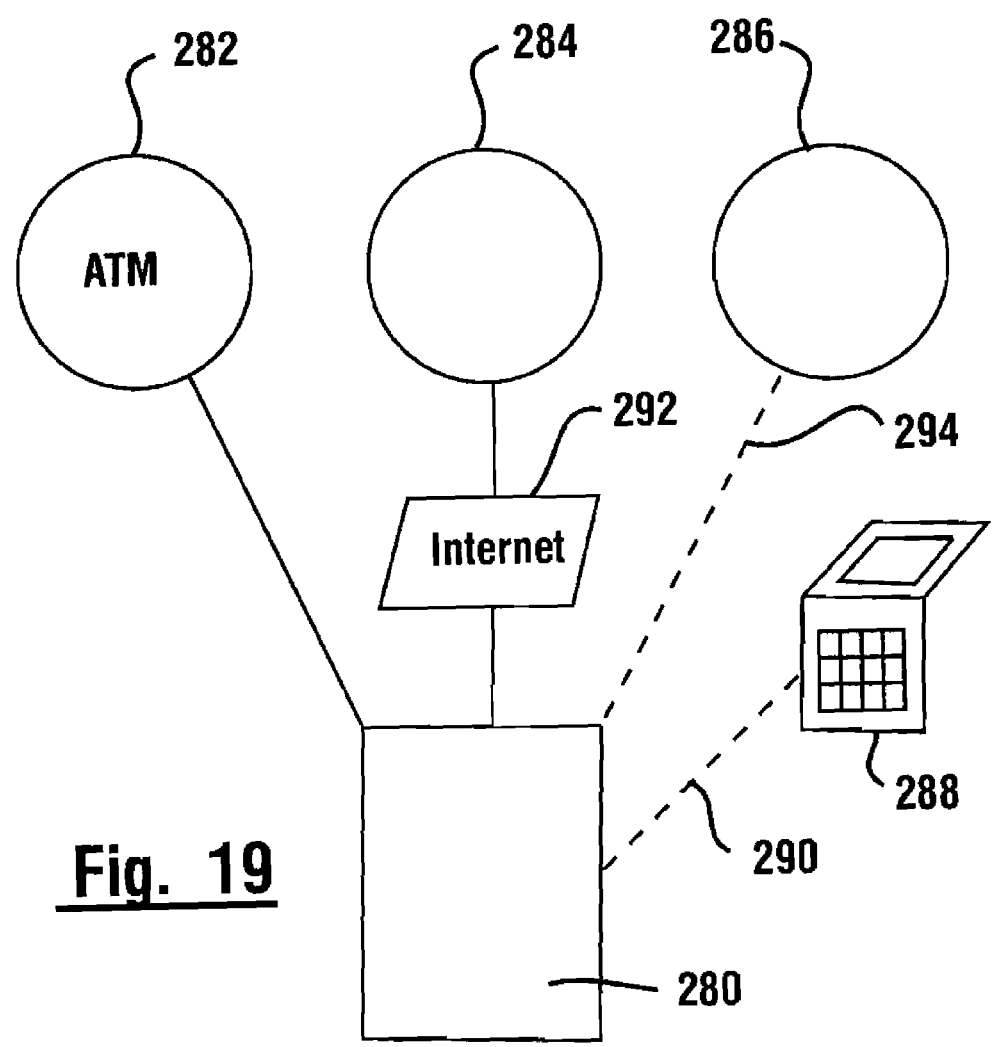
FIG. 19 shows a plurality of customer stations that are remotely located from a shared service provider station, which can communicate with each respective customer station.

FIG. 19 shows a plurality of customer stations 282, 284, 286, 288 remotely located from a service provider station 280. The service provider touch screen is in operative connection with each of the customer touch screens. The arrangement allows for the same service provider touch screen 280 to respectively remotely communicate with each of the customer touch screens 282, 284, 286, 288. The customer stations are geographically remotely located from each other.

The service provider may be physically located in a foreign country relative to the customers.

The service assistance provided can use several different communication formats, including wireless 290, Internet 292, and/or satellite 294 communication. As previously discussed, a customer touch screen can be part of a personal portable computing device 288, such as a smart phone owned by a customer. Alternatively, a customer touch screen can be part a device not owned by the customer. For example, an automated banking machine (e.g., ATM) 282 can include the customer touch screen. Thus, the embodiment allows both a phone owner and an ATM customer to receive similar on-screen assistance from a same remote service provider.

Figure 20:
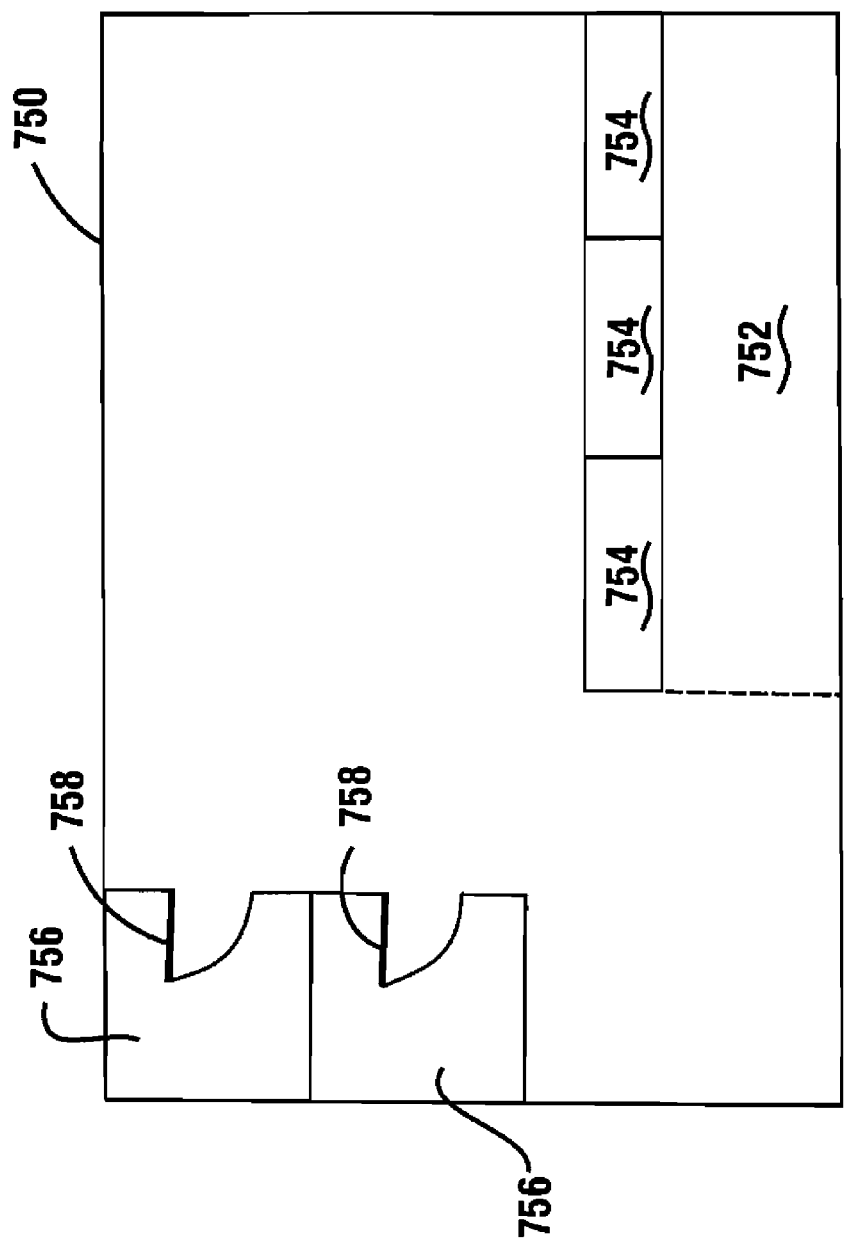
FIG. 20 shows a top view of a banking area that houses a bank teller area and banking enclosures.

FIG. 20 illustrates a top view of a banking area 750. The banking area 750 can be located in a banking facility 200 as discussed herein and illustrated in FIG. 2. The banking area 750 may include a teller area 752 with teller windows 754. The banking area 750 may also include an enclosure 756. In some exemplary embodiments, a terminal 760 is located within the vestibule, housing, or enclosure 756. The terminals are operatively connected to the network 102. The terminals can include computers with associated input and output devices or other devices that are operative to run software programs locally and are connected to data storage devices 110. The exemplary terminal may comprise a thin client software architecture in operative connection with a server running applications requested by the terminal. Alternatively the terminal may comprise a computer operative to run some applications locally therein while accessing other applications that are run remotely on another computer such as a server 90. In some exemplary embodiments terminals comprise automated banking machines. In the exemplary system, one or more banking computers 20 are operatively connected to the exemplary network 102. A banking computer 20 may comprise one of various forms of computers, including for example, a laptop, surface computer, desktop computer, embedded computer, self service terminal, automated banking machine, or handheld device operative to run applications useful in banking transactions.

In an alternative embodiment, the terminal 760 is integrated with a housing or enclosure. This enclosure can be located inside or outside of the bank or at a location remote to the bank. This enclosure may provide an additional level of privacy, security and comfort for the customer before, during and after the transaction. In addition, the customer may be more comfortable talking to a terminal during a transaction because their chances of being overheard are lessened. In an exemplary embodiment, the enclosure 756 may include a door 758.

Whether the terminal 760 is located within or integrated with an enclosure, the enclosure may include additional privacy panels or walls 762, such as glass walls. For example, the glass wall(s) 762 of the enclosure 756 may include a liquid crystal material, electrochromic device, suspended particle device and the like, whereby the glass walls are turned from clear to frosted or opaque while a customer is making a transaction within the enclosure. These glass walls may include electrically switchable glass or glazing that changes light transmission property when voltage is applied. The glass walls may be operated by a remote control, movement sensor, the flip of a switch, press of a button, or by the closing or the locking of a door 758, which may complete an electrical circuit. For example, when an electrical supply is switched on, the liquid crystal molecules align and light may pass through the glass wall. When the power is switched off, the liquid crystal molecules may be randomly oriented, thereby scattering light and the glass wall becomes opaque.

The enclosure may further include soundproof walls 762. For example, the enclosure 756 may include soundproof glass walls or the walls may be fabricated out of another material, such as sound insulating fabric, felt of the like that may dampen the outside sounds and prevent others from being able to hear what is occurring within the enclosure. Thus, the customer may complete their banking transaction in quiet while possibly being in noisy surroundings. In an alternative embodiment, the enclosure 756 may utilize a film-coated glass, whereby advertising can be projected on the glass or messages indicating that the enclosure is occupied when a person is conducting a transaction within.

FIG. 21 illustrates a top view of an enclosure 756 housing a terminal 760 therein. FIG. 22 illustrates a top view of an enclosure 756 where an interactive surface computer 766 is utilized and housed therein. In some exemplary embodiments, the surface computer 766 may comprise or be located on a wall. This surface computer wall can be one side, section, or portion of an enclosed space or enclosure, such as any appropriate geometric shape. For example, the surface computer can be one side of a three or four-sided structure, such as a triangle, square or rectangle. The other two or three sides of that structure may comprise glass walls (that may switch between clear and opaque), whereby the terminal and enclosure will simply be a three or four-sided structure that the customer can enter and exit via one of the walls that may act as a door. Any transaction involving a monetary exchange or transfer can be completed via NFC technology from the interactive surface computer wall to the customer's mobile device. Alternatively, instead of one wall being an interactive surface computer, the customer may be presented with a video or holographic image of a teller on one of the walls and proceed with the transaction in a verbal manner without the requirement for any physical actions.

The terminal 760, surface computer 766 and/or the enclosure 756 that encompasses the terminal 760 may include multiple cameras 768 or gesture recognition software that may interpret human gestures. Responsive to having determined that the particular customer is at the surface computer or terminal, one or more computers are operative to cause the terminal to provide outputs appropriate for the particular user. The user may interact with the terminal by pointing a finger at the display screen to instruct a pointer or cursor, for example, to move accordingly. For example, gesture recognition software may be beneficial for customers who speak sign language.

In other exemplary embodiments, the surface computer and/or the shelf as described herein, may allow for multiple users to interact with the surface computer simultaneously. For example, an adult couple may complete separate banking transactions at the same time to speed up the transaction time, whereby one member of the couple may deposit money and the other member may be checking the status of a different account, withdrawing money, or initiating a loan process. In another example, a parent can be completing a banking transaction while a child or children is coloring a picture, playing a game, or watching a cartoon on the surface computer to entertain themselves until their parent is finished.

The enclosure 756 may have an ambient intelligence, whereby the enclosure is sensitive and responsive to the presence of individual users and their preferences. The enclosure may recognize individual users and be tailored to each user's needs as well as change in response to each user. Responsive to having determined that the particular customer is located within the enclosure, one or more computers are operable to cause the terminal or surface computer to provide outputs appropriate for the particular user. For example, the database of customer preferences may also include preferences related to a desired indoor climate, whereby the enclosure may respond by adjusting the temperature within the enclosure to suit the customer's preferences. This environmental adjustment response may be activated by a voice-activated control, wall control, or by the identification of the customer by any appropriate manner, such as those described herein. For example, the environmental adjustment may be activated by an RFID chip or NFC device on the user's identification card, in the user's mobile device 764, on the user's person and the like. Similarly to adjusting the temperature, the enclosure may also adjust the lighting within the enclosure to suit the customer's needs and preferences. In summary, the enclosure may adapt its interior to the needs of each particular user, such as by personalized lighting, audio volume, background music, temperature setting and the like.

In some exemplary embodiments, the terminal 760 and/or enclosure 756 may include an artificial sensate skin device that may mimic the characteristics and functions of its analogous living tissue. The skin can be mechanically flexible. The terminal may include an exterior that is pleasant to touch. For example, the terminal can be entirely covered with or have portions that are covered with a material that customers may touch or interact with that feels like warm skin, velvet, cotton or the like. The covering may act as a responsive architecture, whereby the covering can be mechanically flexible and scalable. The covering may measure actual environmental conditions, such as via sensors, to enable the covering to adapt its form, shape, color, or character responsively, such as via actuators. The covering is able to alter its form to continually reflect the environmental conditions that surround it.

Alternatively, the covering can be of a large size that may act as an enclosure to the terminal. For example, the covering may physically configure itself to each particular user and/or environment to meet changing needs or desires for varying situations. The covering may function as an evolving organism that learns and adapts to the user and environment. In a situation where the covering acts as an enclosure to the terminal, the covering may enlarge itself or make itself smaller depending upon how large an area is needed. For example, if the covering is acting as an enclosure for the terminal, the enclosure may react to change its size depending upon how many people are standing at the terminal, such as if a parent has a child or multiple children with them or if a couple is standing at the terminal together, which may provide a more comfortable environment for the user and the user's companions while also providing additional security during the transaction.

This covering may inherit the characteristics of human skin and move either in response to vocal outputs by the user or just provide soothing periodic movement. This covering can be an electronic sensate skin that may include many sensing or sensory nodes or inputs and be pressure sensitive. Each node may measure strain, pressure, ambient light, sound and the like, whereby the covering may adapt to external stimuli by modifying its behavior in response to its environment and/or the user. These nodes can be in communication with one or more of the computers in the banking network 102. The covering may provide a computer driven physical responsive surface that may be reactive or reflexive to supplied stimuli. The nodes can be densely distributed over a surface or throughout a material and be able to emulate the functionality and characteristics of a biological skin. This covering is able to vary in temperature. For example, during the warmer summer months the covering is able to feel cooler to the (manual) touch. Conversely, during the cooler winter months the covering is able to feel warmer to the touch. Alternatively, once the terminal identifies the current user, the covering may respond to instructions from a database and project a certain predetermined temperature that the specific user prefers.

It should be understood that the arrangements shown are exemplary, and that other arrangements and embodiments can be used. For example, other arrangements can include a plurality of service provider stations as needed to assist a large number of customer stations. The service provider stations can be located at a common location, where each service provider station is able to communicate with each customer station. The arrangement allows the next available service provider to then assist the next customer waiting in a holding queue. Other embodiments enable the next available service provider to quickly assist any waiting VIPs.

Thus the new apparatus, systems, and methods of the exemplary embodiments described achieve one or more of the above stated objectives, eliminate difficulties encountered in the use of prior devices and systems, solve problems, and attain desirable results as described herein.

In the foregoing description certain terms have been used for brevity, clarity, and understanding, however no unnecessary limitations are to be implied therefrom because such terms are for descriptive purposes and are intended to be broadly construed. Moreover, the descriptions and illustrations given herein are by way of examples and the invention is not limited to the details shown and/or described.

In the following claims, any feature described as a means for performing a function shall be construed as encompassing any means known to those skilled in the art as being capable of performing the recited function, and shall not be limited to the particular structures and/or features shown in the foregoing description or mere equivalents thereof.

The term "non-transitory" with regard to computer readable medium is intended to exclude only the subject matter of a transitory signal per se, where the medium itself is transitory. The term "non-transitory" is not intended to exclude any other form of computer readable media, including media comprising data that is only temporarily stored or stored in a transitory fashion. Should the law change to allow computer readable medium itself to be transitory, then this exclusion is no longer valid or binding.

Having described the features, discoveries and principals of the invention, the manner in which it is constructed, operated, and utilized, and the advantages and useful results attained; the new and useful structures, devices, elements, arrangements, parts, combinations, systems, equipment, operations, methods, processes, and relationships are set forth in the appended claims.

We claim:
1. Apparatus comprising:
   at least one customer station,
      wherein the at least one customer station includes a first customer station,
      wherein the first customer station is a portable communication device,
      wherein the first customer station includes a customer display,
      wherein the customer display includes a customer touch screen,
         wherein the customer touch screen is operable to respectively output different visual displays that are each separately viewable by a customer at the first customer station, a service provide (SP) station,
  wherein the SP station includes a SP display,
    wherein the SP display includes a SP touch screen,
      wherein the SP touch screen includes a surface area,
      wherein the SP touch screen differs from the customer touch screen,
at least one computer,
  wherein the first customer station and the SP station are both located in a bank facility that provides bank teller assistance;
  wherein the at least one computer operatively connects the SP station and the first customer station,
    wherein the at least one computer is operable to cause an actual visual display that is currently being output through the customer touch screen, to be reproduced and simultaneously output as a reproduced visual display through a first portion of the SP touch screen,
      wherein the at least one computer is further operable to cause an electronic marking to be visually added to the actual visual display, responsive at least in part to the first portion of the SP touch screen being manually touched,
        wherein manual movement of a SP finger while the finger is kept in contact with the surface area, causes the electronic marking to be output in the actual visual display.

2. The apparatus according to claim 1 and further comprising a banking system arrangement, wherein the arrangement includes a plurality of customer stations in operative connection with the SP station,
  wherein the plurality of customer stations include the first customer station,
  wherein the plurality of customer stations include an automated banking machine that is operable responsive to at least in part to data bearing records to carry out financial transactions,
  wherein the machine includes a cash dispenser,
  wherein the cash dispenser is operative to selectively dispense cash stored in the machine to authorized users of the machine,
  wherein the machine includes at least one reader,
    wherein the at least one reader is operative to read customer data usable to identify a financial account on which a financial transaction can be carried out,
  wherein the at least one computer is operative to cause the machine to carry out a requested cash withdrawal transaction on a financial account, based at least in part on the financial account corresponding to customer data read by the at least one reader.

3. The apparatus according to claim 2 wherein the at least one reader includes a card reader and a biometric reader,
  wherein the at least one computer is operable during a transaction to
    cause card data to be read from a customer card through operation of the card reader, and
    cause biometric data to be read from a customer through operation of the biometric reader,
  wherein the at least one computer is operable to cause the read card data to be compared with card information stored in an authorized machine user information data store,
  wherein the at least one computer is operable to cause the read biometric data to be compared with biometric information stored in the authorized machine user information data store,
  wherein a customer is authorized to request a financial transaction that involves operation of the cash dispenser responsive at least in part to both
    computer-determined correspondence between the read card data and stored card information, and
    computer-determined correspondence between the read biometric data and stored biometric information.

4. The apparatus according to claim 1 wherein the one of a personal computing device or a personal communication device comprises a wireless device,
  wherein the wireless device comprises one of a PDA device, iPad device, a tablet device, laptop computer, or smart phone.

5. The apparatus according to claim 1 wherein manual movement of a SP finger while the finger is kept in contact with the surface area, causes the electronic marking to be generated,
  wherein a shape of the generated electronic marking corresponds to a path taken by the finger during the finger movement.

6. The apparatus according to claim 5 wherein the at least one computer is operable responsive to the path being along the surface area from a first position to a second position over the reproduced visual display, to cause a same electronic marking shape to be displayed between a corresponding first position and a second position of the actual visual display.

7. The apparatus according to claim 1 wherein the portable communication device is a mobile phone.

8. The apparatus according to claim 1 wherein the at least one computer is operable to cause a same electronic marking to be simultaneously displayed through both the SP touch screen and the customer touch screen, responsive to the SP touch screen being manually touched.

9. The apparatus according to claim 1 wherein the portable communication device is a mobile device of a banking facility.

10. The apparatus according to claim 9 wherein the mobile device comprises phone communication capabilities.

11. Apparatus comprising:
  at least one computer station,
    wherein the at least one customer station includes a first customer station,
      wherein the first customer station includes a customer display,
        wherein the customer display includes a customer touch screen,
          wherein the customer touch screen is operable to respectively output different visual displays that are each separately viewable by a customer at the first customer station,
  a service provider (SP) station,
    wherein the SP station includes a SP display,
      wherein the SP display includes a SP touch screen,
        wherein the SP touch screen differs from the customer touch screen,
  at least one computer,
  wherein the first customer station and the SP station are both located in a bank facility that provides bank teller assistance;
    wherein the at least one computer operatively connects the SP station and the first customer station,
      wherein the at least one computer is operable to cause an actual visual display that is currently being output through the customer touch screen, to be reproduced and simultaneously output as a reproduced visual display through a first portion of the SP touch screen, wherein the at least one computer is further operable to cause an electronic marking to be visually added to the actual visual display, responsive at least in part to the first portion of the SP touch screen being manually touched,
wherein a second portion of the SP touch screen includes a plurality of visual icons having respective predetermined shapes, wherein the electronic marking comprises a first icon of the plurality of visual icons,
wherein manually moving the first icon from the second portion onto the first portion of the SP touch screen causes the first icon to be reproduced on the customer touch screen.

12. The apparatus according to claim 11 wherein placing the first icon at a specific position on the reproduced visual display causes the first icon to be reproduced at a corresponding specific position of the actual visual display.

13. The apparatus according to claim 12 wherein the SP touch screen includes a surface area, wherein the SP touch screen allows the first icon to be electronically dragged on the surface area from the portion onto the first portion.

14. The apparatus according to claim 13 wherein the SP touch screen allows the first icon to be electronically dragged through manual movement of a SP finger while the finger is kept in contact with the surface area above the first icon.

15. The apparatus according to claim 13 wherein the SP station includes a computer mouse, wherein the SP touch screen allows the first icon to be electronically dragged through manual movement of the mouse.

16. Apparatus comprising:
at least one customer station,
wherein the at least one customer station includes a first customer station,
wherein the first customer station includes a customer display,
wherein the customer display includes a customer touch screen,
wherein the customer touch screen is operable to display visually different output content,
wherein the first customer station allows a customer to change the customer output content being displayed through the customer touch screen,
wherein the first customer station is a portable communication device,
a service provider (SP) station,
wherein the SP station includes a SP display,
wherein the SP display includes a SP touch screen,
wherein the SP touch screen differs from the customer touch screen,
wherein the SP touch screen includes a surface area,
wherein manual movement of a SP finger while the finger is kept in contact with the surface area, causes an electronic marking to be displayed through the SP touch screen,
wherein a shape of the marking corresponds to a path taken by the finger during the movement,
wherein the first customer station and the SP station are both located in a bank facility that provides bank teller assistance;
wherein the SP station is in operative connection with the customer station through operation of at least one computer,
wherein the operative connection enables the same customer output content that is currently being displayed through the customer touch screen, to be simultaneously reproduced through the SP touch screen,
wherein the operative connection enables the same electronic marking that is currently being displayed through the SP touch screen, to be simultaneously reproduced through the customer touch screen,
wherein while the SP touch screen displays a same customer output content, manual movement of an SP finger while kept in contact with the surface area causes a same electronic marking to be displayed on the customer output content being displayed at the customer touch screen.

17. The apparatus according to claim 16 and further comprising a banking system arrangement,
wherein the arrangement includes a plurality of customer stations in operative connection with the SP station,
wherein the plurality of customer stations include the first customer station,
wherein the plurality of a customer station include an automated banking machine,
wherein the automated banking machine includes a cash dispenser and at least one user data reader,
wherein the at least one computer is operative to cause the automated banking machine to carry out a requested cash withdrawal transaction on a financial account, based at least in part on the financial account corresponding to user data read by the at least one user data reader.

18. The apparatus according to claim 16 wherein the customer touch screen is operable to display a plurality of visually different icons representative of different banking services available to the customer, wherein a first banking service is selectable by the customer through manual touching working of a displayed icon that is representative of the first banking service.

19. The apparatus according to claim 18 wherein the different banking services available to the customer are based at least in part on customer data received by the first customer station from the customer.

20. The apparatus according to claim 18 wherein the first banking service corresponds to a customer request for assistance from a bank employee, wherein the displayed icon that is representative of the first banking service comprises a virtual key, wherein manual touching of the virtual key places the first customer station in communication with the SP station.

21. The apparatus according to claim 16 wherein the first customer station is a mobile phone.

22. The apparatus according to claim 21 wherein the mobile phone comprises a smart phone.

23. The apparatus according to claim 16 wherein the first customer station is a wireless communication device.

24. The apparatus according to claim 23 wherein the wireless communication device comprises one of a PDA device, iPad device, tablet device, or laptop computer.

25. The apparatus according to claim 16 wherein the portable communication device is a mobile device of a banking facility.

* * * * *